US009762884B2

(12) United States Patent
Hattori et al.

(10) Patent No.: US 9,762,884 B2
(45) Date of Patent: Sep. 12, 2017

(54) ENCODING DEVICE, ENCODING METHOD, DECODING DEVICE, AND DECODING METHOD FOR ENCODING MULTIPLE VIEWPOINTS FOR COMPATIBILITY WITH EXISTING MODE ALLOWING FEWER VIEWPOINTS

(75) Inventors: Shinobu Hattori, Tokyo (JP);
Yoshitomo Takahashi, Kanagawa (JP);
Jun Yonemitsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 935 days.

(21) Appl. No.: 13/816,247

(22) PCT Filed: Aug. 31, 2011

(86) PCT No.: PCT/JP2011/069840
§ 371 (c)(1),
(2), (4) Date: Feb. 11, 2013

(87) PCT Pub. No.: WO2012/029883
PCT Pub. Date: Mar. 8, 2012

(65) Prior Publication Data
US 2013/0142247 A1    Jun. 6, 2013

(30) Foreign Application Priority Data

Sep. 3, 2010 (JP) ................... 2010-198350
Oct. 8, 2010 (JP) ................... 2010-228276
Jun. 13, 2011 (JP) ................... 2011-131676

(51) Int. Cl.
*H04N 21/2389* (2011.01)
*H04N 13/00* (2006.01)
(Continued)

(52) U.S. Cl.
CPC ..... *H04N 13/0048* (2013.01); *H04N 13/0011* (2013.01); *H04N 13/0062* (2013.01);
(Continued)

(58) Field of Classification Search
None
See application file for complete search history.

(56) References Cited

U.S. PATENT DOCUMENTS

2005/0244050 A1* 11/2005 Nomura ............. H04N 13/0048
382/154
2006/0132610 A1*  6/2006 Xin ...................... H04N 19/597
348/207.99
(Continued)

FOREIGN PATENT DOCUMENTS

EP    2 059 053 A2    5/2009
JP    8-70473          3/1996
(Continued)

OTHER PUBLICATIONS

Chinese Office Action issued Sep. 3, 2014, in China Patent Application No. 201180040745.5 (with English translation).
(Continued)

*Primary Examiner* — Dave Czekaj
*Assistant Examiner* — Tyler W Sullivan
(74) *Attorney, Agent, or Firm* — Oblon, McClelland, Maier & Neustadt, L.L.P.

(57) ABSTRACT

An encoding device and method, and a decoding device and method, capable of encoding and decoding a multi-viewpoint image in accordance with a mode having compatibility with an existing mode. A compatible encoder generates a compatible stream by encoding an image that is a compatible image. An image converting unit converts the resolution of images that are auxiliary images. An auxiliary encoder generates an encoded stream of the auxiliary image by encoding the auxiliary image of which the resolution is converted. A compatibility information generating unit generates, as compatibility information, information that designates the image as a compatible image. A multiplexing unit transmits the compatible stream, the encoded stream of the
(Continued)

auxiliary image, and the compatibility information. The encoding device can encode a 3D image of the multi-viewpoint mode.

30 Claims, 70 Drawing Sheets

(51) Int. Cl.
    *H04N 13/02*         (2006.01)
    *H04N 19/597*     (2014.01)
    *H04N 19/70*       (2014.01)
    *H04N 19/59*       (2014.01)

(52) U.S. Cl.
    CPC ......... *H04N 13/0271* (2013.01); *H04N 19/59* (2014.11); *H04N 19/597* (2014.11); *H04N 19/70* (2014.11); *H04N 2013/0081* (2013.01); *H04N 2213/005* (2013.01)

(56) References Cited

U.S. PATENT DOCUMENTS

| | | | |
|---|---|---|---|
| 2006/0222252 A1* | 10/2006 | Lee | H04N 13/0066 382/239 |
| 2007/0064800 A1* | 3/2007 | Ha | H04N 13/0048 375/240.12 |
| 2008/0030596 A1* | 2/2008 | Sung | G06T 3/4015 348/224.1 |
| 2008/0317124 A1* | 12/2008 | Cho | H04N 19/597 375/240.08 |
| 2009/0323824 A1* | 12/2009 | Pandit | H04N 21/2365 375/240.26 |
| 2010/0098157 A1* | 4/2010 | Yang | H04N 19/597 375/240.12 |
| 2010/0111183 A1* | 5/2010 | Jeon | H04N 19/597 375/240.16 |
| 2010/0142614 A1* | 6/2010 | Pandit | H04N 19/597 375/240.02 |
| 2010/0321388 A1* | 12/2010 | Daly | H04N 13/021 345/427 |
| 2011/0200302 A1 | 8/2011 | Hattori et al. | |
| 2011/0255796 A1* | 10/2011 | Nakamura | H04N 19/597 382/232 |
| 2011/0286530 A1* | 11/2011 | Tian | H04N 21/2365 375/240.25 |
| 2012/0113217 A1 | 5/2012 | Hattori | |
| 2012/0169845 A1* | 7/2012 | Kim | H04N 13/0048 348/46 |
| 2013/0114680 A1* | 5/2013 | Leontaris | H04N 13/0029 375/240.02 |
| 2013/0141534 A1* | 6/2013 | Hattori | H04N 13/0059 348/43 |
| 2013/0141535 A1* | 6/2013 | Hattori | H04N 13/0048 348/43 |
| 2013/0169751 A1* | 7/2013 | Hattori | H04N 13/0048 348/43 |
| 2013/0307929 A1* | 11/2013 | Hattori | H04N 19/597 348/43 |
| 2013/0315472 A1* | 11/2013 | Hattori | G06T 19/20 382/154 |
| 2013/0335525 A1* | 12/2013 | Hattori | H04N 13/0007 348/43 |
| 2014/0028793 A1* | 1/2014 | Wiegand | H04N 13/0011 348/42 |

FOREIGN PATENT DOCUMENTS

| | | | | |
|---|---|---|---|---|
| JP | 2000-308089 | 11/2000 | | |
| JP | 2008-182669 | 8/2008 | | |
| JP | 2010-508752 | 3/2010 | | |
| WO | WO 2008/054100 A1 | 5/2008 | | |
| WO | WO 2008/108566 A1 | 9/2008 | | |
| WO | WO 2008/133910 A2 | 11/2008 | | |
| WO | WO 2010073513 A1 * | 7/2010 | ........... H04N 19/597 | |

OTHER PUBLICATIONS

Chinese Office Action issued Sep. 9, 2014, in China Patent Application No. 201180040628.9 (with English translation ).
U.S. Appl. No. 13/818,506, filed Feb. 22, 2013, Hattori, et al.
U.S. Appl. No. 13/816,249, filed Feb. 11, 2013, Hattori.
U.S. Appl. No. 13/816,591, Feb. 12, 2013, Hattori, et al.
International Search Report issued Dec. 6, 2011 in Application No. PCT/JP2011/069840.
Extended Search Report issued Jul. 8, 2014 in European Patent Application No. 11821901.3.
Extended Search Report issued Jul. 8, 2014 in European Patent Application No. 11821898.1.
Alexis Michael Tourapis, et al., "A Frame Compatible System for 3D Delivery", Dolby Laboratories Inc., ISO/IEC JTC1/SC29/WG11, MPEG2010/M17925, Jul. 2010, XP030046515. 10 pages.
Anthony Vetro, "MVC Profile/Level Definitions for Stereo", Joint Video Team (JVT) of ISO/IEC MPEG & ITU-T VCEG (ISO/IEC JTC1/SC29/WG11 and ITU-T SG16 Q.6), 28th Meeting, Document: JVT-AB037-L, Filename: JVT-AB037-L.doc, XP030007423, 4 pages.
Kyung-tae Kim, et al., "Synthesis of a high-resolution 3D-stereoscopic image pair from a high-resolution monoscopic image and a low-resolution depth map", XP008000653. vol. 3295, Jan. 26, 1998, 12 pages.
Gary Sullivan, et al., "Problem statement for scalable resolution enhancement of frame-compatible tereoscopic 3D video", Requirements & Video, ISO/IEC JTC1/SC29/WG11 N 11526, Jul. 2010, XP030018022, 6 pages.
Ying Chen, et al., "Comments on Scalable Resolution Enhancement of Frame-Compatible Stereoscopic 3D Video", Qualcomm Incorporated, ISO/IEC JTC1/SC29/8WG11 MPEG2010/m 18475, Oct. 2010, XP030047065, 10 pages.

* cited by examiner

FIG. 6

```
sei_message() {
    ...
    else if(payloadType==xx) {
        3DV_view_structure(payloadSize)
    }
    else if(payloadType==yy) {
        depth_map_structure(payloadSize)
    }
}
```

FIG. 7

```
3DV_view_structure() {
    ...
    num_of_views == NUMBER OF view
    compatible_mode == TYPE OF compatible mode (mono, frame packing, stereo, etc)
    compatible_view [mono, frame_packing, SS_L, SS_R] == DESIGNATION OF COMPATIBLE IMAGE
    ...
}
```

FIG. 8

```
depth_map_structure () {
  ...
  num_of_depth_map == NUMBER OF depth map
  is_frame_packing == FLAG REPRESENTING WHETHER BEING MULTIPLEXED OR NOT
  frame_packing_mode == MULTIPLEXING MODE (SBS, TOB etc)
  comb_frame_packing_views[L, R] == DESIGNATE MULTIPLEXED PARALLAX IMAGE
  ...
}
```

FIG. 9

```
sei_message() {
  ...
  else if (payloadType==xx) {
    3DV_view_info(payloadSize)
  }
}

3DV_view_info() {
  num_of_views == NUMBER OF view
  num_of_view_distance == NUMBER OF INTER-VIEWPOINT DISTANCES
  view [0, 1] == COMBINATION OF IMAGES CORRESPONDING TO INTER-VIEWPOINT DISTANCE
  view_distance [view_distance_id] == INTER-VIEWPOINT DISTANCE
  ...
}
```

FIG. 24

```
program_stream_map () {
  ...
  for (i=0; i<N; i++) {
    3DV_view_structure_descriptor () {
    }
    ...
  for (i=0; i<N; i++) {
    ...
    for (i=0; i<N2; i++) {
      depth_map_structure_descriptor ()
    }
  }
}
```

FIG. 25

```
3DV_view_structure_descriptor () {
  descriptor_tag
  descriptor_length
  num_of_views
  compatible_mode
  compatible_view [mono, frame_packing, SS_L, SS_R]
  ...
}
```

FIG. 26

```
depth_map_structure_descriptor() {
    descriptor_tag
    descriptor_length
    num_of_depth_map
    is_frame_packing;
    frame_packing_mode
    comb_frame_packing_views[L, R]
    ...
}
```

FIG. 27

```
program_stream_map() {
    ...
    for (i=0; i<N; i++) {
        3DV_view_info_descriptor()
    }
    ...
    for (i=0; i<N2; i++) {
        descriptor()
    }
}
```

```
3DV_view_info_descriptor() {
    descriptor_tag
    descriptor_length
    num_of_views
    num_of_view_distance
    view[0, 1]
    view_distance [view_distance_id]
    ...
}
```

FIG. 29

```
depth_map_structure () {
...
num_of_depth_map == NUMBER OF depth map
is_decimated == LOW-RESOLUTION FLAG
decimation_mode == CONVERSION MODE OF RESOLUTION (HORIZONTAL HALF MODE, VERTICAL HALF MODE, HORIZONTAL/VERTICAL 1/4 MODE, etc)
comb_decimated_views == DESIGNATE PARALLAX IMAGE OF WHICH RESOLUTION HAS BEEN LOWERED
...
}
```

FIG. 34

```
depth_map_structure_descriptor() {
    descriptor_tag
    descriptor_length
    num_of_depth_map
    is_decimated
    decimation_mode
    comb_decimated views
    ...
}
```

*FIG. 36*

```
depth_map_structure_descriptor() {
   descriptor_tag
   descriptor_length
   num_of_depth_map
   is_frame_packing;
   frame_packing_mode(SBS, TOB, frame sequential, etc)
   comb_frame_packing_views[L, R]
   ...
}
```

FIG. 37

```
depth_map_structure() {
  ...
  num_of_depth_map == NUMBER OF depth map
  is_frame_packing == FLAG REPRESENTING WHETHER BEING MULTIPLEXED
  frame_packing_mode == MULTIPLEXING MODE(SBS, TOB, frame sequential, etc)
  comb_frame_packing_views[L, R] == DESIGNATE MULTIPLEXED PARALLAX IMAGE
  ...
}
```

*FIG. 48*

|    | COMPATIBILITY | IMAGE QUALITY | DATA AMOUNT |
|----|---------------|---------------|-------------|
| 1) | ◎ | | |
| 2) | ○ | ○ | |
| 3) | ○ | | ○ |
| 4) | ○ | ○ | ◎ |
| 5) | ○ | | ○ |
| 6) | ○ | ○ | |
| 7) | ○ | | ○ |
| 8) | ○ | ○ | ◎ |

FIG. 57

```
subset_seq_parameter_set_rbsp() {
  seq_parameter_set_data()
  if(profile_idc==83 || profile_idc==86) {
    ---snip---
  }else if(profile_idc==118 || profile_idc==128) {
    ---snip---
  }else if(profile_idc==138) {
    bit_equal_to_one
    seq_parameter_set_depth_extension()
    depth_vui_parameters_present_flag
    if(depth_vui_parameters_present_flag==1 )
      depth_vui_parameters_extension()
  }
  ---snip---
}
```

FIG. 58

```
seq_parameter_set_depth_extension() {
  num_views_minus1
  for(i=0; i<=num_views_minus1; i++) {
    view_id[i]
    ref_view_id[i]
  }
  for(i=1; i<=num_views_minus1; i++) {
    num_anchor_refs_l0[i]
    for(j=0; j<num_anchor_refs_l0[i]; j++)
      anchor_ref_l0[i][j]
    num_anchor_refs_l1[i]
    for(j=0; j<num_anchor_refs_l1[i]; j++)
      anchor_ref_l1[i][j]
  }
  for(i=1; i<=num_views_minus1; i++) {
    num_non_anchor_refs_l0[i]
    for(j=0; j<num_non_anchor_refs_l0[i]; j++)
      non_anchor_ref_l0[i][j]
    num_non_anchor_refs_l1[i]
    for(j=0; j<num_non_anchor_refs_l1[i]; j++)
      non_anchor_ref_l1[i][j]
  }
  ...

...
  num_level_values_signalled_minus1
  for(i=0; i<=num_level_values_signalled_minus1; i++) {
    level_idc[i]0 u(8)
    num_applicable_ops_minus1[i]
    for(j=0; j<=num_applicable_ops_minus1[i]; j++) {
      applicable_op_temporal_id[i][j]
      applicable_op_num_target_views_minus1[i][j]
      for(k=0; k<=applicable_op_num_target_views_minus1[i][j]; k++)
        applicable_op_target_view_id[i][j][k]
        applicable_op_num_views_minus1[i][j]
    }
  }
}
```

FIG. 59

```
depth_vui_parameters_extension() {
  vui_depth_num_ops_minus1
  for(i=0;i<=vui_depth_num_ops_minus1;i++) {
    vui_depth_temporal_id[i]
    vui_depth_num_target_output_views_minus1[i]
    for(j=0;j<=vui_depth_num_target_output_views_minus1[i];j++)
      vui_depth_view_id[i][j]
    vui_depth_timing_info_present_flag[i]
    if(vui_depth_timing_info_present_flag[i]) {
      vui_depth_num_units_in_tick[i]
      vui_depth_time_scale[i]
      vui_depth_fixed_frame_rate_flag[i]
    }
    vui_depth_nal_hrd_parameters_present_flag[i]
    if(vui_depth_nal_hrd_parameters_present_flag[i])
      hrd_parameters()
    vui_depth_vcl_hrd_parameters_present_flag[i]
    if(vui_depth_vcl_hrd_parameters_present_flag[i])
      hrd_parameters()
    if(vui_depth_nal_hrd_parameters_present_flag[i] ||
                  vui_depth_vcl_hrd_parameters_present_flag[i])
      vui_depth_low_delay_hrd_flag[i]
    vui_depth_pic_struct_present_flag[i]
...

depth_loc_info_present_flag
    if(depth_loc_info_present_flag) {
      depth_sample_loc_type_top_field
      depth_sample_loc_type_bottom_field
    }
    video_src_info_present_flag
    if(video_src_info_present_flag) {
      pic_width_in_mbs_minus1
      pic_height_in_mbs_minus1
      aspect_ratio_info_present_flag
      if(aspect_ratio_info_present_flag) {
        aspect_ratio_idc
        if(aspect_ratio_idc==Extended_SAR) {
          sar_width
          sar_height
        }
      }
    }
  }
}
```

FIG. 60

```
nal_unit(NumBytesInNALunit) {
  ...snip...
  If(nal_unit_type==21) {
    depth_extension_flag
    if(depth_extension_flag) {
      nal_unit_header_depth_extension()
    }else{
      nal_unit_header_mvc_extension()
    }
  }
  ...snip...
}
```

FIG. 61

```
nal_unit_header_depth_extension() {
  non_idr_flag
  priority_id
  view_id
  temporal_id
  anchor_pic_flag
  inter_view_flag
  ref_view_id
  reserved_one_bit
}
```

*FIG. 62*

```
3DV_scalable_nesting(payloadSize) {
  operation_point_flag
  if(!operation_point_flag) {
    all_view_components_in_au_flag
    if(!all_view_components_in_au_flag) {
      num_view_components_minus1
      for(i=0; i<= num_view_components_minus1; i++)
        sei_view_id[i]
    }
  }else{
  num_view_components_op_minus1
  for(i=0; i<=num_view_components_op_minus1; i++)
    sei_op_view_id[i]
    sei_op_temporal_id[i]
  }
  while(!byte_aligned())
    sei_nesting_zero_bit /* equal to 0 */
  sei_rbsp()
}
```

FIG. 64

```
subset_seq_parameter_set_rbsp() {
  seq_parameter_set_data()
  if(profile_idc==83 || profile_idc==86) {
    ---snip---
  }else if(profile_idc==118 || profile_idc==128) {
    ---snip---
  }else if(profile_idc==148) {
    bit_equal_to_one
    seq_parameter_set_mvc_extension()
    mvc_vui_parameters_present_flag
    if(mvc_vui_parameters_present_flag==1)
      mvc_vui_parameters_extension()
    }else if(profile_idc==138) {
      bit_equal_to_one
      seq_parameter_set_depth_extension()
      depth_vui_parameters_present_flag
      if(depth_vui_parameters_present_flag==1)
        depth_vui_parameters_extension()
    }
  ---snip---
}
```

```
seq_parameter_set_data () {
  ...snip...
  subset_seq_present_flag
  if(subset_seq_present_flag) {
    num_subset_seq
    subset_seq_info_present_flag
    if(subset_seq_info_present_flag) {
      for(i=0; i<num_subset_seq; i++) {
        subset_seq_parameter_set_data()
      }
    }
  }
}
```

FIG. 67

```
subset_seq_parameter_set_data() {
  subset_seq_parameter_set_id
  num_subset_seq_views
  for(i=0; i<num_subset_seq_views; i++) {
    subset_seq_view_id[i]
    num_anchor_refs_l0[i]
    for(j=0; j<num_anchor_refs_l0[i]; j++)
      anchor_ref_l0[i][j]
    num_anchor_refs_l1[i]
    for(j=0; j< num_anchor_refs_l1[i]; j++)
      anchor_ref_l1[i][j]
    num_non_anchor_refs_l0[i]
    for(j=0; j<num_non_anchor_refs_l0[i]; j++)
      non_anchor_ref_l0[i][j]
    num_non_anchor_refs_l1[i]
    for(j=0; j<num_non_anchor_refs_l1[i]; j++)
      non_anchor_ref_l1[i][j]
    depth_extension_flag
    if(depth_extension_flag) {
      ref_view_id[i]
    }
  } seq_param_override_flag
  if(seq_param_override_flag) {
    subset_seq_profile_idc
    subseq_level_idc
    subset_seq_pic_width_in_mbs_minus1
    subset_seq_pic_height_in_map_units_minus1
    if(!frame_mbs_only_flag)
      subset_seq_mb_adaptive_frame_field_flag
  }
  subset_seq_frame_cropping_flag
  if(subset_seq_frame_cropping_flag) {
    subset_seq_frame_crop_left_offset
    subset_seq_frame_crop_right_offset
    subset_seq_frame_crop_top_offset
    subset_seq_frame_crop_bottom_offset
  }
  subset_seq_vui_parameters_present_flag
  if(subset_seq_vui_parameters_present_flag)
    subset_seq_vui_parameters()
}
```

FIG. 68

```
subset_seq_vui_parameters() {
  subset_seq_timing_info_present_flag
  if(subset_seq_timing_info_present_flag) {
    subset_seq_num_units_in_tick
    subset_seq_time_scale
    subset_seq_fixed_frame_rate_flag
  }
  subset_seq_vui_pic_struct_present_flag
  subset_seq_chroma_loc_info_present_flag
  if(chroma_loc_info_present_flag) {
    subset_seq_sample_loc_type_top_field
    subset_seq_sample_loc_type_bottom_field
  }
  subset_seq_vui_nal_hrd_parameters_present_flag
  if(subset_seq_vui_nal_hrd_parameters_present_flag)
    hrd_parameters()
  subset_seq_vui_vcl_hrd_parameters_present_flag
    if(subset_seq_vui_vcl_hrd_parameters_present_flag)
      hrd_parameters()
  if(subset_seq_vui_nal_hrd_parameters_present_flag ||
        subset_seq_vui_vcl_hrd_parameters_present_flag)
    subset_seq_vui_low_delay_hrd_flag
  video_src_info_present_flag
  if(video_src_info_present_flag) {
    src_pic_width_in_mbs_minus1
    src_pic_height_in_mbs_minus1
    src_aspect_ratio_info_present_flag
    if(src_aspect_ratio_info_present_flag) {
      src_aspect_ratio_idc
      if(aspect_ratio_idc==Extended_SAR) {
        sar_width
        sar_height
      }
  }
}
```

FIG. 69

```
nesting_sei_rbsp() {
  nesting_type=mvc, 3dv, user defined etc
  all_view_components_in_au_flag
  if(!all_view_components_in_au_flag) {
    num_view_components_minus1
    for (i=0; i<=num_view_components_minus1; i++) {
      nesting_sei_view_id[i]
    }
  }
  do
    sei_message()
  while(more_rbsp_data())
    rbsp_trailing_bits()
}
```

ENCODING DEVICE, ENCODING METHOD, DECODING DEVICE, AND DECODING METHOD FOR ENCODING MULTIPLE VIEWPOINTS FOR COMPATIBILITY WITH EXISTING MODE ALLOWING FEWER VIEWPOINTS

TECHNICAL FIELD

The present technology relates to an encoding device, an encoding method, a decoding device, and a decoding method, and more particularly, to an encoding device, an encoding method, a decoding device, and a decoding method capable of encoding and decoding multi-viewpoint images in accordance with a mode that is compatible with an existing mode.

BACKGROUND ART

Currently, as a 3D image viewing mode, generally, there is a mode (hereinafter, referred to as a two-viewpoint mode) in which two-viewpoint images alternately displayed are seen by wearing glasses of which a left-eye shutter is open at the time of displaying one image out of two-viewpoint images, and a right-eye shutter is open at the time of displaying the other image.

However, in such a two-viewpoint mode, a viewer needs to purchase glasses in addition to a 3D image display device, and accordingly, the viewer's willingness to buy reduces. In addition, since a viewer needs to wear glasses for viewing, it annoys the viewer. Accordingly, a demand for a viewing mode (hereinafter, referred to as a multi-viewpoint mode) increases in which a 3D image can be viewed without wearing glasses.

In the multi-viewpoint mode, multi-viewpoint images are displayed such that a viewable angle is different for each viewpoint, and, a 3D image can be seen by a viewer viewing images of arbitrary two viewpoints with left and right eyes without wearing glasses.

A display device that provides viewing of a multi-viewpoint mode, for example, generates multi-viewpoint images for a multi-viewpoint mode based on images of two viewpoints for a two-viewpoint mode and displays the generated multi-viewpoint images. More specifically, the display device acquires disparity (depth) of two-viewpoint images for a two-viewpoint mode using an image disparity estimating technology (Depth Estimation). Then, the display device generates a synthesized image of multi-viewpoint images adjacent to a viewpoint corresponding to the images of two viewpoints for a two-viewpoint mode using a multi-viewpoint image generating technology (View Generation) using the disparity between images of two viewpoints and a synthesis technology (View Synthesis) and displays the synthesized image.

Existing encoding modes include an advanced video coding (AVC) mode and a multi-view video coding (MVC) mode.

FIG. 1 is a diagram that illustrates an example of an image processing system that encodes a 2D image in accordance with the AVC mode and decodes the encoded image.

The image processing system 10 illustrated in FIG. 1 is configured by an imaging unit 11, an AVC encoder 12, and an AVC decoder 13.

The imaging unit 11 of the image processing system 10 captures an image A of a predetermined viewpoint and supplies the captured image to the AVC encoder 12. The AVC encoder 12 encodes the image A that is supplied from the imaging unit 11 in accordance with the AVC mode and supplies the encoded image to the AVC decoder 13. The AVC decoder 13 decodes the image A after encoding that is supplied from the AVC encoder 12 in accordance with a mode that corresponds to the AVC mode. The AVC decoder 13 outputs the image A that is acquired as a result of the decoding process, thereby displaying the image. In this way, the viewer can see a 2D image.

FIG. 2 is a diagram that illustrates an example of an image processing system that encodes an image of two viewpoints in accordance with the AVC mode and decodes the image.

The image processing system 20 illustrated in FIG. 2 is configured by an imaging unit 21A, an imaging unit 21B, an AVC encoder 22, and an AVC decoder 23.

The imaging unit 21A captures an image A of a predetermined viewpoint, halves the resolution of the image, and supplies a resultant image to the AVC encoder 22 as a left half image of the screen. In addition, the imaging unit 21B captures an image B of a viewpoint that is different from the viewpoint of the image A, halves the resolution of the image, and supplies a resultant image to the AVC encoder 22 as a right half image of the screen. The AVC encoder 22 encodes an image of which the left half is configured by the image A (hereinafter referred to as a half-resolution image A) of which the resolution has halved and of which the right half is configured by an image B (hereinafter, referred to as a half-resolution image B) of which the resolution has halved in accordance with the AVC mode and supplies the encoded image to the AVC decoder 23.

The AVC decoder 23 decodes the images after encoding that are supplied from the AVC encoder 22 in accordance with a mode that corresponds to the AVC mode. The AVC decoder 23 outputs images acquired as a result of the decoding process and alternately displays the half-resolution images A and B. At this time, a viewer, for example, wears glasses of which the left-eye shutter is open at the time of displaying the half-resolution image A and of which the right-eye shutter is open at the time of displaying the half-resolution image B, views the half-resolution image A only with the left eye, and views the half-resolution image B only with the right eye. In this way, the viewer can see a 3D image.

FIG. 3 is a diagram that illustrates an image processing system that encodes an image of two viewpoints in accordance with the MVC mode and decodes the encoded image.

The image processing system 30 illustrated in FIG. 3 is configured by an imaging unit 31A, an imaging unit 31B, an MVC encoder 32, and an MVC decoder 33.

The imaging unit 31A captures an image A of a predetermined viewpoint and supplies the captured image to the MVC encoder 32. In addition, the imaging unit 31B captures an image B of a viewpoint that is different from the viewpoint of the image A and supplies the captured image to the MVC encoder 32. The MVC encoder 32 encodes the image A that is supplied from the imaging unit 31A as a base image in accordance with the AVC mode and decodes the image B that is supplied from the imaging unit 31B as a dependent image in accordance with the MVC mode. The MVC encoder 32 supplies the images A and B after encoding to the MVC decoder 33.

The MVC decoder 33 decodes the images A and B after encoding that are supplied from the MVC encoder 32 in accordance with a mode that corresponds to the MVC mode. The MVC decoder 33 outputs the images A and B that are acquired as a result of the decoding process and alternately displays the images. At this time, a viewer, for example, wears glasses of which the left-eye shutter is open at the time of displaying the image A and of which the right-eye shutter is open at the time of displaying the image B, views the image A only with the left eye, and views the image B only with the right eye. In this way, the viewer can see a 3D image.

FIG. 4 is a diagram that illustrates an example of an image processing system that generates an image of multi-viewpoints by encoding an image of two viewpoints in accordance with the MVC mode and decoding the image.

The image processing system 40 illustrated in FIG. 4 is configured by imaging units 31A and 31B, an MVC encoder 32, an MVC decoder 33, a disparity detecting unit 41, and an image generating unit 42. In FIG. 4, the same reference numeral is assigned to a configuration that is the same as that illustrated in FIG. 3, and description thereof will not be appropriately presented.

Images A and B that are acquired as a result of decoding performed by the MVC decoder 33 are supplied to the disparity detecting unit 41 of the image processing system 40. The disparity detecting unit 41 detects the disparity of each pixel of the images A and B using the images A and B. The disparity detecting unit 41 generates a disparity image A' that represents the disparity of each pixel of the image A and a disparity image B' that represents the disparity of each pixel of the image B and supplies the generated disparity images to the image generating unit 42. The image generating unit 42 generates an image of multi-viewpoints of which the number corresponding to a display device not illustrated in the figure by using the images A and B acquired as a result of decoding performed by the MVC decoder 33 and the disparity images A' and B' supplied from the image generating unit 42. Then, the image generating unit 42 converts the resolution of the generated image of each viewpoint into "1/the number of viewpoints" of the resolution, synthesizes the images, and outputs the synthesized image so as to be displayed.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

Meanwhile, a mode for encoding a multi-viewpoint image has also been devised (for example, see Patent Document 1).

CITATION LIST

Patent Document

Patent Document 1: Japanese Patent Application Laid-Open No. 2008-182669

SUMMARY OF THE INVENTION

Problems to be Solved by the Invention

However, there has been no mode for encoding an image of multi-viewpoints which has compatibility with an existing encoding mode for an image of two viewpoints or less.

The present technology has been contrived in view of such situations and enables encoding and decoding of an image of multi-viewpoints in a mode having compatibility with an existing mode.

Solutions to Problems

According to a first aspect of the present technology, there is provided an encoding device including: a compatible image encoding unit that generates a first encoded stream by designating a compatible image out of multi-viewpoint images and encoding the designated compatible image; an image converting unit that converts resolution of an auxiliary image used when multi-viewpoint images are generated from the compatible image; an auxiliary image encoding unit that generates a second encoded stream by encoding the auxiliary image converted by the image converting unit; a setting unit that sets compatible image designating information designating the compatible image; and a transmission unit that transmits the first encoded stream generated by the compatible image encoding unit, the second encoded stream generated by the auxiliary image encoding unit, and the compatible image designating information set by the setting unit.

An encoding method according to the first aspect of the present technology corresponds to the encoding device according to the first aspect of the present technology.

In the first aspect of the present technology, a first encoded stream is generated by designating a compatible image out of multi-viewpoint images and encoding the designated compatible image, a second encoded stream is generated by converting resolution of an auxiliary image used when multi-viewpoint images are generated from the compatible image and encoding the auxiliary image of which the resolution is converted, compatible image designating information designating the compatible image is set, and the first encoded stream, the second encoded stream, and the compatible image designating information are transmitted.

According to a second aspect of the present technology, there is provided a decoding device including: a reception unit that receives a first encoded stream that is acquired as a result of encoding a compatible image designated out of multi-viewpoint images, a second encoded stream that is acquired as a result of converting resolution of an auxiliary image used when a multi-viewpoint image is generated from the compatible image and encoding the auxiliary image, and compatible image designating information that designates the compatible image; a compatible image decoding unit that identifies the first encoded stream based on the compatible image designating information and decodes the first encoded stream; an auxiliary image decoding unit that decodes the second encoded stream; and an image converting unit that converts the resolution of the auxiliary image, of which the resolution is converted, that is acquired as a result of decoding by the auxiliary image decoding unit.

A decoding method according to the second aspect of the present technology corresponds to the decoding device according to the second aspect of the present technology.

In the second aspect of the present technology, a first encoded stream that is acquired as a result of encoding a compatible image designated out of multi-viewpoint images, a second encoded stream that is acquired as a result of converting resolution of an auxiliary image used when a multi-viewpoint image is generated from the compatible image and encoding the auxiliary image, and compatible image designating information that designates the compatible image are received, the first encoded stream is identified based on the compatible image designating information, the first encoded stream is decoded, the second encoded stream is decoded, and the resolution of the auxiliary image, of which the resolution is converted, that is acquired as a result of decoding is converted.

In addition, the encoding device according to the first aspect and the decoding device according to the second aspect may be realized by causing a computer to execute a program.

Furthermore, the program that is executed by a computer so as to realize the encoding device according to the first aspect and the decoding device according to the second aspect may be provided while being transmitted through a transmission medium or being recorded on a recording medium.

Effects of the Invention

According to the first aspect of the present technology, multi-viewpoint images can be encoded in a mode having compatibility with an existing mode.

In addition, according to the second aspect of the present technology, multi-viewpoint images can be decoded in accordance with a mode that has compatibility with an existing mode.

BRIEF DESCRIPTION OF DRAWINGS

FIG. 6 is a diagram that illustrates an example of the description of compatibility information and disparity image information.

FIG. 7 is a diagram that illustrates a detailed example of the description of the compatibility information.

FIG. 8 is a diagram that illustrates a detailed example of the description of the disparity image information.

FIG. 9 is a diagram that illustrates an example of the description of inter-viewpoint distance information.

FIG. 24 is a diagram that illustrates another example of the description of compatibility information and disparity image information.

FIG. 25 is a diagram that illustrates another detailed example of the description of the compatibility information.

FIG. 26 is a diagram that illustrates another detailed example of the description of the disparity image information.

FIG. 27 is a diagram that illustrates another example of the description of the inter-viewpoint distance information.

FIG. 29 is a diagram that illustrates a further another example of the description of the disparity image information.

FIG. 34 is a diagram that illustrates further another example of the description of the disparity image information.

FIG. 36 is a diagram that illustrates a detailed example of the description of the disparity image information.

FIG. 37 is a diagram that illustrates a detailed example of the description of the disparity image information.

FIG. 48 is a diagram that illustrates features of the effect according to multiplexing.

FIG. 57 is a diagram that illustrates an example of the description of a Subset SPS according to the 3DV mode for a disparity image illustrated in FIG. 56.

FIG. 58 is a diagram that illustrates an example of the description of extension information for a disparity image that is illustrated in FIG. 57.

FIG. 59 is a diagram that illustrates an example of the description of VUI extension information for a disparity image illustrated in FIG. 57.

FIG. 60 is a diagram that illustrates an example of the description of an NAL header of encoded data according to the 3DV mode.

FIG. 61 is a diagram that illustrates an example of the description of disparity image header extension information illustrated in FIG. 60.

FIG. 62 is a diagram that illustrates an example of the description of SEI according to the 3DV mode that is illustrated in FIG. 56.

FIG. 64 is a diagram that illustrates an example of the description of a Subset SPS according to the 3DV mode for an image that is illustrated in FIG. 63.

FIG. 65 is a diagram that illustrates a configuration example of a bit stream in a case where the 3DV mode is a mode that is compliant with an HEVC mode.

FIG. 66 is a diagram that illustrates an example of the description of an SPS illustrated in FIG. 65.

FIG. 67 is a diagram that illustrates an example of the description of the Subset SPS illustrated in FIG. 66.

FIG. 68 is a diagram that illustrates an example of the description of VUI information of the Subset SPS illustrated in FIG. 67.

FIG. 69 is a diagram that illustrates an example of the description of SEI according to the 3DV mode that is illustrated in FIG. 65.

MODE FOR CARRYING OUT THE INVENTION

First Embodiment

[Configuration Example of Encoding Device According to First Embodiment]

Figure 5:
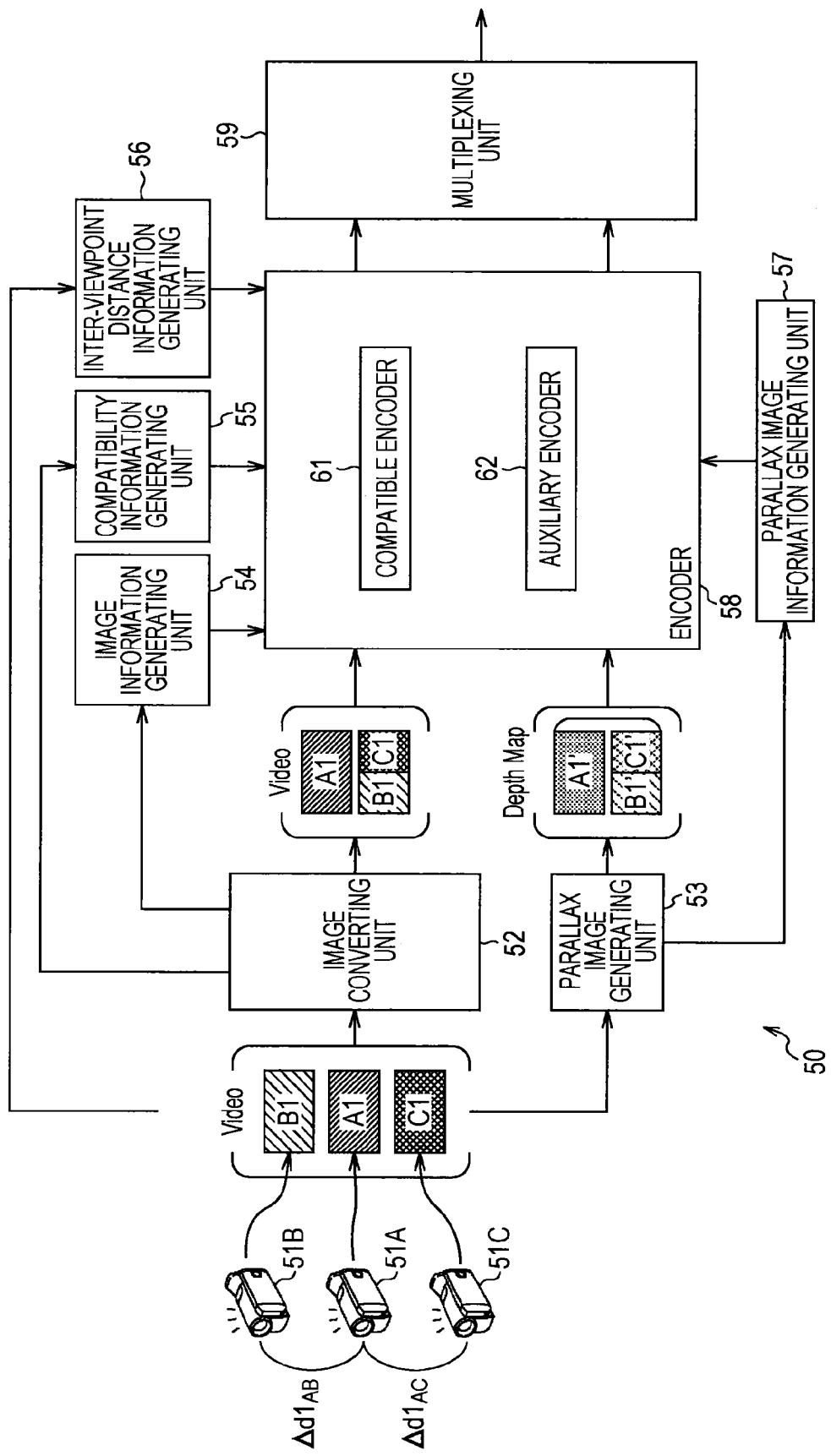
FIG. 5 is a block diagram that illustrates a configuration example of an encoding device according to a first embodiment of the present technology.

FIG. 5 is a block diagram that illustrates a configuration example of an encoding device according to a first embodiment of the present technology.

The encoding device 50 illustrated in FIG. 5 is configured by imaging units 51A to 51C, an image converting unit 52, a disparity image generating unit 53, an image information generating unit 54, a compatibility information generating unit 55, an inter-viewpoint distance information generating unit 56, a disparity image information generating unit 57, an encoder 58, and a multiplexing unit 59. Throughout the present disclosure, including the drawings, the terms "disparity image" and "parallax image" will be used interchangeably.

The encoding device 50 encodes an image of one viewpoint that is included in a multi-viewpoint image as a 2D image in accordance with an existing encoding mode, thereby securing the compatibility with an existing encoding device that encodes a 2D image.

Hereinafter, out of multi-viewpoint images, an image that is encoded in an existing encoding mode so as to secure the compatibility with an existing encoding device will be referred to as a compatible image, and an image that is used for generating images of viewpoints more than the number of viewpoints of a compatible image using the compatible image will be referred to as an auxiliary image.

In the encoding device 50, the imaging unit 51A captures an HD (high definition) image of a predetermined viewpoint as an image A1 and supplies the captured image to the image converting unit 52, the disparity image generating unit 53, and the inter-viewpoint distance information generating unit 56. The imaging unit 51B captures an HD image of a viewpoint that is different from the viewpoint of the image A1 as an image B1 at a position that is separate from the imaging unit 51A by a distance $\Delta d1_{AB}$ in a horizontal direction and supplies the captured image to the image converting unit 52, the disparity image generating unit 53, and the inter-viewpoint distance information generating unit 56. The imaging unit 51C captures an HD image of a viewpoint different from the viewpoints of the images A1 and B1 as an image C1 at a position separate from the imaging unit 51A by a distance $\Delta d1_{AC}$ in the horizontal direction that is opposite to the imaging unit 51B and supplies the captured image to the image converting unit 52, the disparity image generating unit 53, and the inter-viewpoint distance information generating unit 56.

The viewpoints that correspond to the images B1 and C1 are viewpoints that are located on the outer side out of viewpoints of images that can be recognized as 3D images.

In this way, a decoding device that corresponds to the encoding device 50 can generate multi-viewpoint images by interpolating images of viewpoints located on the further inner side than the viewpoints of the images B1 and C1 by using the images A1 to C1. As a result, the multi-viewpoint images can be generated with precision that is higher than that of a case where images of viewpoints located on the outer side are interpolated using images of viewpoints located on the inner side. The distances $\Delta d1_{AB}$ and $\Delta d1_{AC}$ may be configured to be either fixed or changed each time.

The image converting unit 52 determines the image A1, which is supplied from the imaging unit 51A of which the position in the horizontal direction is located on the inner side out of the imaging units 51A to 51C, as a compatible image. The image converting unit 52 supplies information that designates the image A1 as a compatible image to the compatibility information generating unit 55. Then, the image converting unit 52 directly supplies the image A1 that is the compatible image to the encoder 58.

In addition, the image converting unit 52 sets the images B1 and C1 other than the image A1 as auxiliary images and multiplexes the images B1 and C1 in accordance with a predetermined multiplexing mode. More specifically, for example, in a case where the multiplexing mode is a side-by-side mode, the image converting unit 52 (image converting unit) halves the resolution of each one of the images B1 and C1. Then, the image converting unit 52 (multiplexing unit) multiplexes the image B1 (hereinafter, referred to as a half-resolution image B1) of which the resolution has halved and the image C1 (hereinafter, referred to as a half-resolution image C1) of which the resolution has halved such that the half-resolution image B1 becomes a left-half image of the screen, and the half-resolution image C1 becomes a right-half image of the screen. The image converting unit 52 supplies a multiplexed image that is acquired as a result of the multiplexing process to the encoder 58 and supplies information that represents a multiplexing mode of the auxiliary images to the image information generating unit 54.

The disparity image generating unit 53 detects the disparity of each pixel of the images A1 to C1 using the images A1 to C1 that are supplied from the imaging units 51A to 51C. The disparity image generating unit 53 generates a disparity image A1' that represents the disparity of each pixel of the image A1 that is a compatible image and directly supplies the generated disparity image to the encoder 58. In addition, the disparity image generating unit 53 (multiplexing unit) generates a disparity image B1' that represents the disparity of each pixel of the image B1 that is an auxiliary image and a disparity image C1' that represents the disparity of each pixel of the image C1 that is an auxiliary image and multiplexes the generated disparity images in accordance with a predetermined multiplexing mode. The disparity image generating unit 53 supplies a multiplexed image that is acquired as a result of the multiplexing process to the encoder 58. In addition, the disparity image generating unit 53 supplies information that represents the multiplexing mode of the disparity images of the auxiliary images to the disparity image information generating unit 57.

The image information generating unit 54 generates information that represents the multiplexing mode of the auxiliary images and the like as image information, which is information relating to a compatible image and auxiliary images, based on the information that is supplied form the image converting unit 52 and supplies the generated image information to the encoder 58.

The compatibility information generating unit 55 (setting unit) generates information designating the compatible image, a compatible mode, and the like as compatibility information, which is information relating to the compatibility, based on the information supplied from the image converting unit 52 and supplies the generated compatibility information to the encoder 58.

Here, the compatible mode is a mode that represents a method of encoding the compatible image. As examples of the compatible mode, there are a mono mode that represents an encoding method in which a compatible image of one viewpoint is encoded in accordance with the AVC mode, a frame packing mode that represents an encoding method in which compatible images of two viewpoints are multiplexed and encoded in accordance with the AVC mode, and a stereo mode that represents an encoding method in which compatible images of two viewpoints are encoded in accordance with the MVC mode.

The inter-viewpoint distance information generating unit 56 (setting unit) detects each inter-viewpoint distance (hereinafter, referred to as an inter-viewpoint distance) between two images out of the images A1 to C1 using the images A1 to C1 that are supplied from the imaging units 51A to 51C. For example, the inter-viewpoint distance information generating unit 56 detects the distance $\Delta d1_{AB}$ between the imaging units 51A and 51B in the horizontal direction and the distance $\Delta d1_{AC}$ between the imaging units 51A and 51C in the horizontal direction as inter-viewpoint distances. The inter-viewpoint distance information generating unit 56 generates information that represents the inter-viewpoint distances and the like as inter-viewpoint distance information, which is information relating to the inter-viewpoint distance information, and supplies the generated inter-viewpoint distance information to the encoder 58.

The disparity image information generating unit 57 generates information that represents the multiplexing mode of the disparity images of the auxiliary images and the like as disparity image information, which is information relating to the disparity images, based on the information that is supplied from the disparity image generating unit 53 and supplies the generated disparity image information to the encoder 58.

The encoder 58 is configured by a compatible encoder 61 and an auxiliary encoder 62. The compatible encoder 61 (compatible image encoding unit) designates the image A1 that is a compatible image from the multiplexed image of the compatible image and the auxiliary images supplied from the image converting unit 52, encodes the image A1 in accordance with the existing AVC mode, adds various information to the encoded image, and supplies an encoded stream that is acquired as a result thereof to the multiplexing unit 59 as a compatible stream (first encoded stream).

The auxiliary encoder 62 (an auxiliary image encoding unit and a disparity image encoding unit) encodes the multiplexed image of the auxiliary images that is supplied from the image converting unit 52 and the multiplexed images of the disparity images A1' of the compatible images and the disparity images of the auxiliary images that are supplied from the disparity image generating unit 53 in accordance with a predetermined mode. As an encoding mode employed by the auxiliary encoder 62, the AVC mode, the MVC mode, an MPEG2 (Moving Picture Experts Group phase 2), or the like can be used.

In addition, the auxiliary encoder 62 adds the image information supplied from the image information generating unit 54, the compatibility information supplied from compatibility information generating unit 55, the inter-viewpoint distance information supplied from the inter-viewpoint distance information generating unit 56, the disparity image information supplied from the disparity image information generating unit 57, and the like to an encoded image (the second stream, the first disparity encoded stream, and the second disparity encoded stream) that is acquired as a result of the encoding process, thereby generating an encoded stream. The auxiliary encoder 62 supplies the encoded stream to the multiplexing unit 59 as an auxiliary stream.

The multiplexing unit 59 respectively generates TSs (transport streams) from the compatible stream supplied from the compatible encoder 61 and the auxiliary stream supplied from the auxiliary encoder 62, and multiplexes the generated TSs. The multiplexing unit 59 (transmission unit) transmits a multiplexed stream that is acquired as a result of the multiplexing process.

[Example of Description of Information Included in Auxiliary Stream]

FIGS. 6 to 8 are diagrams that illustrate examples of the description of the compatibility information and the disparity image information that are included in the auxiliary stream in a case where the AVC mode or the MVC mode is used as an encoding mode.

As illustrated in FIG. 6, the compatibility information (3DV_view_structure) and the disparity image information (depth_map_structure) are arranged in the SEI (supplemental enhancement information) that is included in the auxiliary stream.

As the compatibility information (3DV_view_structure), as illustrated in FIG. 7, the number (num_of_views) of viewpoints (views) of an image that is an encoding target, a compatible mode (compatible_mode), information (compatible_view) that designates a compatible image, and the like are described.

In addition, as the disparity image information (depth_map_structure), as illustrated in FIG. 8, the number (num_of_depth_map) of disparity images (depth map), a flag (is_frame_packing) representing whether or not the disparity images are multiplexed, a multiplexing system (frame_packing_mode) of the disparity images, information (comb_frame_packing_views) that designates the disparity images that are multiplexed, and the like are described. As the multiplexing modes, there are a side-by-side mode (SBS), a top-and-bottom mode (TOB), and the like. Here, the top-and-bottom mode is a mode in which one image out of two images to be multiplexed is set as an upper image of the screen, and the other image is set as a lower image of the screen.

The image information is similar to the disparity image information except that the image information is information of the compatible image and the auxiliary image other than the disparity image and thus is not illustrated in the figure.

FIG. 9 is a diagram that illustrates an example of the description of the inter-viewpoint distance information that is included in the auxiliary stream in a case where the AVC mode or the MVC mode is used as an encoding mode.

As illustrated in FIG. 9, the inter-viewpoint distance information (3DV_view_info), similarly to the compatibility information, the disparity image information, and the image information, is arranged in the SEI that is included in the auxiliary stream.

As the inter-viewpoint distance information (3DV_view_info), as illustrated in FIG. 9, the number (num_of_views) of viewpoints of an image that is an encoding target, the number (num_of_view_distance) of detected inter-viewpoint distances, a combination (view[0,1]) of two images corresponding to the inter-viewpoint distance, an inter-viewpoint distance (view_distance[view_distance_id]) that corresponds to the combination, and the like are described.

[Description of Process of Encoding Device]

Figure 10:
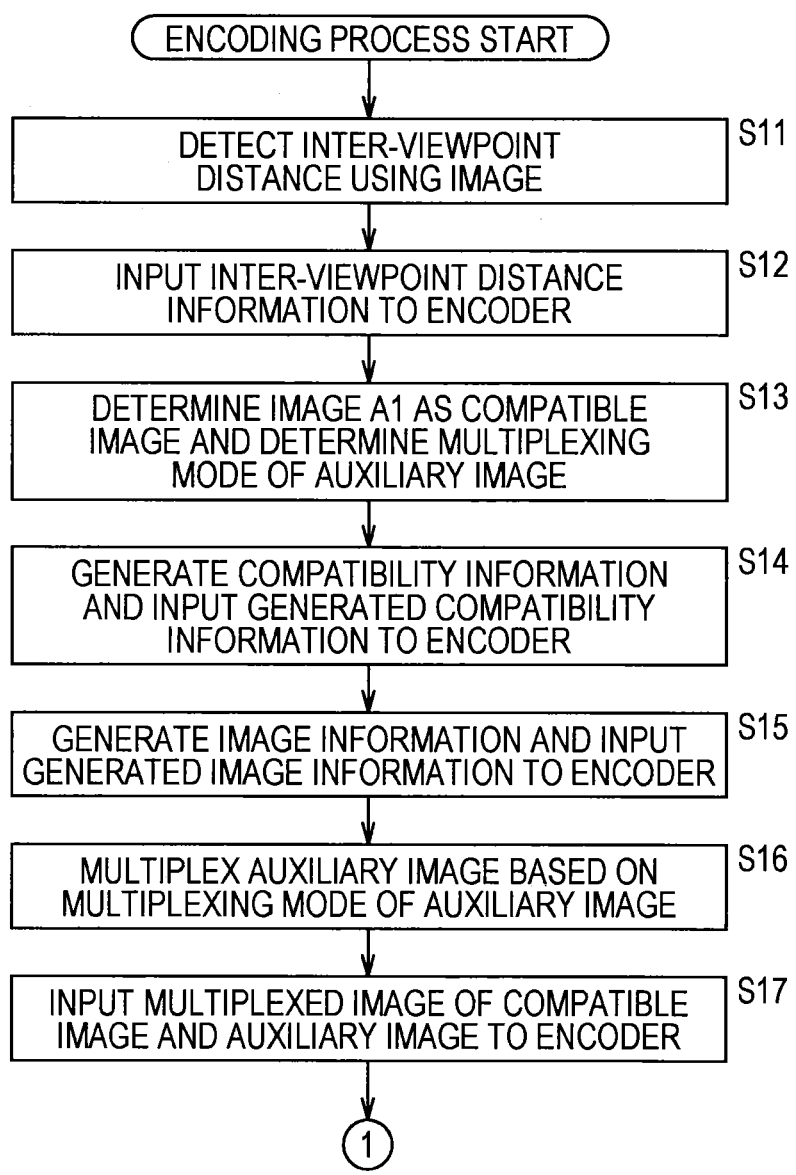
FIG. 10 is a flowchart that illustrates an encoding process performed by the encoding device illustrated in FIG. 5.
Figure 11:
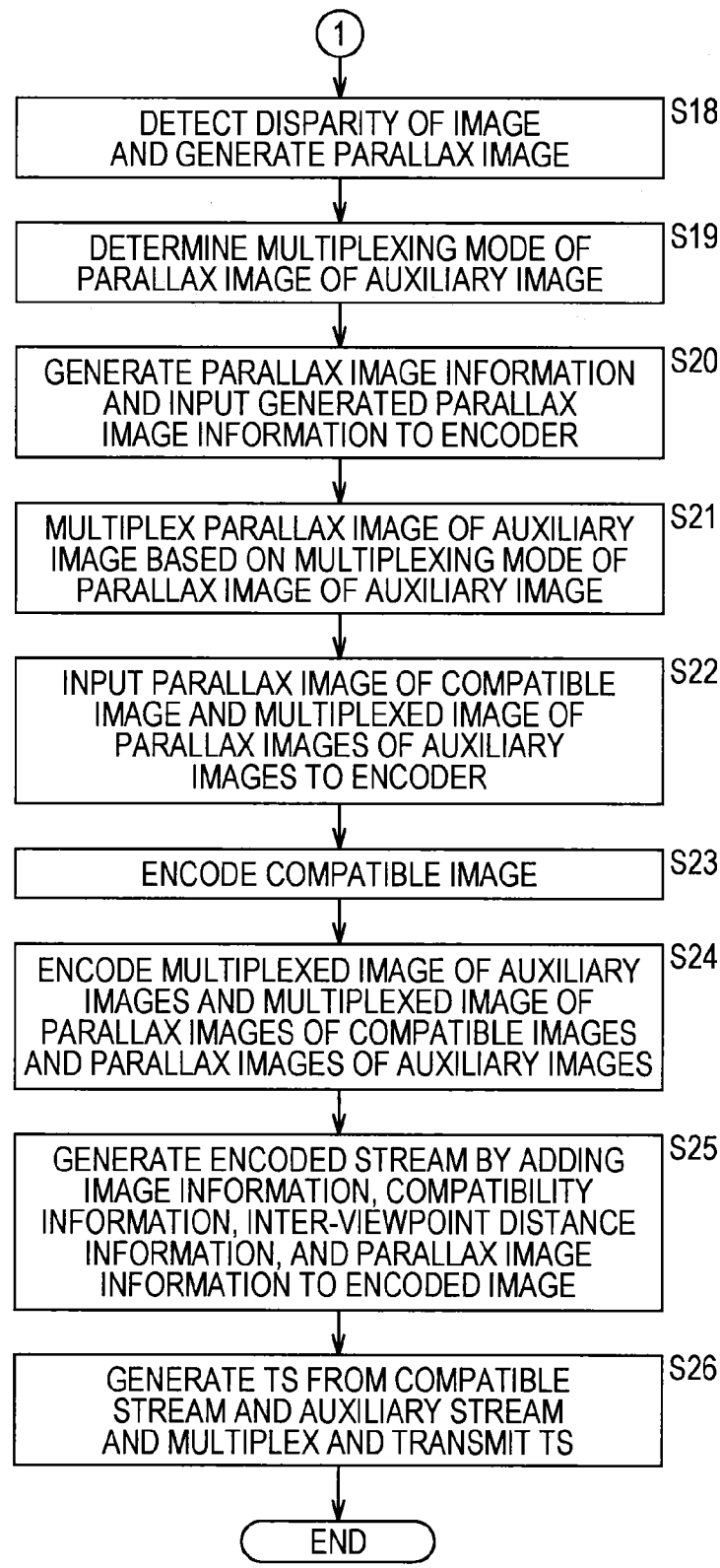
FIG. 11 is a flowchart that illustrates an encoding process performed by the encoding device illustrated in FIG. 5.

FIGS. 10 and 11 are flowcharts that illustrate an encoding process that is performed by the encoding device 50 illustrated in FIG. 5. This encoding process, for example, is started when the images A1 to C1 are output from the imaging units 51A to 51C.

In Step S11 illustrated in FIG. 10, the inter-viewpoint distance information generating unit 56 detects distances $\Delta d1_{AB}$ and $\Delta d1_{AC}$ as inter-viewpoint distances using the images A1 to C1 that are supplied from the imaging units 51A to 51C.

In Step S12, the inter-viewpoint distance information generating unit 56 generates information that represents the inter-viewpoint distances detected in Step S11 and the like as inter-viewpoint distance information and inputs the generated inter-viewpoint distance information to the encoder 58.

In Step S13, the image converting unit 52 determines the image A1 that is supplied from the imaging unit 51A, of which the position in the horizontal direction is located on the inner side out of the imaging units 51A to 51C, as a compatible image and determines a multiplexing mode of auxiliary images. The image converting unit 52 supplies information that designates the image A1 as a compatible image to the compatibility information generating unit 55 and supplies the multiplexing mode of the auxiliary images to the image information generating unit 54.

In Step S14, the compatibility information generating unit 55 generates the information designating the image A1 as a compatible image, a mono mode as a compatible mode, and the like as compatible image based on the information that is supplied from the image converting unit 52 and inputs the generated compatibility information to the encoder 58.

In Step S15, the image information generating unit 54 generates information that represents the multiplexing mode of auxiliary images and the like as image information based on the information that is supplied from the image converting unit 52 and inputs the generated image information to the encoder 58.

In Step S16, the image converting unit 52 sets images B1 and C1 other than the image A1 as auxiliary images and multiplexes the auxiliary images based on the multiplexing mode of auxiliary images that is determined in Step S13, thereby acquiring a multiplexed image of the auxiliary images.

In Step S17, the image converting unit 52 inputs the multiplexed image of the image A1, which is a compatible image, and the auxiliary image to the encoder 58.

In Step S18 illustrated in FIG. 11, the disparity image generating unit 53 detects the disparity of each pixel of the images A1 to C1 using the images A1 to C1 that are supplied from the imaging units 51A to 51C and generates disparity images A1' to C1'.

In Step S19, the disparity image generating unit 53 determines a multiplexing mode of the disparity images of auxiliary images and supplies information that represents the multiplexing mode to the disparity image information generating unit 57.

In Step S20, the disparity image information generating unit 57 generates information that represents the multiplexing mode of the disparity images of auxiliary images and the like as disparity image information based on the information that is supplied from the disparity image generating unit 53 and inputs the generated disparity image information to the encoder 58.

In Step S21, the disparity image generating unit 53 multiplexes the disparity images of the auxiliary images based on the multiplexing mode of the disparity images of the auxiliary images that is determined in Step S19, thereby acquiring a multiplexed image of the disparity images of the auxiliary images.

In Step S22, the disparity image generating unit 53 inputs the disparity image A1' of the compatible image and the multiplexed image of the disparity images of the auxiliary images to the encoder 58.

In Step S23, the compatible encoder 61 of the encoder 58 encodes the image A1 that is a compatible image supplied from the image converting unit 52 in accordance with the existing AVC mode and supplies an encoded stream acquired as a result thereof to the multiplexing unit 59 as a compatible stream.

In Step S24, the auxiliary encoder 62 encodes the multiplexed image of the auxiliary images that is supplied from the image converting unit 52, the disparity image A1' of the compatible image that is supplied from the disparity image generating unit 53, and the multiplexed image of the disparity images of the auxiliary images in accordance with a predetermined mode.

In Step S25, the auxiliary encoder 62 adds the image information supplied from the image information generating unit 54, the compatibility information supplied from the compatibility information generating unit 55, the inter-viewpoint distance information supplied from the inter-viewpoint distance information generating unit 56, the disparity image information supplied from the disparity image information generating unit 57, and the like to the encoded image that is acquired as a result of the encoding process by a process of Step S24, thereby generating an encoded stream. The auxiliary encoder 62 supplies the encoded stream to the multiplexing unit 59 as an auxiliary stream.

In Step S26, the multiplexing unit 59 generates TSs, respectively, from the compatible stream that is supplied from the compatible encoder 61 and the auxiliary stream that is supplied from the auxiliary encoder 62, multiplexes the generated TSs, and transmits a resultant stream. Then, the process ends.

As above, since the encoding device 50 performs encoding in accordance with an existing encoding mode with an image of one viewpoint that is included in the multi-viewpoint image set as a compatible image, the compatibility with an existing encoding device that encodes a 2D image can be secured. In other words, the encoding device 50 can perform encoding for multi-viewpoint images in accordance with a mode that has compatibility with an existing encoding mode.

In addition, since the encoding device 50 encodes the images A1 to C1 of three viewpoints, a decoding device that corresponds to the encoding device 50 can generate multi-viewpoint images from the images A1 to C1 of three viewpoints. In this way, according to the decoding device, compared to a case where multi-viewpoint images are generated from images of two viewpoints, the viewpoints of images that can be generated are not limited, and multi-viewpoint images having relatively high precision can be generated.

Furthermore, since the encoding device 50 encodes images with the resolution of the auxiliary images being lowered, the processing cost of the encoding process and the decoding process can be lower than that of a case where encoding is performed without lowering the resolution. For example, in a case where auxiliary images of two viewpoints are encoded without lowering the resolution thereof, while the processing cost of the encoding process and the decoding process is the same as that of an encoding process and a decoding process for two HD images, the processing cost of the encoding process for auxiliary images of two viewpoints, which is performed by the encoding device 50, is the same as the processing cost of the encoding process or the decoding process for one HD image. As a result, it can be prevented that the performance of the decoding process performed by the decoding device greatly affects the image quality of multi-viewpoint images.

Furthermore, when multi-viewpoint images are synthesized, as will be described later, a decoding device that corresponds to the encoding device 50 lowers the resolution at the rate of the reciprocal of the number of viewpoints of the multi-viewpoint images, whereby the lowering of the resolution of the auxiliary images that is performed by the encoding device 50 does not affect the image quality of the multi-viewpoint images after the synthesis.

In addition, since the encoding device 50 performs encoding with the resolution of auxiliary images being halved and encodes the disparity images of the auxiliary images while being halved, the amount of information of an encoding target can be configured to be approximately an amount that corresponds to 4 HD images (1080i×4) in the AVC mode.

Here, in comprehensive view of the processing speed, the processing performance with respect to power consumption, a transmission data rate, a transmission bandwidth, a bandwidth of a memory, a memory access speed, and the like of a current display device that displays multi-viewpoint images and a decoding device according thereto, a value that is adequate as the amount of information that can be processed by the decoding device is considered to be about two times an amount that corresponds to an HD image in the current state of the MVC mode, that is, an amount that corresponds to 4 HD images in the AVC mode. Accordingly, a decoding device (decoding method) that corresponds to the encoding device 50 of which the amount of information of the encoding target is about an amount that corresponds to 4 HD images (1080i×4) in the AVC mode can be realized at a reasonable processing cost by a reasonable approach.

In addition, according to the encoding device 50, the amount of information of the encoding target is reduced to an amount that corresponds to about 4 HD images (1080i×4) in the AVC mode, and accordingly, the encoding device can be easily operated as a BD or a broadcast application that has a limitation of a usable bandwidth.

Furthermore, since the encoding device 50 generates disparity images and transmits the disparity images while being included in an encoded stream, a decoding device that corresponds to the encoding device 50 does not need to generate a disparity image for generating multi-viewpoint images, and accordingly, the processing load of the decoding device can be reduced. As a result, the cost of the decoding device can be reduced. In addition, it can be prevented that the disparity detecting performance of the decoding device greatly affects the image quality of multi-viewpoint images.

In view of the situations of the display device and the decoding device as described above, a main object of the present technology is, by using various kinds of information such as the compatibility information on the premise of restrictions in consideration of a valid processing cost and a reasonable realization technique, to realize the generation of a multi-viewpoint image having an improved image quality with high efficiency while the compatibility with an existing format is secured.

[Configuration Example of Decoding Device]

Figure 12:
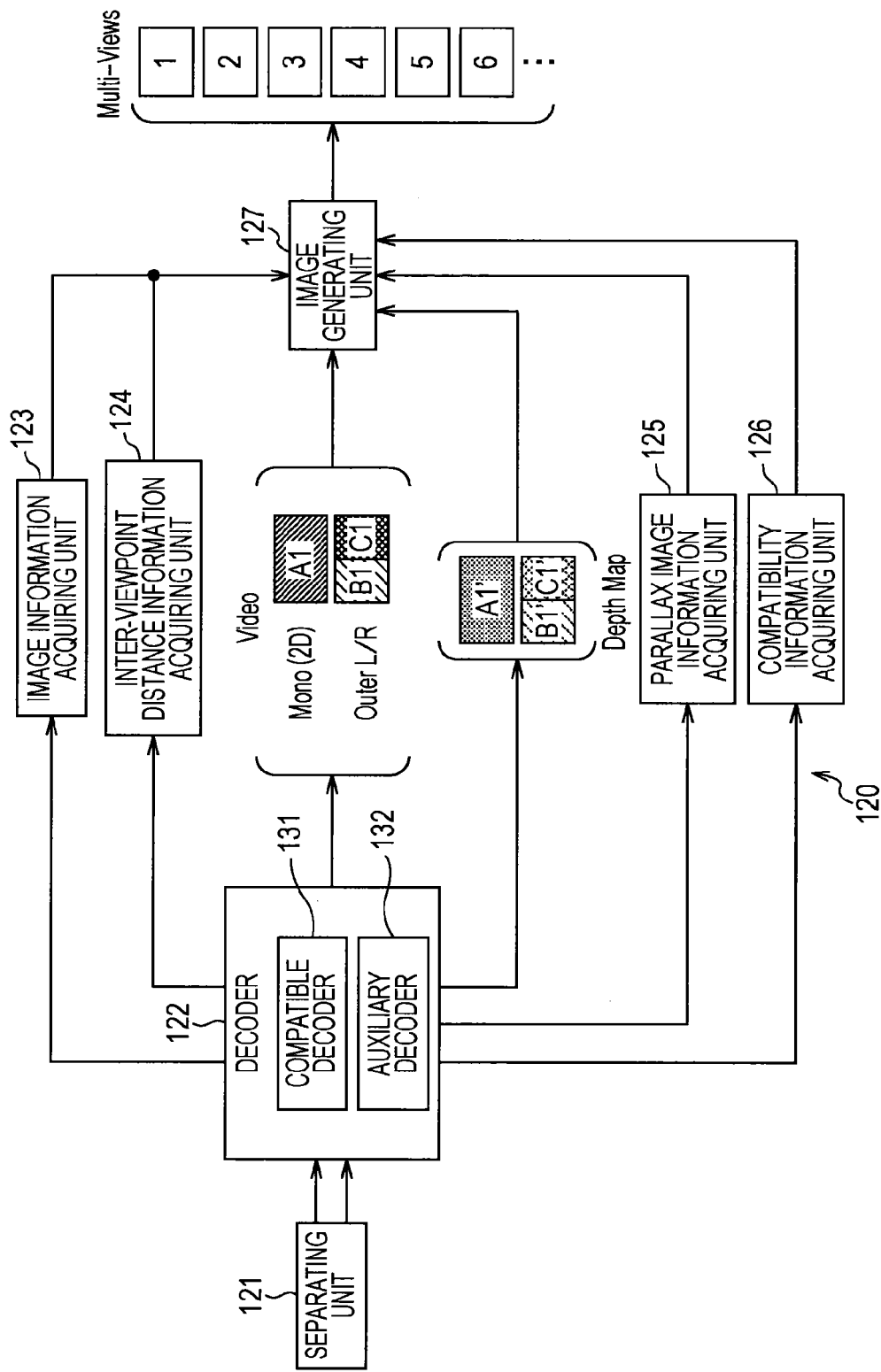
FIG. 12 is a diagram that illustrates a configuration example of a decoding device that corresponds to the encoding device illustrated in FIG. 5.

FIG. 12 is a diagram that illustrates a configuration example of a decoding device that decodes a multiplexed stream that is transmitted from the encoding device 50 illustrated in FIG. 5.

The decoding device 120 illustrated in FIG. 12 is configured by a separation unit 121, a decoder 122, an image information acquiring unit 123, an inter-viewpoint distance information acquiring unit 124, a disparity image information acquiring unit 125, a compatibility information acquiring unit 126, and an image generating unit 127. The decoding device 120 decodes a multiplexed stream that is transmitted from the encoding device 50, generates an image of one viewpoint or images of viewpoints, and displays the generated image on a display device that is not illustrated in the figure.

More specifically, the separation unit 121 (reception unit) of the decoding device 120 receives a multiplexed stream that is transmitted from the encoding device 50 and separates each TS. The separation unit 121 extracts a compatible stream and an auxiliary stream from the separated TSs and supplies the extracted streams to the decoder 122.

The decoder 122 is configured by a compatible decoder 131 and an auxiliary decoder 132. The compatible decoder 131 (compatible image decoding unit) of the decoder 122 identifies the compatible stream out of the compatible stream and the auxiliary stream supplied from the separation unit 121 based on the information used for specifying the compatible stream that is supplied from the auxiliary decoder 132. The compatible decoder 131 decodes the encoded compatible image included in the compatible stream in accordance with a mode that corresponds to the AVC mode and supplies an image A1 that is acquired as a result thereof to the image generating unit 127.

The auxiliary decoder 132 supplies the information used for specifying the compatible stream to the compatible decoder 131 based on the compatibility information that is included in the auxiliary stream supplied from the separation unit 121. The auxiliary decoder 132 identifies the auxiliary stream out of the compatible stream and the auxiliary stream that are supplied from the separation unit 121 based on the compatibility information. The auxiliary decoder 132 (auxiliary image decoding unit) decodes the multiplexed image of auxiliary images, the disparity image A1' of the compatible image, and the multiplexed image of disparity images of the auxiliary images, which are encoded, included in the auxiliary stream that is supplied from the separation unit 121 in accordance with a mode that corresponds to the auxiliary encoder 62 illustrated in FIG. 5.

The auxiliary decoder 132 supplies the multiplexed image of the auxiliary images, the disparity image A1' of the compatible image, and the multiplexed image of the disparity images of the auxiliary images, which are acquired as a result of the decoding process, to the image generating unit 127. In addition, the auxiliary decoder 132 supplies the image information included in the auxiliary stream to the image information acquiring unit 123 and supplies the inter-viewpoint distance information to the inter-viewpoint distance information acquiring unit 124. Furthermore, the auxiliary decoder 132 supplies the disparity image information included in the auxiliary stream to the disparity image information acquiring unit 125 and supplies the compatibility information to the compatibility information acquiring unit 126.

The image information acquiring unit 123 acquires the image information that is supplied from the auxiliary decoder 132 and supplies the acquired image information to the image generating unit 127. The inter-viewpoint distance information acquiring unit 124 acquires the inter-viewpoint distance information that is supplied from the auxiliary decoder 132 and supplies the acquired inter-viewpoint distance information to the image generating unit 127.

The disparity image information acquiring unit 125 acquires the disparity image information that is supplied from the auxiliary decoder 132 and supplies the acquired disparity image information to the image generating unit 127. The compatibility information acquiring unit 126 acquires the compatibility information that is supplied from the auxiliary decoder 132 and supplies the acquired compatibility information to the image generating unit 127.

The image generating unit 127 outputs an image in accordance with an instruction supplied from a viewer and displays the image on a display device not illustrated in the figure. More specifically, the image generating unit 127 (generation unit) generates images of three or more viewpoints, which correspond to a display device not illustrated in the figure, each having the resolution that is a half of the resolution of the compatible image or the auxiliary image by using the compatible image, the multiplexed image of the auxiliary images, the disparity image of the compatible image, and the multiplexed image of the disparity images of the auxiliary images in accordance with a viewer's instruction for displaying a 3D image of multi-viewpoints based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, and the like.

More specifically, the image generating unit 127 (separation unit) separates the disparity image of each auxiliary image from the multiplexed image of the disparity images of the auxiliary images based on the information that represents a multiplexing mode of the disparity images of the auxiliary images that is included in the disparity image information supplied from the disparity image information acquiring unit 125. In addition, the image generating unit 127 separates each auxiliary image from the multiplexed image of the auxiliary images based on the information that represents a multiplexing mode of auxiliary images that is included in the image information supplied from the image information acquiring unit 123.

Furthermore, the image generating unit 127 determines the position of each viewpoint of the multi-viewpoint images to be generated based on the inter-viewpoint distance information and the number of viewpoints that corresponds to a display device not illustrated in the figure. Then, the image generating unit 127 generates the image of each viewpoint of which the position is determined by using the compatible image, each auxiliary image, the disparity image of the compatible image, and the disparity image of each auxiliary images. Then, the image generating unit 127 converts the resolution of the generated image of each viewpoint into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 127 outputs the image A1 that is the compatible image supplied from the compatible decoder 131 of the decoder 122 in accordance with a viewer's instruction for displaying a 2D image, thereby displaying the image on a display device not illustrated in the figure. Accordingly, the viewer can view the 2D image.

[Description of Process of Decoding Device]

Figure 13:
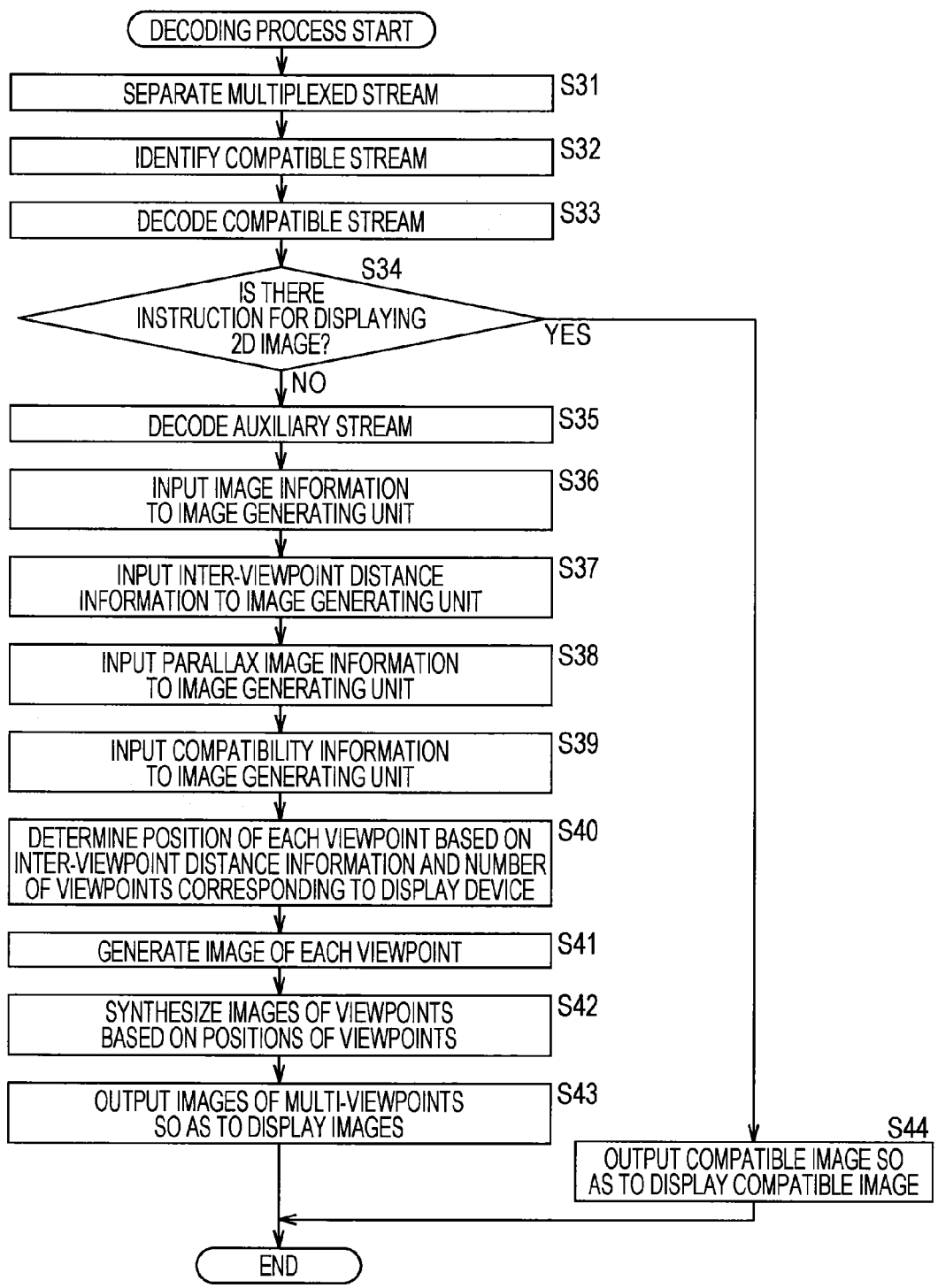
FIG. 13 is a flowchart that illustrates a decoding process performed by the decoding device illustrated in FIG. 12.

FIG. 13 is a flowchart that illustrates a decoding process performed by the decoding device 120 illustrated in FIG. 12. This decoding process, for example, is started when a multiplexed stream that is transmitted from the encoding device 50 illustrated in FIG. 5 is input to the decoding device 120.

In Step S31 illustrated in FIG. 13, the separation unit 121 of the decoding device 120 receives the multiplexed stream that is transmitted from the encoding device 50 and separates each TS. The separation unit 121 extracts the compatible stream and the auxiliary stream from the separated TS and supplies the extracted streams to the decoder 122. The auxiliary decoder 132 of the decoder 122 supplies the information used for specifying the compatible stream to the compatible decoder 131 based on the compatibility information included in the auxiliary stream that is supplied from the separation unit 121.

In Step S32, the compatible decoder 131 identifies the compatible stream out of the compatible stream and the auxiliary stream that are supplied from the separation unit 121 based on the information used for specifying the compatible stream that is supplied from the auxiliary decoder 132.

In Step S33, the compatible decoder 131 decodes the compatible image that is included in the compatible stream in accordance with a mode that corresponds to the AVC mode and supplies an image A1 that is acquired as a result of the decoding process to the image generating unit 127.

In Step S34, the image generating unit 127 determines whether or not an instruction for displaying a 2D image has been made by a viewer, as indicated by "YES" and "NO" in the flow chart. In a case where it is determined that the instruction for displaying a 2D image has not been made by the viewer in Step S34, in other words, in a case where an instruction for displaying a 3D image of the multi-viewpoint mode has been made by the viewer, the auxiliary decoder 132 identifies the auxiliary stream out of the compatible stream and the auxiliary stream that are supplied from the separation unit 121 based on the compatibility information.

In Step S35, the auxiliary decoder 132 decodes the multiplexed image of auxiliary images, the disparity image A1' of the compatible image, and the multiplexed image of the disparity images of the auxiliary images, which are encoded, included in the auxiliary stream in accordance with a mode that corresponds to the auxiliary encoder 62 illustrated in FIG. 5. The auxiliary decoder 132 supplies the multiplexed image of the auxiliary images, the disparity image A1' of the compatible image, and the multiplexed image of the disparity images of the auxiliary images that are acquired as a result of the decoding process to the image generating unit 127. In addition, the auxiliary decoder 132 supplies the image information that is included in the auxiliary stream to the image information acquiring unit 123 and supplies the inter-viewpoint distance information to the inter-viewpoint distance information acquiring unit 124. Furthermore, the auxiliary decoder 132 supplies the disparity image information that is included in the auxiliary stream to the disparity image information acquiring unit 125 and supplies the compatibility information to the compatibility information acquiring unit 126.

In Step S36, the image information acquiring unit 123 acquires the image information that is supplied from the auxiliary decoder 132 and inputs the image information to the image generating unit 127. In Step S37, the inter-viewpoint distance information acquiring unit 124 acquires the inter-viewpoint distance information that is supplied from the auxiliary decoder 132 and inputs the inter-viewpoint distance information to the image generating unit 127.

In Step S38, the disparity image information acquiring unit 125 acquires the disparity image information that is supplied from the auxiliary decoder 132 and inputs the disparity image information to the image generating unit 127. In Step S39, the compatibility information acquiring unit 126 acquires the compatibility information that is supplied from the auxiliary decoder 132 and inputs the compatibility information to the image generating unit 127.

In Step S40, the image generating unit 127 determines the position of each viewpoint of a multi-viewpoint image to be generated based on the inter-viewpoint distance information supplied from the inter-viewpoint distance information acquiring unit 124 and the number of viewpoints that corresponds to a display device not illustrated in the figure. For example, in a case where an inter-viewpoint distance that is included in the inter-viewpoint distance information is short, the image generating unit 127 also determines the position of a viewpoint that is located on the outer side of the viewpoints of images B1 and C1 as the position of a viewpoint of the multi-viewpoint 3D image to be generated. On the other hand, in a case where the inter-viewpoint distance that is included in the inter-viewpoint distance information is long, the image generating unit 127 determines only positions of viewpoints located on the inner side of the images B1 and C1 as the positions of viewpoints of the multi-viewpoint 3D image to be generated.

In Step S41, the image generating unit 127 generates images of the viewpoints each having the resolution that is a half of the resolution of the compatible image or the auxiliary image based on the position of each viewpoint determined in Step S40, the image information supplied from the image information acquiring unit 123, the disparity image information supplied from the disparity image information acquiring unit 125, the compatibility information supplied from the compatibility information acquiring unit 126, and the like by using the compatible image, the multiplexed image of the auxiliary images, the disparity image of the compatible image, and the multiplexed image of the disparity images of the auxiliary images.

In Step S42, the image generating unit 127 converts the resolution of the image of each viewpoint that is generated in Step S41 into resolution that is "1/the number of viewpoints" of the resolution of the compatible image or the auxiliary image and synthesizes the images of each viewpoint after the conversion based on the positions of the viewpoints.

In Step S43, the image generating unit 127 outputs the multi-viewpoint image after the synthesis that is acquired by the process of Step S42 to a display device that is not illustrated in the figure, thereby displaying the multi-viewpoint image such that viewing angles are different for each viewpoint. Then, the process ends.

On the other hand, in a case where it is determined that an instruction for displaying a 2D image has been made by a viewer in Step S34, in Step S44, the image generating unit 127 outputs an image A1 that is a compatible image supplied from the compatible decoder 131 to a display device not illustrated in the figure, thereby displaying the image. Then, the process ends.

In a decoding device that can decode only a compatible stream that has compatibility with the decoding device 120, the TS of the auxiliary stream is ignored, and only the processes of Steps S33 and S44 are performed.

As above, the decoding device 120 can decode a compatible stream and an auxiliary stream that are encoded in accordance with a mode having compatibility with an existing mode by the encoding device 50.

In addition, since the decoding device 120 generates a multi-viewpoint image using a compatible image of one viewpoint and an auxiliary image of two viewpoints, the encoding device 50 may prepare only two imaging units 51B and 51C in addition to the existing imaging unit 51A that captures a compatible image of one viewpoint as imaging units that generate multi-viewpoint images. Accordingly, the installation of the imaging units for generating multi-viewpoint images can be performed in an easy manner at a low cost.

Second Embodiment

[Configuration Example of Encoding Device According to Second Embodiment]

Figure 14:
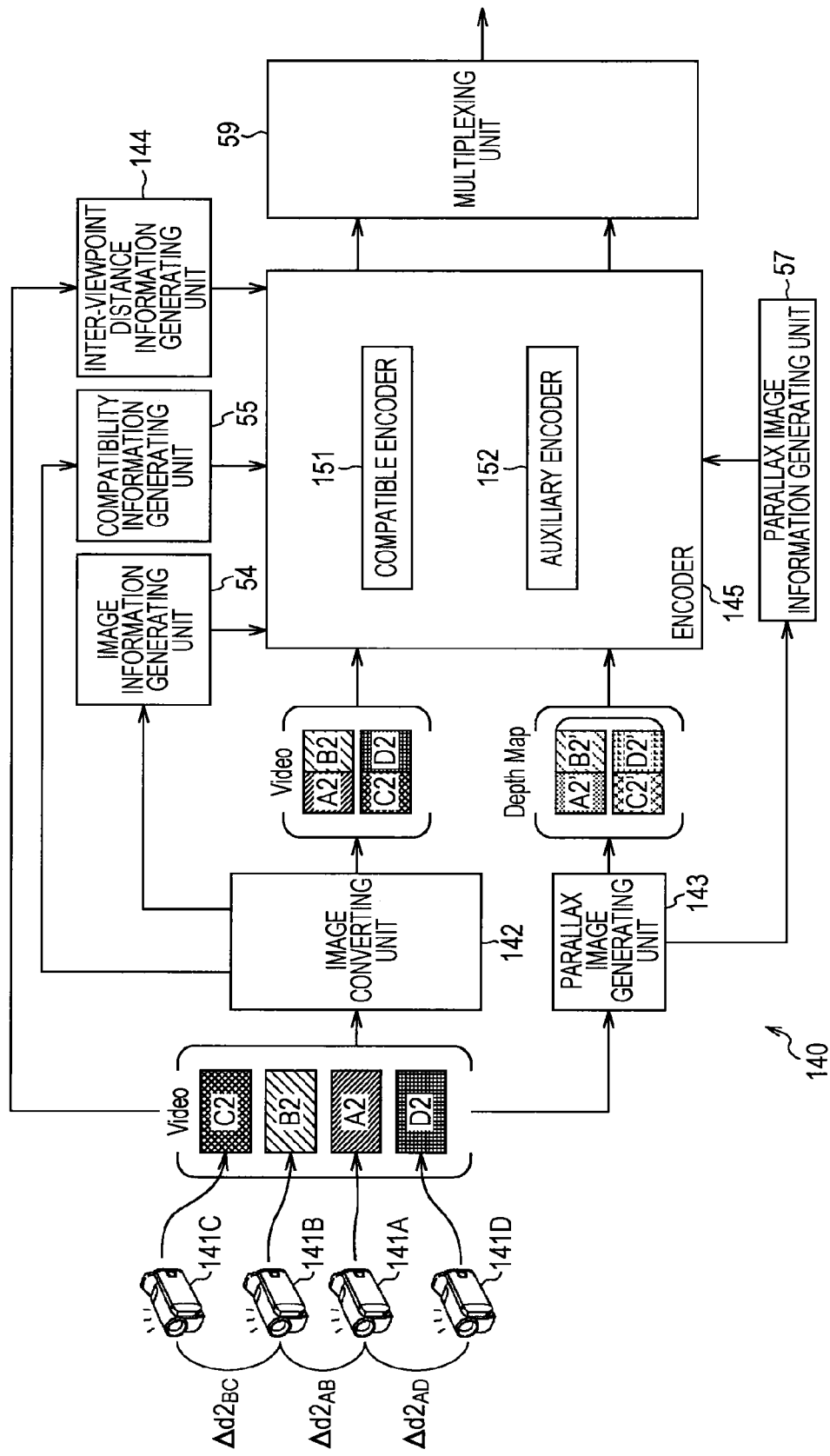
FIG. 14 is a block diagram that illustrates a configuration example of an encoding device according to a second embodiment of the present technology.

FIG. 14 is a block diagram that illustrates a configuration example of an encoding device according to a second embodiment of the present technology.

In the configuration illustrated in FIG. 14, the same reference numeral is assigned to a configuration that is the same as that illustrated in FIG. 5. Duplicate description will not be presented as is appropriate.

The configuration of the encoding device 140 illustrated in FIG. 14 is mainly different from the configuration illustrated in FIG. 5 in that imaging units 141A to 141D, an image converting unit 142, a disparity image generating unit 143, an inter-viewpoint distance information generating unit 144, and an encoder 145 are disposed instead of the imaging units 51A to 51C, the image converting unit 52, the disparity image generating unit 53, the inter-viewpoint distance information generating unit 56, and the encoder 58.

The encoding device 140 performs encoding in accordance with the AVC mode with images of two viewpoints out of multi-viewpoint images set as compatible images, thereby securing the compatibility with an existing encoding device that encodes a 3D image of the two viewpoints mode.

More specifically, the imaging unit 141A of the encoding device 140 captures an HD image of a predetermined viewpoint as an image A2 and supplies the captured image to the image converting unit 142, the disparity image generating unit 143, and the inter-viewpoint distance information generating unit 144. The imaging unit 141B captures an HD image of a viewpoint that is different from the viewpoint of the image A2 as an image B2 at a position that is separate from the imaging unit 141A by a distance $\Delta d2_{AB}$ in a horizontal direction and supplies the captured image to the image converting unit 142, the disparity image generating unit 143, and the inter-viewpoint distance information generating unit 144.

The imaging unit 141C captures an HD image of a viewpoint different from the viewpoints of the images A2 and B2 as an image C2 at a position separate from the imaging unit 141B by a distance $\Delta d2_{BC}$ in the horizontal direction that is opposite to the imaging unit 141A and supplies the captured image to the image converting unit 142, the disparity image generating unit 143, and the inter-viewpoint distance information generating unit 144. The imaging unit 141D captures an HD image of a viewpoint different from the viewpoints of the images A2 to C2 as an image D2 at a position separate from the imaging unit 141A by a distance $\Delta d2_{AD}$ in the horizontal direction that is opposite to the imaging unit 141B and supplies the captured image to the image converting unit 142, the disparity image generating unit 143, and the inter-viewpoint distance information generating unit 144.

The viewpoints that correspond to the images C2 and D2 are viewpoints that are located on the outer side out of viewpoints of images that can be recognized as 3D images. In this way, a decoding device that corresponds to the encoding device 140 can generate multi-viewpoint images by interpolating images of viewpoints located on the further inner side than the viewpoints of the images C2 and D2 by using the images A2 to D2. As a result, the multi-viewpoint images can be generated with precision that is higher than that of a case where images of viewpoints located on the outer side are interpolated using images of viewpoints located on the inner side. The distances $\Delta d2_{AB}$, $\Delta d2_{BC}$, and $\Delta d2_{AD}$ may be configured to be either fixed or changed each time.

The image converting unit 142 determines the image A2 that is supplied from the imaging unit 141A of which the position in the horizontal direction is located on the inner side out of the imaging units 141A to 141D and the image B2 that is supplied from the imaging unit 141B as compatible images. Then, the image converting unit 142 multiplexes the images A2 and B2 that are the compatible images in accordance with a predetermined multiplexing mode and supplies the multiplexed image to the encoder 145. In addition, the image converting unit 142 supplies information that designates the images A2 and B2 as compatible images to the compatibility information generating unit 55.

In addition, the image converting unit 142 sets the images C2 and D2 other than the images A2 and B2 as auxiliary images and multiplexes the images C2 and D2 in accordance with a predetermined multiplexing mode. The image converting unit 142 supplies a multiplexed image that is acquired as a result of the multiplexing process to the encoder 145. The image converting unit 142 supplies information that represents a multiplexing mode of compatible images and auxiliary images to the image information generating unit 54.

The disparity image generating unit 143 detects the disparity of each pixel of the images A2 to D2 using the images A2 to D2 that are supplied from the imaging units 141A to 141D. The disparity image generating unit 143 generates a disparity image A2' that represents the disparity of each pixel of the image A2 that is a compatible image and a disparity image B2' that represents the disparity of each pixel of the image B2 and multiplexes the disparity images A2' and B2' in accordance with a predetermined multiplexing mode. The disparity image generating unit 143 supplies a multiplexed image that is acquired as a result thereof to the encoder 145.

In addition, the disparity image generating unit 143 generates a disparity image C2' that represents the disparity of each pixel of the image C2 that is an auxiliary image and a disparity image D2' that represents the disparity of each pixel of the image D2 that is an auxiliary image and multiplexes the disparity images C2' and D2' in accordance with a predetermined multiplexing mode. The disparity image generating unit 143 supplies a multiplexed image that is acquired as a result thereof to the encoder 145. The disparity image generating unit 143 supplies information that represents the multiplexing mode of disparity images of compatible images and auxiliary images to the disparity image information generating unit 57.

The inter-viewpoint distance information generating unit 144 detects each inter-viewpoint distance between the images A2 to D2 using the images A2 to D2 that are supplied from the imaging units 141A to 141D. For example, the inter-viewpoint distance information generating unit 144 detects a distance $\Delta d2_{AB}$ between the imaging units 141A and 141B in the horizontal direction, a distance $\Delta d2_{BC}$ between the imaging units 141B and 141C in the horizontal direction, and a distance $\Delta d2_{AD}$ between the imaging units 141A and 141D in the horizontal direction as inter-viewpoint distances. The inter-viewpoint distance information generating unit 144 generates information that represents the inter-viewpoint distances and the like as inter-viewpoint distance information and supplies the generated inter-viewpoint distance information to the encoder 145.

The encoder 145 is configured by a compatible encoder 151 and an auxiliary encoder 152. The compatible encoder 151 designates a multiplexed image of the compatible images out of the multiplexed image of the compatible images and the multiplexed image of the auxiliary images that are supplied from the image converting unit 142, encodes the multiplexed image of the compatible images in accordance with the existing AVC mode, adds various kinds of information thereto, and supplies an acquired resultant encoded stream to the multiplexing unit 59 as a compatible stream.

The auxiliary encoder 152 encodes the multiplexed image of the auxiliary images that is supplied from the image converting unit 142, and the multiplexed image of the disparity images of the compatible images and the multiplexed image of the disparity images of the auxiliary images that are supplied from the disparity image generating unit 143 in accordance with a predetermined mode. As the encoding mode employed by the auxiliary encoder 152, for example, the AVC mode, the MVC mode, or the like can be used.

In addition, the auxiliary encoder 152 adds the image information supplied from the image information generating unit 54, the compatibility information supplied from the compatibility information generating unit 55, the inter-viewpoint distance information supplied from the inter-viewpoint distance information generating unit 144, the disparity image information supplied from the disparity image information generating unit 57, and the like, to an encoded image that is acquired as a result of the encoding process, thereby generating an encoded stream. The auxiliary encoder 152 supplies the encoded stream to the multiplexing unit 59 as an auxiliary stream.

[Description of Process of Encoding Device]

Figure 15:
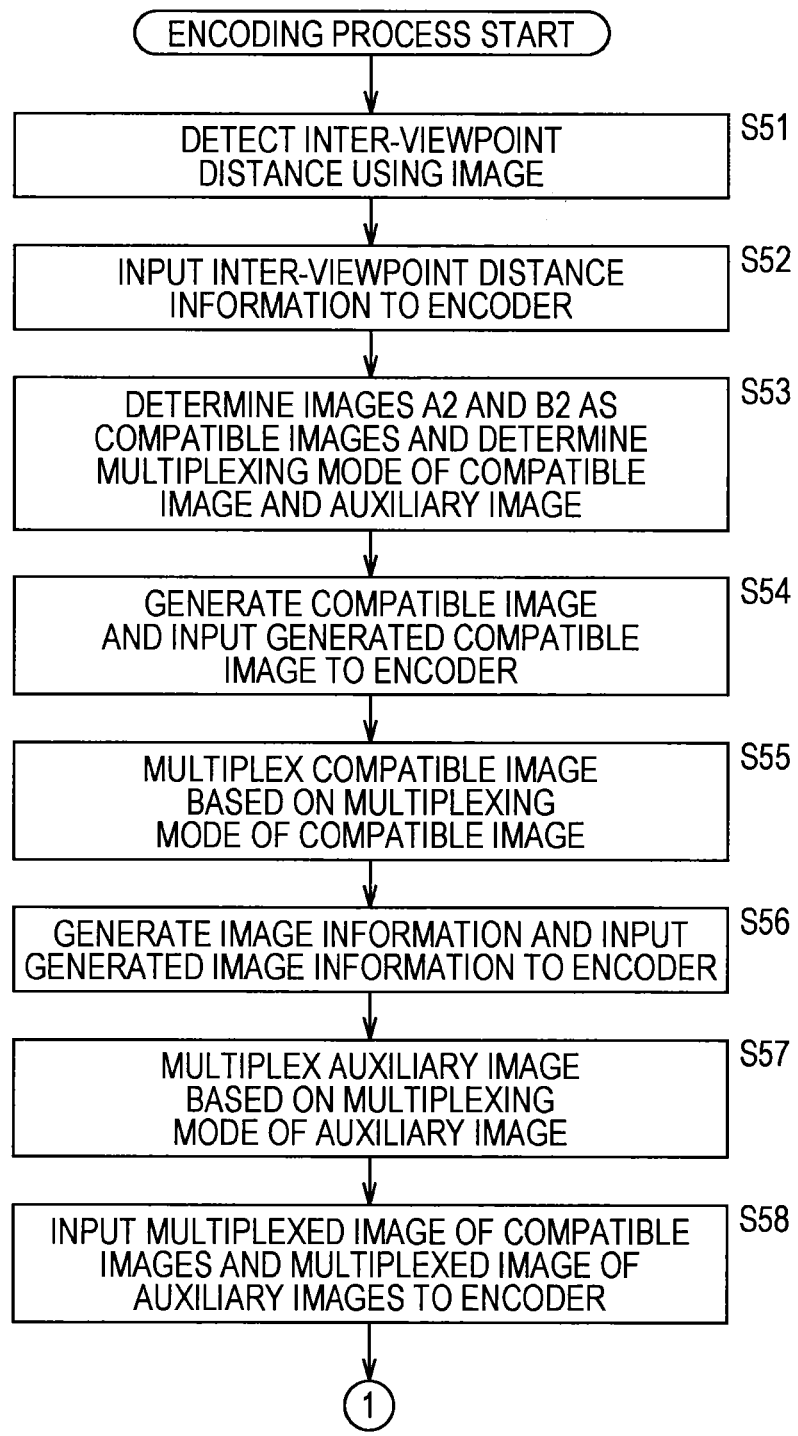
FIG. 15 is a flowchart that illustrates an encoding process performed by the encoding device illustrated in FIG. 14.
Figure 16:
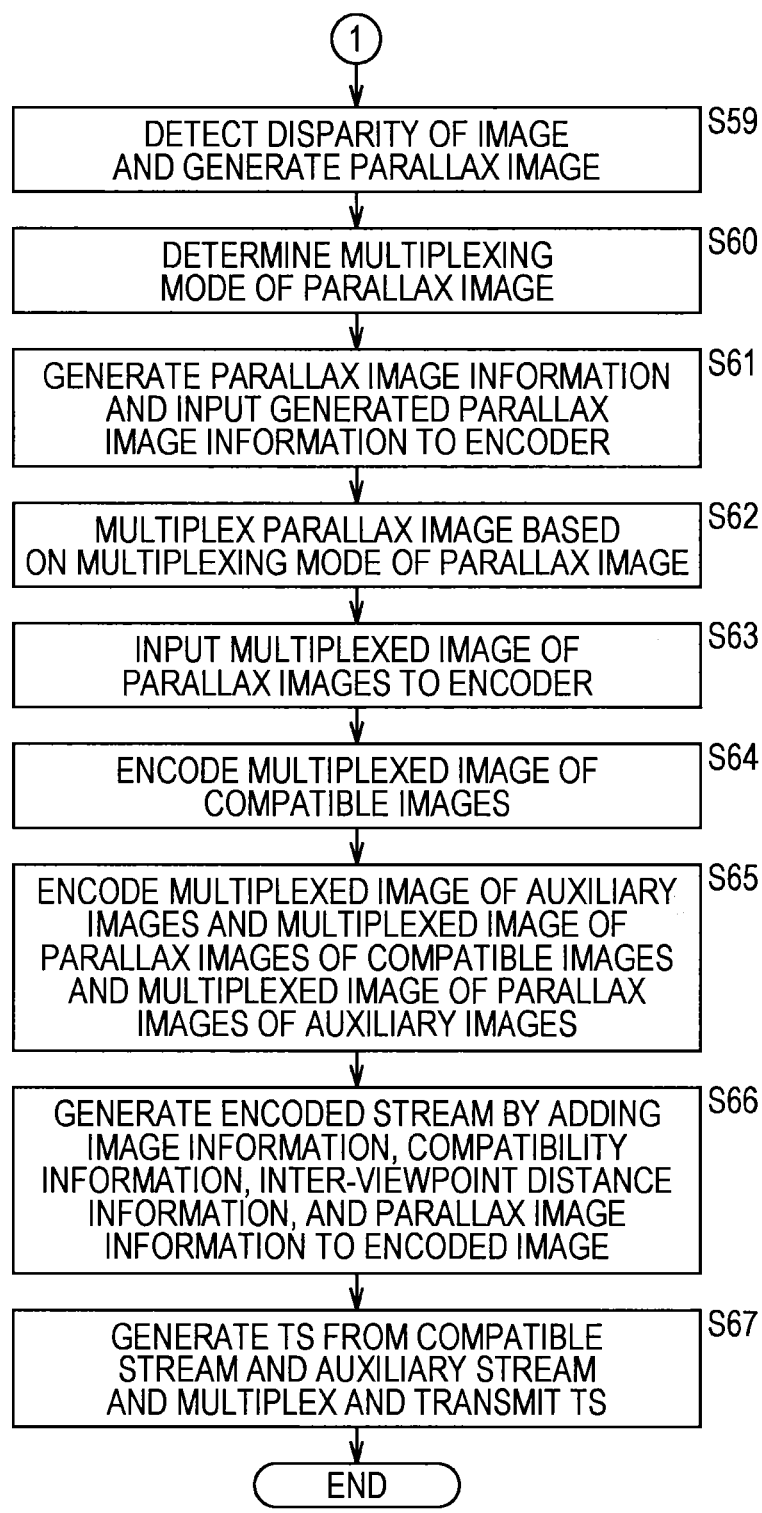
FIG. 16 is a flowchart that illustrates an encoding process performed by the encoding device illustrated in FIG. 14.

FIGS. 15 and 16 represent a flowchart that illustrates an encoding process that is performed by the encoding device 140 illustrated in FIG. 14. This encoding process, for example, is started when the images A2 to D2 are output from the imaging units 141A to 141D.

In Step S51 illustrated in FIG. 15, the inter-viewpoint distance information generating unit 144 detects distances $\Delta d2_{AB}$, $\Delta d2_{BC}$, and $\Delta d2_{AD}$ as inter-viewpoint distances using the images A2 to D2 that are supplied from the imaging units 141A to 141D.

In Step S52, the inter-viewpoint distance information generating unit 144 generates information that represents the inter-viewpoint distances detected in Step S51 and the like as inter-viewpoint distance information and inputs the generated inter-viewpoint distance information to the encoder 145.

In Step S53, the image converting unit 142 determines the image A2 that is supplied from the imaging unit 141A, of which the position in the horizontal direction is located on the inner side out of the imaging units 141A to 141D, and the image B2 that is supplied from the imaging unit 141B as compatible images, and determines multiplexing modes of the compatible images and the auxiliary images. The image converting unit 142 supplies information that designates the images A2 and B2 as compatible images to the compatibility information generating unit 55 and supplies the multiplexing modes of the compatible images and the auxiliary images to the image information generating unit 54.

In Step S54, the compatibility information generating unit 55 generates the information designating the images A2 and B2 as compatible images, a frame packing mode as a compatible mode, and the like as compatibility information based on the information that is supplied from the image converting unit 142 and inputs the generated compatibility information to the encoder 145.

In Step S55, the image converting unit 142 multiplexes the images A2 and B2 that are compatible images based on the multiplexing mode of compatible images that is determined in Step S53 and supplies the multiplexed image to the encoder 145.

In Step S56, the image information generating unit 54 generates information that represents the multiplexing modes of compatible images and auxiliary images and the like as image information based on the information that is supplied from the image converting unit 142 and inputs the generated image information to the encoder 145.

In Step S57, the image converting unit 142 sets images C2 and D2 other than the images A2 and B2 as auxiliary images and multiplexes the auxiliary images based on the multiplexing mode of auxiliary images that is determined in Step S53, thereby acquiring a multiplexed image of the auxiliary images.

In Step S58, the image converting unit 142 inputs the multiplexed image of the compatible images and the multiplexed image of the auxiliary images to the encoder 145.

In Step S59 illustrated in FIG. 16, the disparity image generating unit 143 detects the disparity of each pixel of the images A2 to D2 using the images A2 to D2 that are supplied from the imaging units 141A to 141D and generates disparity images A2' to D2'.

In Step S60, the disparity image generating unit 143 determines multiplexing modes of the disparity images of the compatible images and the disparity images of the auxiliary images and supplies information that represents the multiplexing modes to the disparity image information generating unit 57.

In Step S61, the disparity image information generating unit 57 generates information that represents the multiplexing modes of the disparity images of the compatible images and the disparity images of the auxiliary images and the like as disparity image information based on the information that is supplied from the disparity image generating unit 143 and inputs the generated disparity image information to the encoder 145.

In Step S62, the disparity image generating unit 143 multiplexes the disparity images A2' and B2' of the compatible images based on the multiplexing mode of the disparity images of compatible images that is determined in Step S60 and multiplexes the disparity images C2' and D2' of the auxiliary images based on the multiplexing mode of the disparity images of auxiliary images.

In Step S63, the disparity image generating unit 143 inputs the multiplexed image of the disparity images of the compatible images and the multiplexed image of the disparity images of the auxiliary images that are acquired as a result of the multiplexing process illustrated in Step S62 to the encoder 145.

In Step S64, the compatible encoder 151 of the encoder 145 encodes the multiplexed image of the compatible images that is supplied from the image converting unit 142 in accordance with the existing AVC mode and supplies an encoded stream acquired as a result thereof to the multiplexing unit 59 as a compatible stream.

In Step S65, the auxiliary encoder 152 encodes the multiplexed image of the auxiliary images that is supplied from the image converting unit 142 and the multiplexed image of the disparity images of the compatible images and the multiplexed image of the disparity images of the auxiliary images that are supplied from the disparity image generating unit 53 in accordance with a predetermined mode. Then, the process proceeds to Step S66.

The process of Steps S66 and S67 is the same as the process of Steps S25 and S26 illustrated in FIG. 11, and thus the description thereof will not be presented.

As above, since the encoding device 140 encodes images of two viewpoints out of multi-viewpoint images as compatibles image in accordance with an existing encoding mode, the compatibility with an existing encoding device that encodes a 3D image of the two-viewpoint mode can be secured.

In addition, since the encoding device 140 encodes the images A2 to D2 of four viewpoints, a decoding device that corresponds to the encoding device 140 can generate multi-viewpoint images from the images A2 to D2 of four viewpoints. In this way, according to the decoding device, compared to a case where multi-viewpoint images are generated from images of two viewpoints, the viewpoints of images that can be generated are not limited, and multi-viewpoint images having relatively high precision can be generated.

[Configuration Example of Decoding Device]

Figure 17:
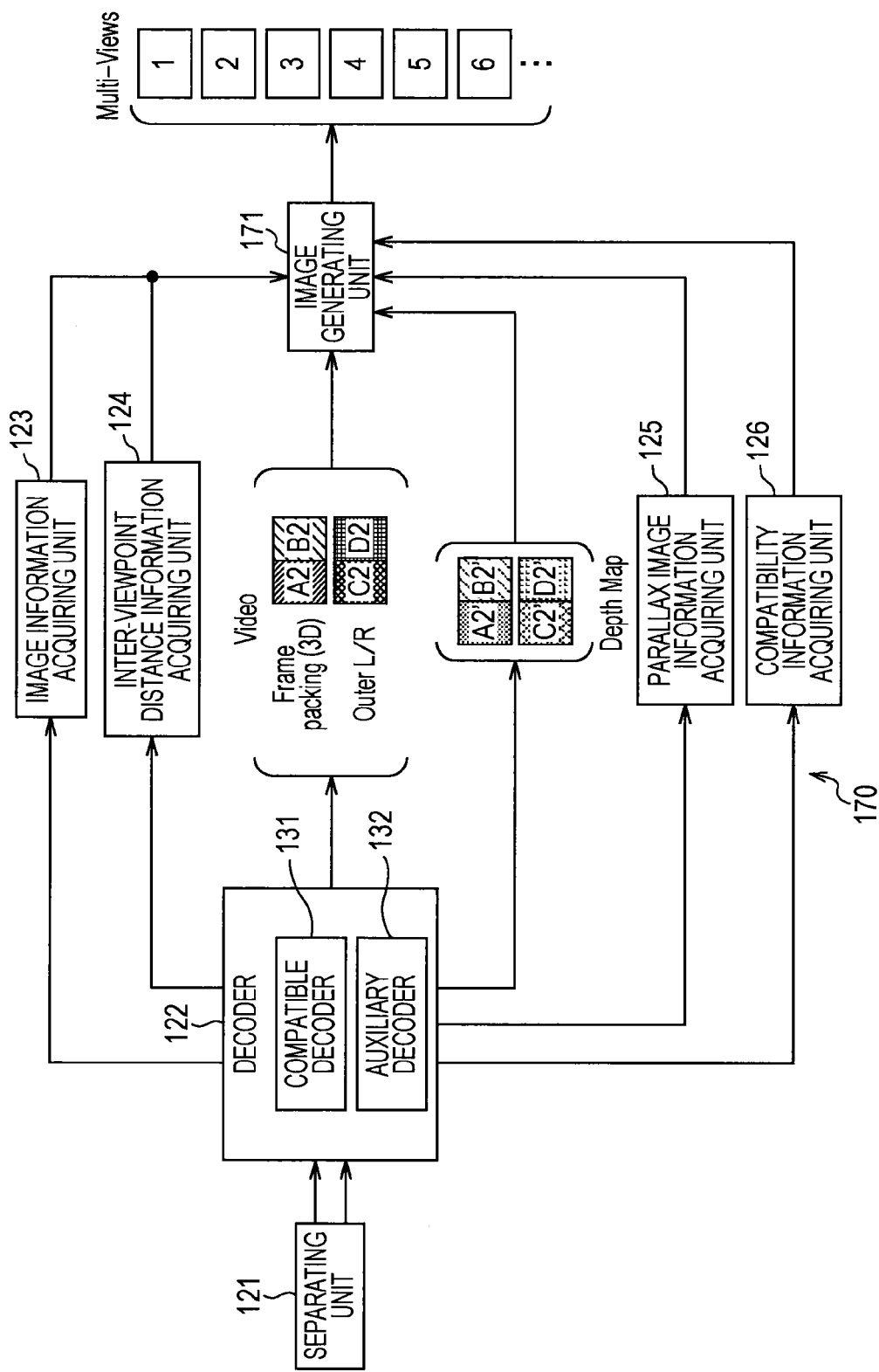
FIG. 17 is a diagram that illustrates a configuration example of a decoding device that corresponds to the encoding device illustrated in FIG. 14.

FIG. 17 is a diagram that illustrates a configuration example of a decoding device that decodes the multiplexed stream transmitted from the encoding device 140 illustrated in FIG. 14.

In the configuration illustrated in FIG. 17, the same reference numeral is assigned to a configuration that is the same as that illustrated in FIG. 12. Duplicate description will not be presented as is appropriate.

The configuration of the decoding device 170 illustrated in FIG. 17 is mainly different from the configuration illustrated in FIG. 12 in that an image generating unit 171 is disposed instead of the image generating unit 127. The decoding device 170 generates images of two viewpoints or multi-viewpoint images by decoding the multiplexed stream that is transmitted from the encoding device 140 and displays the generated images on a display device not illustrated in the figure.

More specifically, the image generating unit 171 of the decoding device 170 outputs images in accordance with a display instruction supplied from a viewer, thereby displaying the images on a display device (not illustrated). When described in more detail, the image generating unit 171 generates images of three or more viewpoints, which correspond to a display device (not illustrated), each having the resolution that is a half of the resolution of the compatible image or the auxiliary image by using the multiplexed image of the compatible images, the multiplexed image of the auxiliary images, the multiplexed image of the disparity images of the compatible images, and the multiplexed image of the disparity images of the auxiliary images in accordance with a viewer's instruction for displaying a 3D image of multi-viewpoint mode based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, and the like.

More specifically, the image generating unit 171 separates the disparity image of each auxiliary image from the multiplexed image of the disparity images of the auxiliary images based on the information that represents a multiplexing mode of the disparity images of the auxiliary images that is included in the disparity image information supplied from the disparity image information acquiring unit 125. In addition, the image generating unit 171 separates the disparity image of each compatible image from the multiplexed image of the disparity images of the compatible images based on the information, which represents the multiplexing mode of the disparity images of the compatible images, included in the disparity image information.

Furthermore, the image generating unit 171 separates each auxiliary image from the multiplexed image of the auxiliary images based on the information that represents a multiplexing mode of the auxiliary images that is included in the image information supplied from the image information acquiring unit 123. In addition, the image generating unit 171 separates each compatible image from the multiplexed image of the compatible images based on the information that represents a multiplexing mode of the compatible images that is included in the image information.

Furthermore, the image generating unit 171 determines the position of each viewpoint of the multi-viewpoint images to be generated based on the inter-viewpoint distance information and the number of viewpoints that corresponds to a display device not illustrated in the figure. Then, the image generating unit 171 generates the image of each viewpoint of which the position is determined by using each compatible image, each auxiliary image, the disparity image of each compatible image, and the disparity image of each auxiliary image. Then, the image generating unit 171 converts the resolution of the generated multi-viewpoint images into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 171 separates the multiplexed image of the compatible images that is supplied from the decoder 122 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 171 alternately outputs the separated images A2 and B2 of which the resolution is a half of the resolution of the compatible image, thereby displaying the separated images on a display device not illustrated in the figure. At this time, the viewer can view a 3D image by wearing glasses in which one of a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 18:
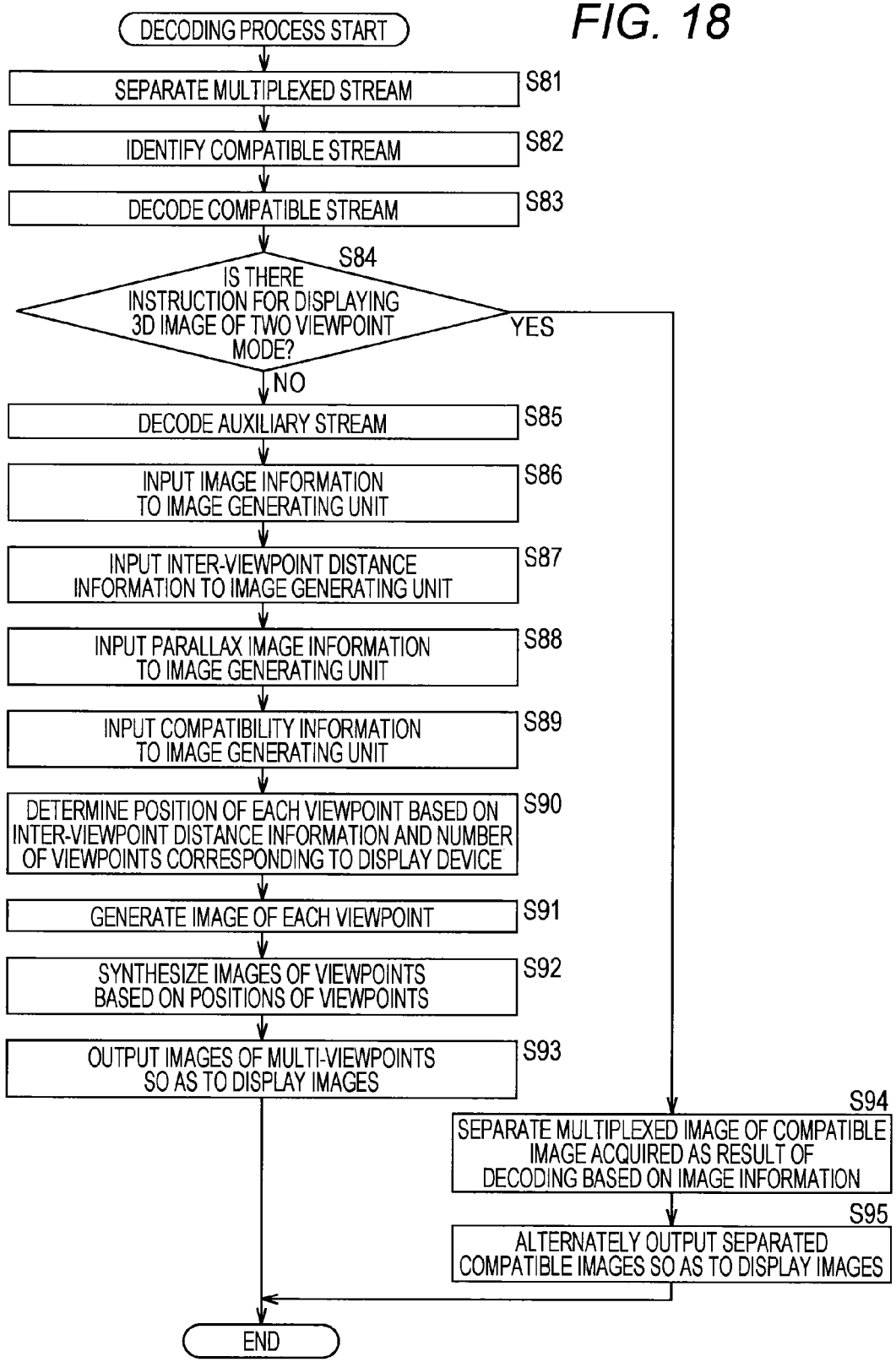
FIG. 18 is a flowchart that illustrates a decoding process performed by the decoding device illustrated in FIG. 17.

FIG. 18 is a flowchart that illustrates a decoding process performed by the decoding device 170 illustrated in FIG. 17. This decoding process, for example, is started when a multiplexed stream that is transmitted from the encoding device 140 illustrated in FIG. 14 is input to the decoding device 170.

The process of Steps S81 to S83 illustrated in FIG. 18 is the same as the process of Steps S31 to S33 illustrated in FIG. 13, and thus the description thereof will not be presented.

After the process of Step S83, in Step S84, the image generating unit 171 determines whether or not an instruction for displaying a 3D image of the two-viewpoint mode has been made by a viewer, as indicated by "YES" and "NO" in the flow chart. In a case where it is determined that the instruction for displaying a 3D image of the two-viewpoint mode has not been made by the viewer in Step S84, in other words, in a case where an instruction for displaying a 3D image of the multi-viewpoint mode has been made, the process proceeds to Step S85. The process of Steps S85 to S93 is the same as the process of Steps S35 to S43 illustrated in FIG. 13, and thus the description thereof will not be presented.

On the other hand, in a case where it is determined that the instruction for displaying a 3D image of the two-viewpoint mode has been made by the viewer in Step S84, the process proceeds to Step S94.

In Step S94, the image generating unit 171 separates the multiplexed image of the compatible images that is acquired as result of the decoding process performed by the compatible decoder 131 based on the information that represents a multiplexing mode of the compatible image that is included in the image information supplied from the image information acquiring unit 123.

In Step S95, the image generating unit 171 alternately outputs the images A2 and B2 that are the compatible images, of which the resolution is a half of the resolution of the separated compatible image to a display device not illustrated in the figure, thereby displaying the images. Then, the process ends.

In addition, in a decoding device that can decode only a compatible stream that has compatibility with the decoding device 170, a TS of the auxiliary stream is ignored, and only the process of Steps S83, S94, and S95 is performed. However, in such a case, in the process of Step S94, a multiplexed image of compatible images is separated based on not the multiplexing mode of the compatible image that is included in the image information but the multiplexing mode of the compatible image that is determined in advance.

As above, the decoding device 170 can decode a compatible stream and an auxiliary stream that are encoded by the encoding device 140 in accordance with a mode that has compatibility with an existing mode.

In addition, since the decoding device 170 generates multi-viewpoint images using compatible images of two viewpoints and auxiliary images of two viewpoints, the encoding device 140 may prepare only two imaging units 141C and 141D other than the existing imaging units 141A and 141B that capture compatible images of two viewpoints as imaging units used for generating multi-viewpoint images. Accordingly, the installation of the imaging units for generating multi-viewpoint images can be easily performed at a low cost.

Third Embodiment

[Configuration Example of Encoding Device According to Third Embodiment]

Figure 19:
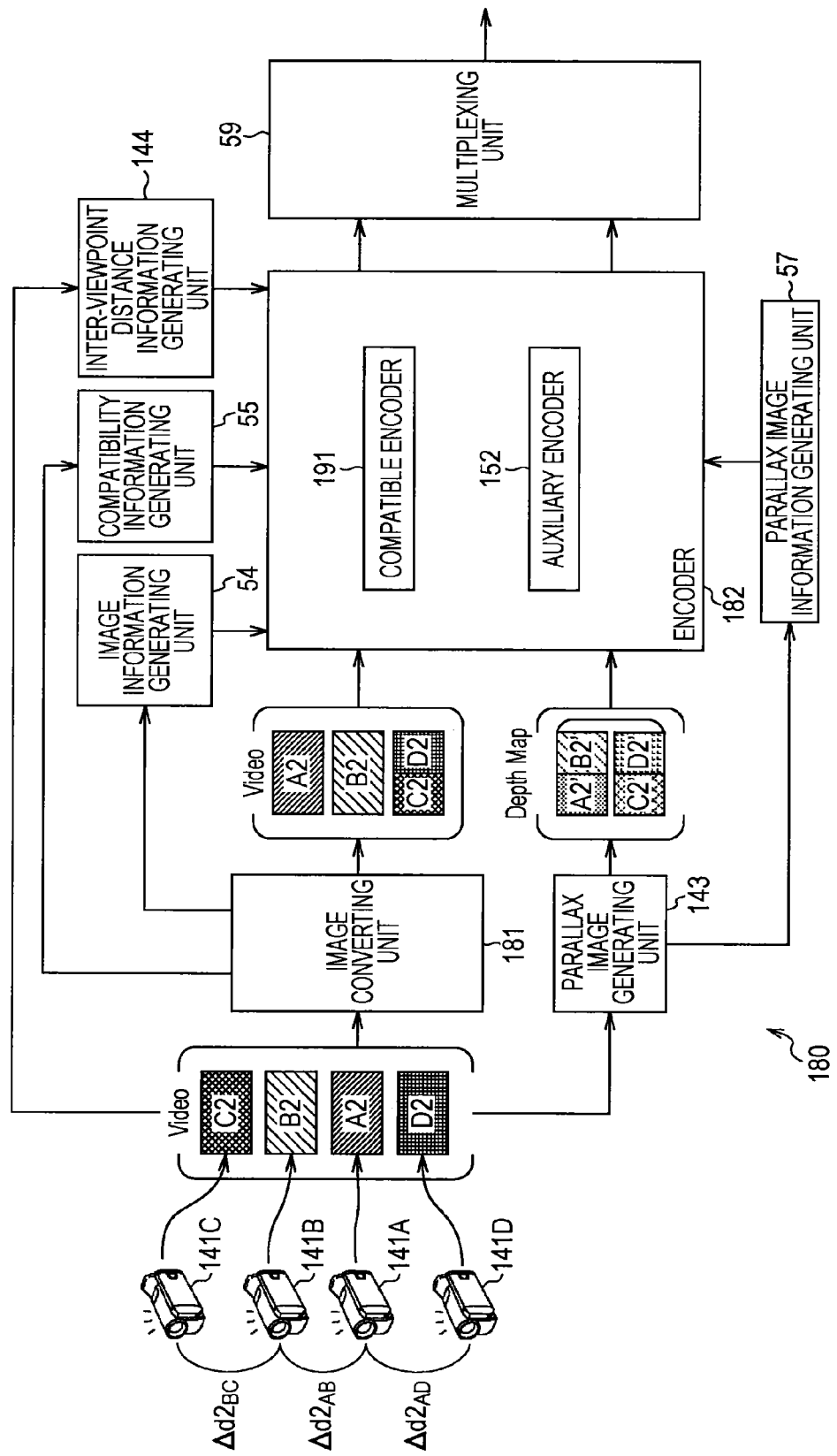
FIG. 19 is a block diagram that illustrates a configuration example of an encoding device according to a third embodiment of the present technology.

FIG. 19 is a block diagram that illustrates a configuration example of an encoding device according to a third embodiment of the present technology.

In the configuration illustrated in FIG. 19, the same reference numeral is assigned to a configuration that is the same as that illustrated in FIG. 5 or 14. Duplicate description will not be presented as is appropriate.

The configuration of the encoding device 180 illustrated in FIG. 19 is mainly different from the configuration illustrated in FIG. 14 in that an image converting unit 181 and an encoder 182 are disposed instead of the image converting unit 142 and the encoder 145. The encoding device 180 secures the compatibility with an existing encoding device that encodes a 3D image of the two-viewpoint mode by encoding images of two viewpoints out of multi-viewpoint images in accordance with the MVC mode as compatible images.

More specifically, the image converting unit 181 of the encoding device 180, similarly to the image converting unit 142 illustrated in FIG. 14, determines an image A2 that is supplied from the imaging unit 141A, of which the position in the horizontal direction is located on the inner side out of the imaging units 141A to 141D, and an image B2 that is supplied from the imaging unit 141B as compatible images. Then, the image converting unit 181 directly supplies the images A2 and B2 that are compatible images to the encoder 182. In addition, the image converting unit 181, similarly to the image converting unit 142, supplies information that designates the images A2 and B2 as compatible images to the compatibility information generating unit 55.

In addition, the image converting unit 181, similarly to the image converting unit 142, sets images C2 and D2 other that the images A2 and B2 as auxiliary images and multiplexes the auxiliary images in accordance with a predetermined multiplexing mode. The image converting unit 181 supplies a multiplexed image that is acquired as a result of the multiplexing process to the encoder 182 and supplies information that represents the multiplexing mode of the auxiliary images to the image information generating unit 54.

The encoder 182 is configured by a compatible encoder 191 and an auxiliary encoder 152. The compatible encoder 191 of the encoder 182 designates compatible images from among the compatible images and the multiplexed image of the auxiliary images that are supplied from the image converting unit 181 and encodes the image A2 out of the compatible images as a base image in accordance with the existing AVC mode, and encodes the image B2 as a dependent image in accordance with the existing MVC mode. The compatible encoder 191 generates an encoded stream by adding various kinds of information to an encoded image that is acquired as a result of the encoding process and supplies the encoded stream to the multiplexing unit 59 as a compatible stream.

[Description of Process of Encoding Device]

Figure 20:
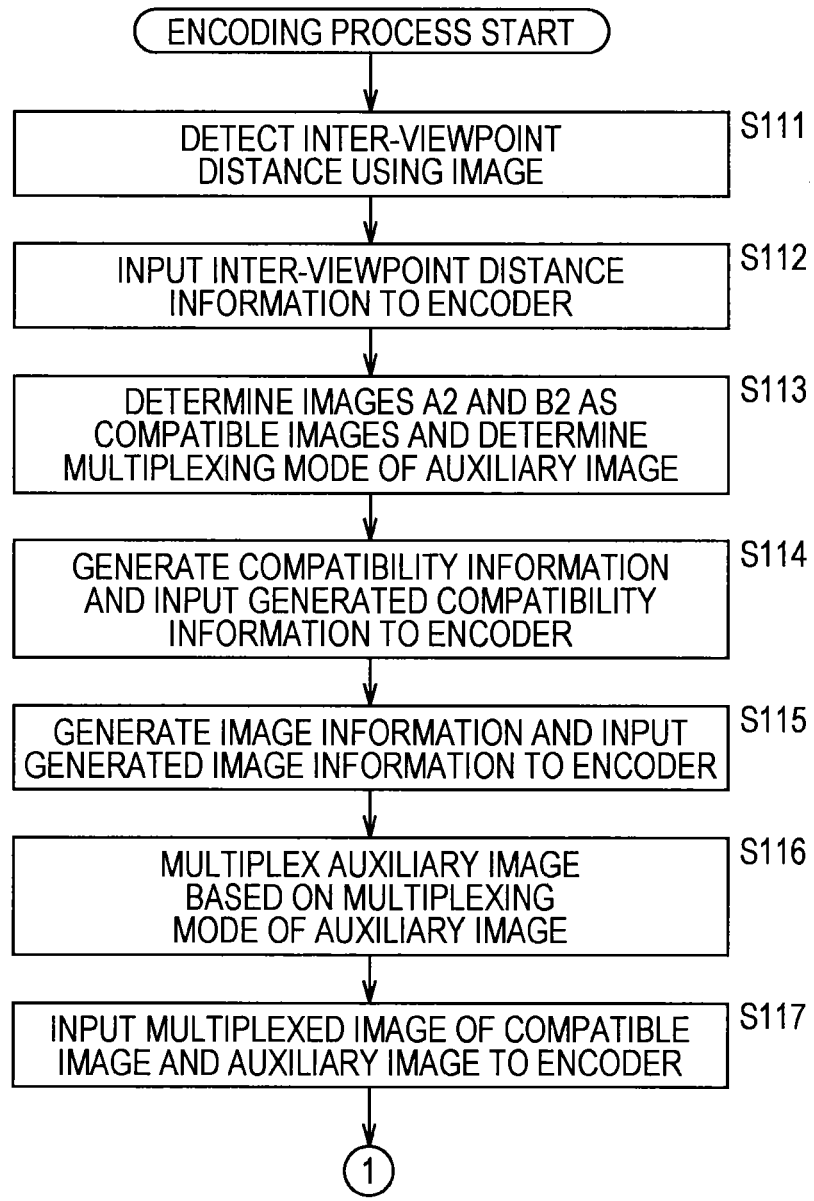
FIG. 20 is a flowchart that illustrates an encoding process performed by the encoding device illustrated in FIG. 19.
Figure 21:
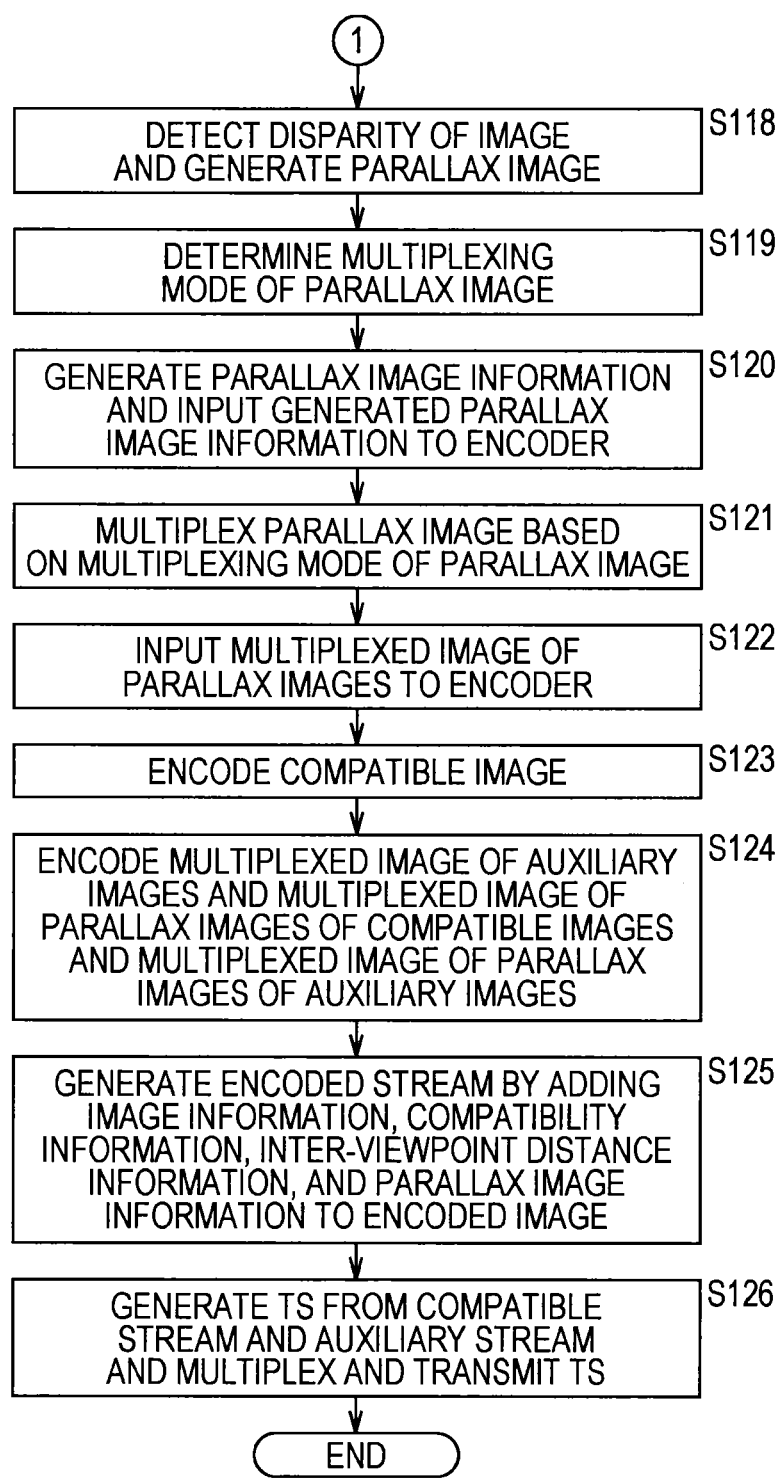
FIG. 21 is a flowchart that illustrates the encoding process performed by the encoding device illustrated in FIG. 19.

FIGS. 20 and 21 are flowcharts that illustrate an encoding process that is performed by the encoding device 180 illustrated in FIG. 19. This encoding process, for example, is started when the images A2 to D2 are output from the imaging units 141A to 141D.

The process of Steps S111 and S112 illustrated in FIG. 20 is the same as the process of Steps S51 and S52 illustrated in FIG. 15, and thus the description thereof will not be presented.

After the process of Step S112, in Step S113, the image converting unit 181 determines the image A2 that is supplied from the imaging unit 141A, of which the position in the horizontal direction is located on the inner side out of the imaging units 141A to 141D, and the image B2 that is supplied from the imaging unit 141B as compatible images and determines a multiplexing mode of the auxiliary images. The image converting unit 181 supplies information that designates the images A2 and B2 as compatible images to the compatibility information generating unit 55 and supplies the multiplexing mode of the auxiliary images to the image information generating unit 54. Then, the process proceeds to Step S114.

The process of Steps S114 to S117 is the same as the process of Steps S14 to S17 illustrated in FIG. 10, and thus the description thereof will not be presented. The process of Steps S118 to S122 is the same as the process of Steps S59 to S63 illustrated in FIG. 16, and thus the description thereof will not be presented.

After the process of Step S122, in Step S123, the compatible encoder 191 of the encoder 182 encodes the image A2 out of the compatible images supplied from the image converting unit 181 as a base image in accordance with the existing AVC mode and encodes the image B2 as a dependent image in accordance with the existing MVC mode. The compatible encoder 191 generates an encoded stream by adding various kinds of information to an encoded image that is acquired as a result of the encoding process and supplies the encoded stream to the multiplexing unit 59 as a compatible stream. Then, the process proceeds to Step S124.

The process of Steps S124 to S126 is the same as the process of Steps S65 to S67 illustrated in FIG. 16, and thus the description thereof will not be presented.

As above, since the encoding device 180 encodes images of two viewpoints out of multi-viewpoint images as compatible images in accordance with an existing encoding mode, the compatibility with an existing encoding device that encodes a 3D image of the two-viewpoint mode can be secured.

[Configuration Example of Decoding Device]

Figure 22:
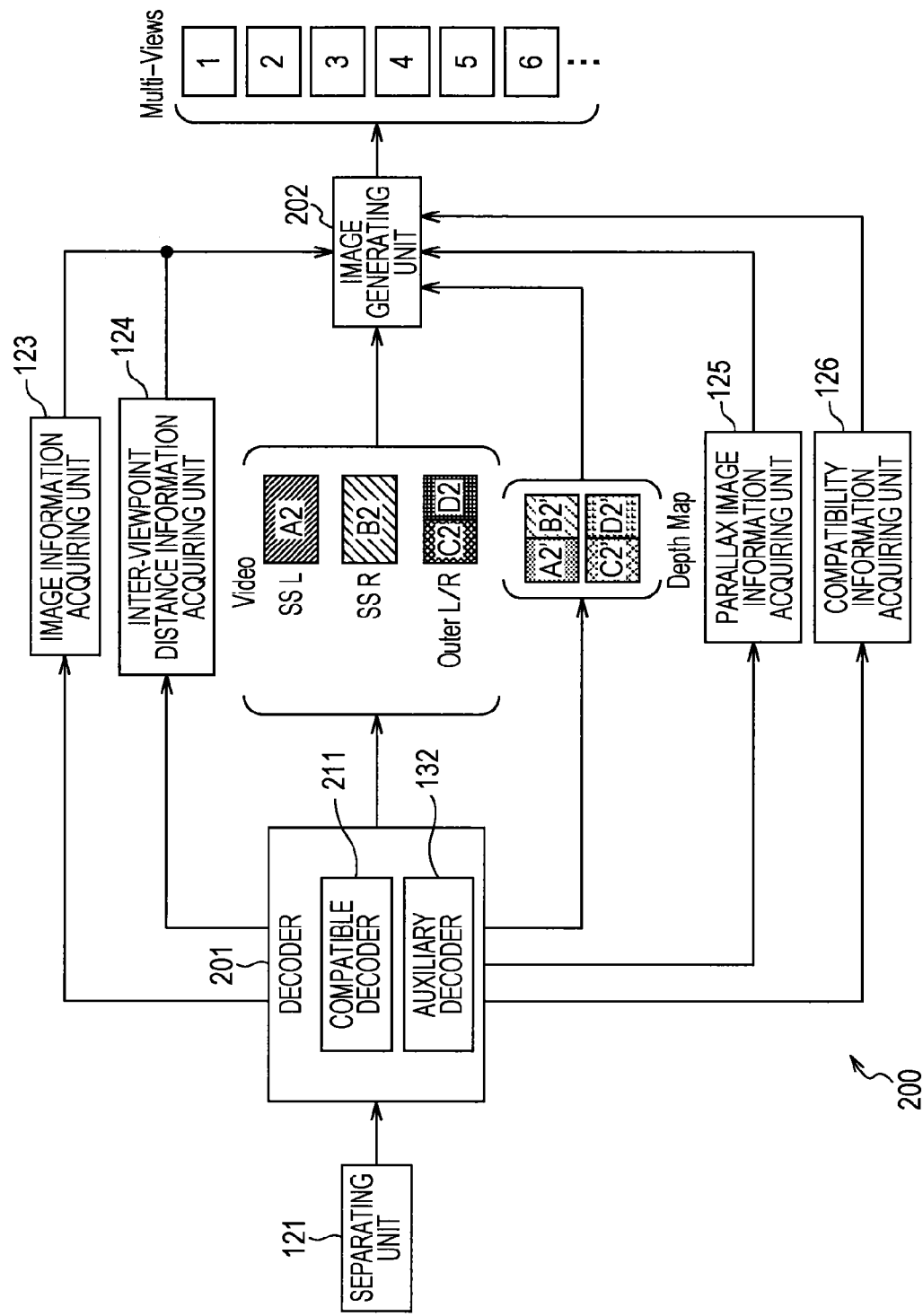
FIG. 22 is a diagram that illustrates a configuration example of a decoding device that corresponds to the encoding device illustrated in FIG. 19.

FIG. 22 is a diagram that illustrates a configuration example of a decoding device that decodes the multiplexed stream transmitted from the encoding device 180 illustrated in FIG. 19.

In the configuration illustrated in FIG. 22, the same reference numeral is assigned to a configuration that is the same as that illustrated in FIG. 12. Duplicate description will not be presented as is appropriate.

The configuration of the decoding device 200 illustrated in FIG. 22 is mainly different from the configuration illustrated in FIG. 12 in that a decoder 201 and an image generating unit 202 are disposed instead of the decoder 122 and the image generating unit 127. The decoding device 200 generates images of two viewpoints, or multi-viewpoint images by decoding the multiplexed stream that is transmitted from the encoding device 180 and displays the generated images on a display device not illustrated in the figure.

More specifically, the decoder 201 of the decoding device 200 is configured by a compatible decoder 211 and an auxiliary decoder 132. The compatible decoder 211 of the decoder 201, similarly to the compatible decoder 131 illustrated in FIG. 12, identifies the compatible stream out of the compatible stream and the auxiliary stream that are supplied from the separation unit 121 based on the information used for specifying a compatible stream that is supplied from the auxiliary decoder 132. The compatible decoder 211 decodes an encoded compatible image that is included in the compatible stream in accordance with a mode that corresponds to the MVC mode and supplies images A2 and B2 that are acquired as a result of the decoding process to the image generating unit 202.

The image generating unit 202 outputs the image in accordance with a display instruction supplied from a viewer, thereby displaying the image on a display device not illustrated in the figure. Described in more detail, the image generating unit 202 generates images of three or more viewpoints, which correspond to a display device not illustrated in the figure, each having the resolution that is a half of the resolution of the compatible image or the auxiliary image by using the compatible image, the multiplexed image of the auxiliary images, the multiplexed image of the disparity images of the compatible images, and the multiplexed image of the disparity images of the auxiliary images in accordance with a viewer's instruction for displaying a 3D image of the multi-viewpoint mode based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, and the like.

More specifically, the image generating unit 202 separates the disparity image of each auxiliary image from the multiplexed image of the disparity images of the auxiliary images based on the information that represents a multiplexing mode of the disparity images of the auxiliary images that is included in the disparity image information supplied from the disparity image information acquiring unit 125. In addition, the image generating unit 202 separates the disparity image of each compatible image from the multiplexed image of the disparity images of the compatible images based on the information that represents a multiplexing mode of the disparity images of the compatible images that is included in the disparity image information.

Furthermore, the image generating unit 202 separates each auxiliary image from the multiplexed image of the auxiliary images based on the information that represents a multiplexing mode of the auxiliary images that is included in the image information supplied from the image information acquiring unit 123. In addition, the image generating unit 202 determines the positions of viewpoints of multi-viewpoint images to be generated based on the inter-viewpoint distance information and the number of viewpoints that corresponds to a display device not illustrated in the figure. Then, the image generating unit 202 generates an image of each viewpoint of which the position is determined by using each compatible image, each auxiliary image, the disparity image of each compatible image, and the disparity image of each auxiliary image. Then, the image generating unit 202, similarly to the image generating unit 127, converts the resolution of the generated multi-viewpoint images into the resolution that is "1/the number of viewpoints" of the resolution of the compatible image or the auxiliary image, synthesizes the converted images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his/her left and right eyes.

In addition, the image generating unit 202 alternately outputs the images A2 and B2 as compatible images supplied from the decoder 122 in accordance with an instruction for displaying a 3D image of the two-viewpoint mode that is supplied from a viewer, thereby displaying the images on a display device not illustrated in the figure. At this time, the viewer can view a 3D image by wearing glasses in which one of a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 23:
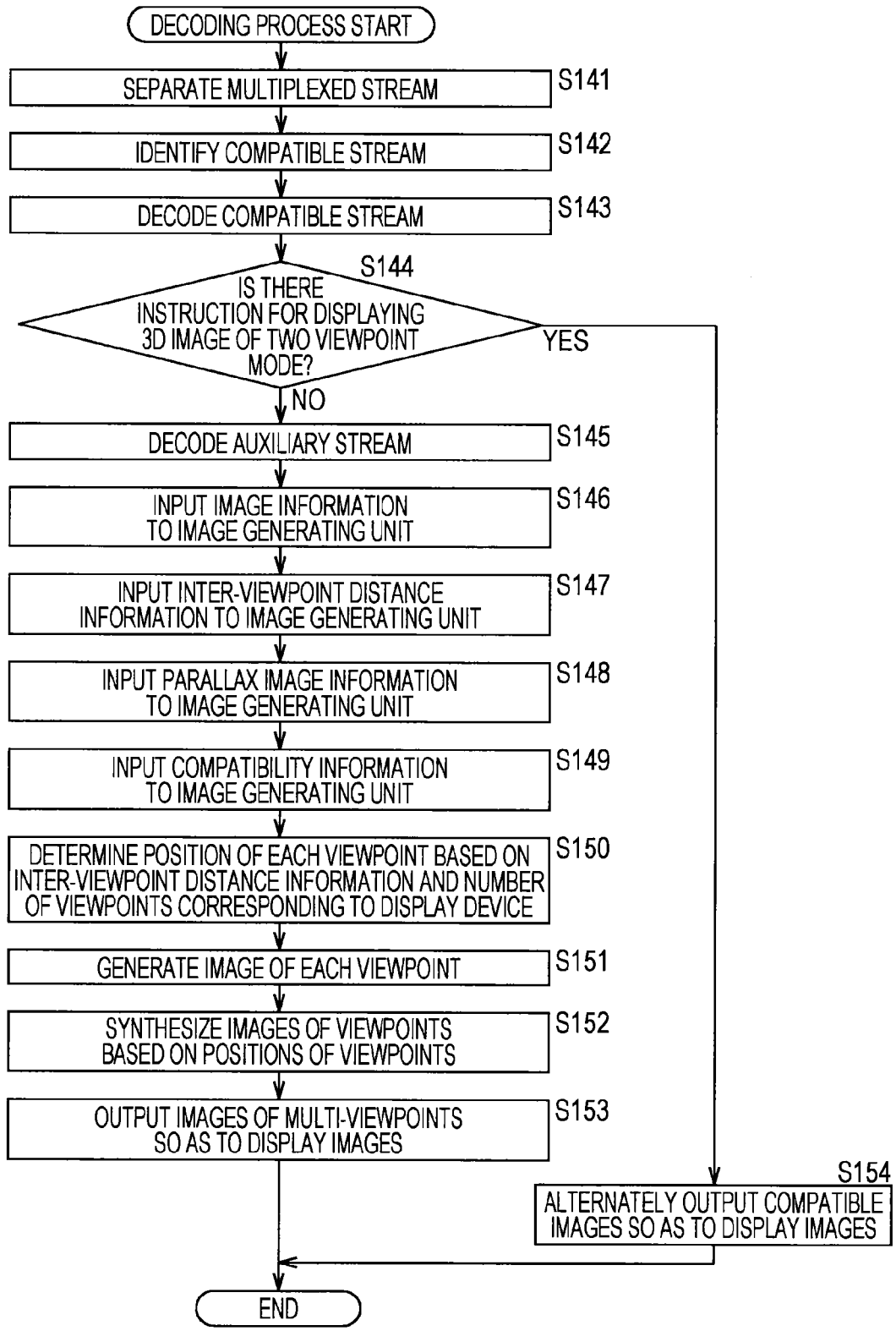
FIG. 23 is a flowchart that illustrates a decoding process performed by the decoding device illustrated in FIG. 22.

FIG. 23 is a flowchart that illustrates a decoding process performed by the decoding device 200 illustrated in FIG. 22. This decoding process, for example, is started when a multiplexed stream that is transmitted from the encoding device 180 illustrated in FIG. 19 is input to the decoding device 200.

The process of Steps S141 to S153 illustrated in FIG. 23 is the same as the process of Steps S81 to S93 illustrated in FIG. 18, and thus the description thereof will not be presented.

In Step S144, it is determined whether there is an instruction for displaying the 3D image of the two-viewpoint mode, as indicated by "YES" and "NO" in the flow chart. In a case where it is determined that the instruction for displaying a 3D image of the two-viewpoint mode has been made by the viewer in Step S144, the process proceeds to Step S154. In Step S154, the image generating unit 202 alternately outputs images A2 and B2 that are compatible images acquired as a result of the decoding process performed by the compatible decoder 211 to a display device not illustrated in the figure, thereby displaying the images.

In a decoding device that can decode only a compatible stream that has compatibility with the decoding device 200, the TS of the auxiliary stream is ignored, and only the process of Steps S143 and S154 is performed.

As above, the decoding device 200 can decode a compatible stream and an auxiliary stream that are encoded in accordance with a mode having compatibility with an existing mode by the encoding device 180.

<Another Arrangement Example of Compatibility information, Disparity Image Information, Image Information, and Inter-viewpoint Distance Information>

In the description presented above, although the compatibility information, the disparity image information, the image information, and the inter-viewpoint distance information have been described to be included in the auxiliary stream, the above-described information may be included in the TS. In such a case, for example, the compatibility information, the disparity image information, the image information, and the inter-viewpoint distance information are described in descriptors of a PMT (program map table) or an SIT (selection information table) within the packet of the TS of the auxiliary stream.

FIGS. 24 to 26 are diagrams that illustrate examples of the description of the compatibility information and the disparity image information in a case where the compatibility information, the disparity image information, the image information, and the inter-viewpoint distance information are described in the descriptor of the PMT.

As illustrated in FIG. 24, in a case where the compatibility information and the disparity image information are described in the descriptor of the PMT, identified as program_stream_map), a descriptor (3DV_view_structure_descriptor) in which compatibility information is arranged and a descriptor (depth_map_structure_descriptor) in which the disparity image information is arranged are disposed as the descriptor of the PMT.

In the descriptor (3DV_view_structure_descriptor), as illustrated in FIG. 25, following a descriptor tag (descriptor_tag) and a descriptor length (descriptor_length), the number (num_of_views) of viewpoints of an image that is an encoding target, a compatible mode (compatible_mode), the information (compatible_view) that designates a compatible image, and the like are described as the compatibility information.

In addition, in the descriptor (depth_map_structure_descriptor), as illustrated in FIG. 26, following the descriptor tag (descriptor_tag) and the descriptor length (descriptor_length), the number (num_of_depth_map) of disparity images, a flag (is_frame_packing) that represents whether or not disparity images are multiplexed, a multiplexing mode (frame_packing_mode) of the disparity images, information (comb_frame_packing_views) that designates the disparity images that are multiplexed, and the like are described as the disparity image information.

In addition, the image information is the same as the disparity image information except that the image information is not information of the disparity image but information of the compatible image and the auxiliary image, and thus is not illustrated in the figure.

FIG. 27 is a diagram that illustrates an example of the description of the inter-viewpoint distance information in a case where the compatibility information, the disparity image information, the image information, and the inter-viewpoint distance information are described in the descriptors of the PMT.

As illustrated in FIG. 27, in a case where the inter-viewpoint distance information is described in the descriptor of the PMT, a descriptor (3DV_view_info_descriptor) in which the inter-viewpoint distance information is arranged is disposed as the descriptor of the PMT.

In the descriptor (3DV_view_info_descriptor), following the descriptor tag and the descriptor length, the number (num_of_views) of viewpoints of an image that is an encoding target, the number (num_of_view_distance) of detected inter-viewpoint distances, a combination (view[0,1]) of two images that correspond to the inter-viewpoint distance, an inter-viewpoint distance (view_distance[view_distance_id]) that corresponds to the combination, and the like are described as the inter-viewpoint distance information.

For example, the decoding device according to the present technology can be applied to a display device or a reproduction device such as a television receiver.

The encoding devices and the decoding devices according to the first to third embodiments may be combined. In such a case, the decoding device selects the compatible decoder in accordance with a compatible mode that is included in the compatibility information.

In addition, in the first to third embodiments, although the resolutions of the auxiliary image and the disparity image are lowered and the images are multiplexed, only the resolutions thereof may be lowered without multiplexing the images. Furthermore, the resolution of the disparity image may not be lowered.

In addition, the image information, the inter-viewpoint distance information, the disparity image information, and the compatibility information may be transmitted in a system that is different from that of the encoded stream without being encoded. Furthermore, the image information, the inter-viewpoint distance information, the disparity image information, and the compatibility information may be encoded and transmitted in a system that is different from that of the encoded stream.

In addition, the image information, the inter-viewpoint distance information, the disparity image information, and the compatibility information may be described in an area (the header, user data, or the like) other than the above-described area of the encoded stream without being encoded and may be encoded and described in a predetermined area of the encoded stream. Furthermore, the image information, the inter-viewpoint distance information, the disparity image information, and the compatibility information may be transmitted as auxiliary information other than the encoded stream.

Fourth Embodiment

[Configuration Example of Encoding Device According to Fourth Embodiment]

Figure 28:
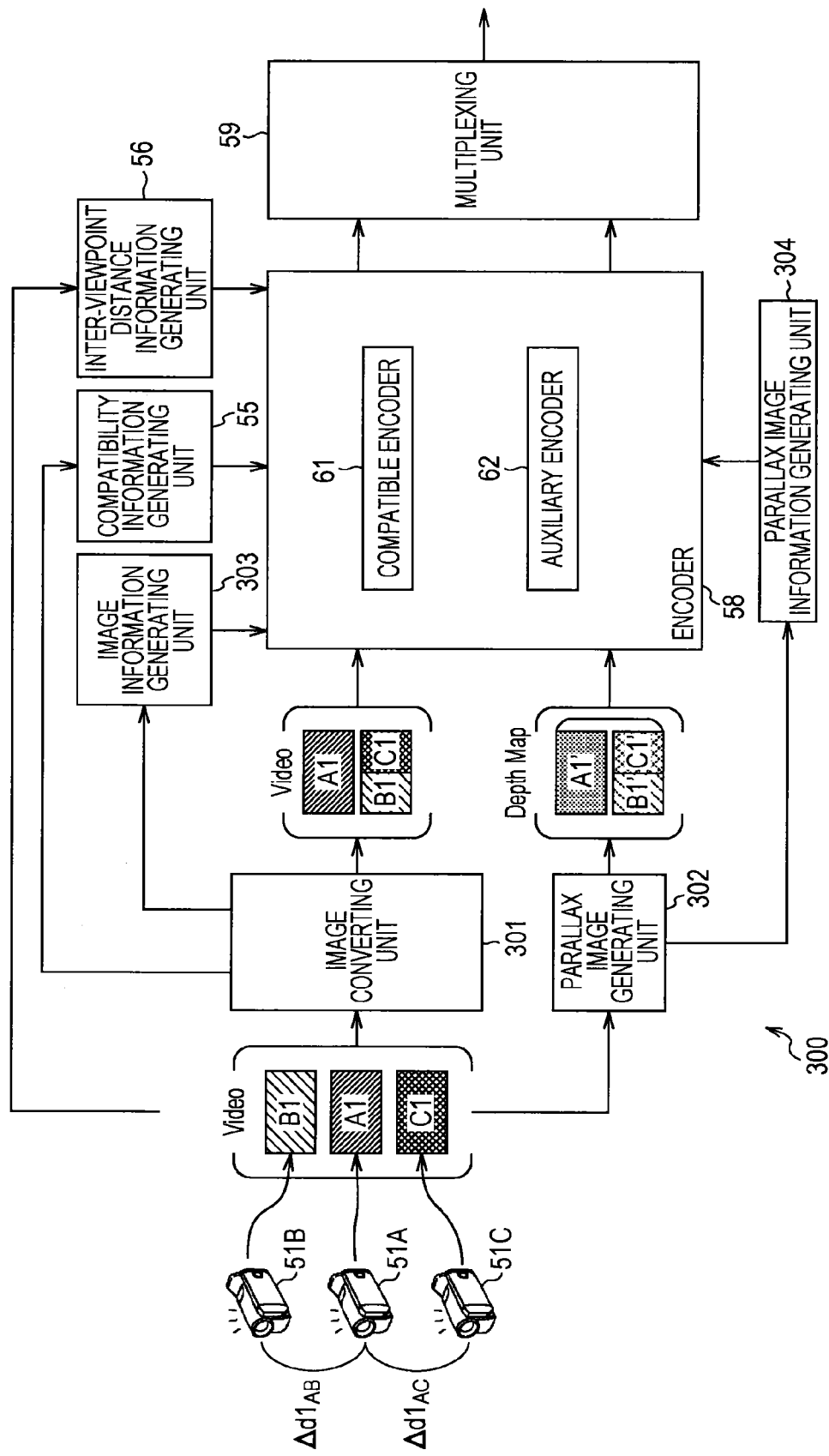
FIG. 28 is a block diagram that illustrates a configuration example of an encoding device according to a fourth embodiment of the present technology.

FIG. 28 is a block diagram that illustrates a configuration example of an encoding device according to a fourth embodiment of the present technology.

In the configuration illustrated in FIG. 28, the same reference numeral is assigned to a configuration that is the same as that illustrated in FIG. 5. Duplicate description will not be presented as is appropriate.

The configuration of the encoding device 300 illustrated in FIG. 28 is mainly different from the configuration illustrated in FIG. 5 in that an image converting unit 301, a disparity image generating unit 302, an image information generating unit 303, and a disparity image information generating unit 304 are arranged instead of the image converting unit 52, the disparity image generating unit 53, the image information generating unit 54, and the disparity image information generating unit 57.

The encoding device 300 transmits the image information and the disparity image information with not information relating to multiplexing but information relating to the resolution lowering process being included therein.

More specifically, the image converting unit 301 of the encoding device 300, similarly to the image converting unit 52 illustrated in FIG. 5, determines an image A1 supplied from an imaging unit 51A as a compatible image. The image converting unit 301, similarly to the image converting unit 52, supplies information designating the image A1 as a compatible image to the compatibility information generating unit 55. Then, the image converting unit 301, similarly to the image converting unit 52, directly supplies the image A1 that is the compatible image to the encoder 58.

In addition, the image converting unit 301 sets images B1 and C1 other than the image A1 as auxiliary images, lowers the resolution of the images in accordance with a horizontal half mode, and multiplexes the images, thereby acquiring a multiplexed image of which the resolution is the same as that of the compatible image. Here, the horizontal half mode is a mode in which the resolution in the horizontal direction is set as a half of the resolution of the compatible image. The image converting unit 301 supplies the multiplexed image of the auxiliary images to the encoder 58 and supplies information that represents the conversion mode of the resolution of the auxiliary images to the image information generating unit 303.

The disparity image generating unit 302, similarly to the disparity image generating unit 53 illustrated in FIG. 5, detects the disparity of each pixel of the images A1 to C1 by using the images A1 to C1 that are supplied from the imaging units 51A to 51C. The disparity image generating unit 302, similarly to the disparity image generating unit 53, generates a disparity image A1' and directly supplies the generated disparity image to the encoder 58. In addition, the disparity image generating unit 302 generates disparity images B1' and C1' and lowers the resolutions of the disparity images in accordance with the horizontal half mode. Then, the disparity image generating unit 302 multiplexes the disparity images B1' and C1' of which the resolutions are lowered, thereby acquiring a multiplexed image of which the resolution is the same as that of the compatible image. The disparity image generating unit 302 supplies the multiplexed image that is acquired as a result thereof to the encoder 58 and supplies information that represents the conversion mode of the resolution the disparity image of the auxiliary image to the disparity image information generating unit 304.

The image information generating unit 303 generates the information representing the conversion mode of the resolution of the auxiliary image and the like as image information based on the information that is supplied from the image converting unit 301. The image information generating unit 303 supplies the image information to the encoder 58.

The disparity image information generating unit 304 generates information that represents the conversion mode of the resolution of the disparity image of the auxiliary image and the like as disparity image information based on the information that is supplied from the disparity image generating unit 302. The disparity image information generating unit 304 supplies the disparity image information to the encoder 58.

[Example of Description of Disparity Image Information]

FIG. 29 is a diagram that illustrates an example of the description of the disparity image information included in the auxiliary stream in the encoding device 300 illustrated in FIG. 28 in a case where a mode that is compliant with the AVC mode or the MVC mode is used as the encoding mode.

As illustrated in FIG. 29, as the disparity image information (depth_map_structure), the number (num_of_depth_map) of disparity images, a low-resolution flag (is_decimated) that represents whether or not the resolution of the disparity image has been lowered, a conversion mode (decimation_mode) (conversion mode information) of the resolution of the disparity image, information (comb_decimated_views) that designates a disparity image of which the resolution has been lowered, and the like are described. As conversion modes of the resolution other than the horizontal half mode, there are a vertical half mode in which the resolution in the vertical direction is halved, a horizontal-vertical ¼ mode in which the resolution in the horizontal direction and the resolution in the vertical direction are halved, and the like.

In addition, in the encoding device 300, the image information is the same as the disparity image information except that the image information is not information of the disparity image but information of the compatible image and the auxiliary image, and thus the description thereof will not be presented.

[Description of Process of Encoding Device]

Figure 30:
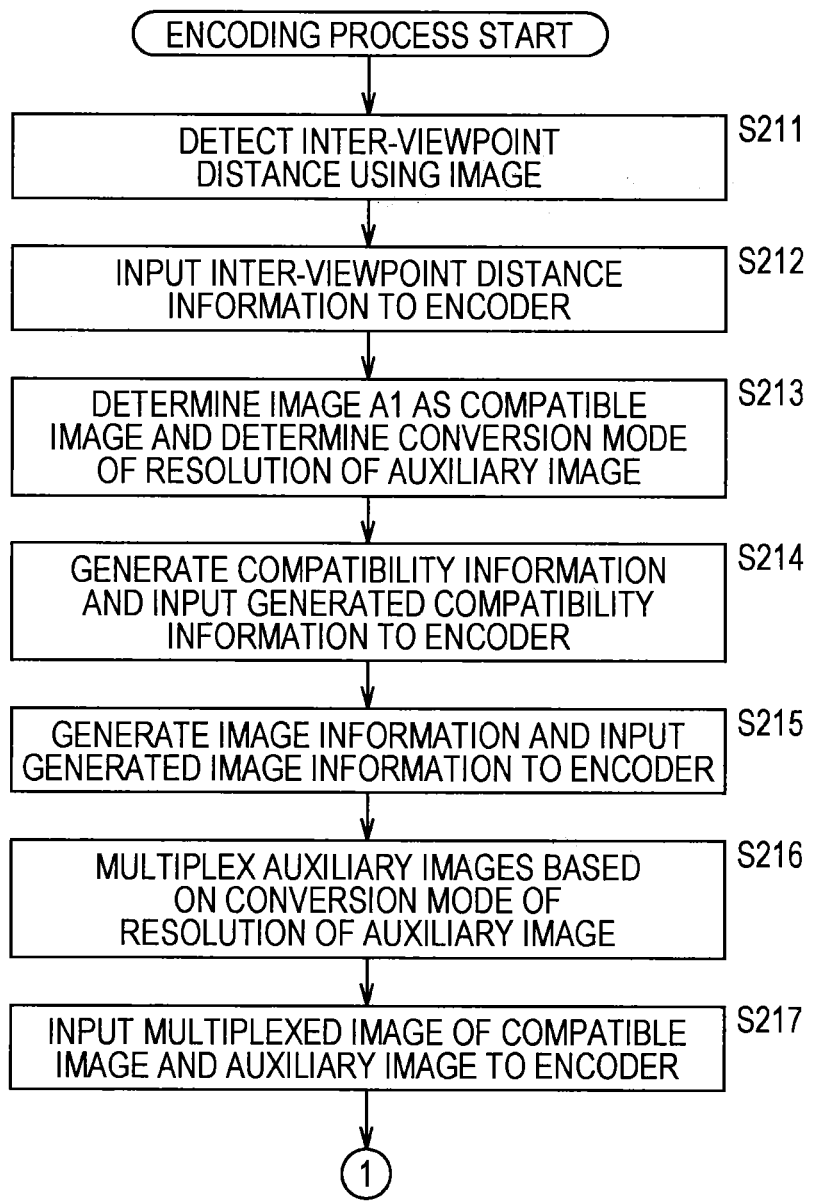
FIG. 30 is a flowchart that illustrates an encoding process performed by the encoding device illustrated in FIG. 28.
Figure 31:
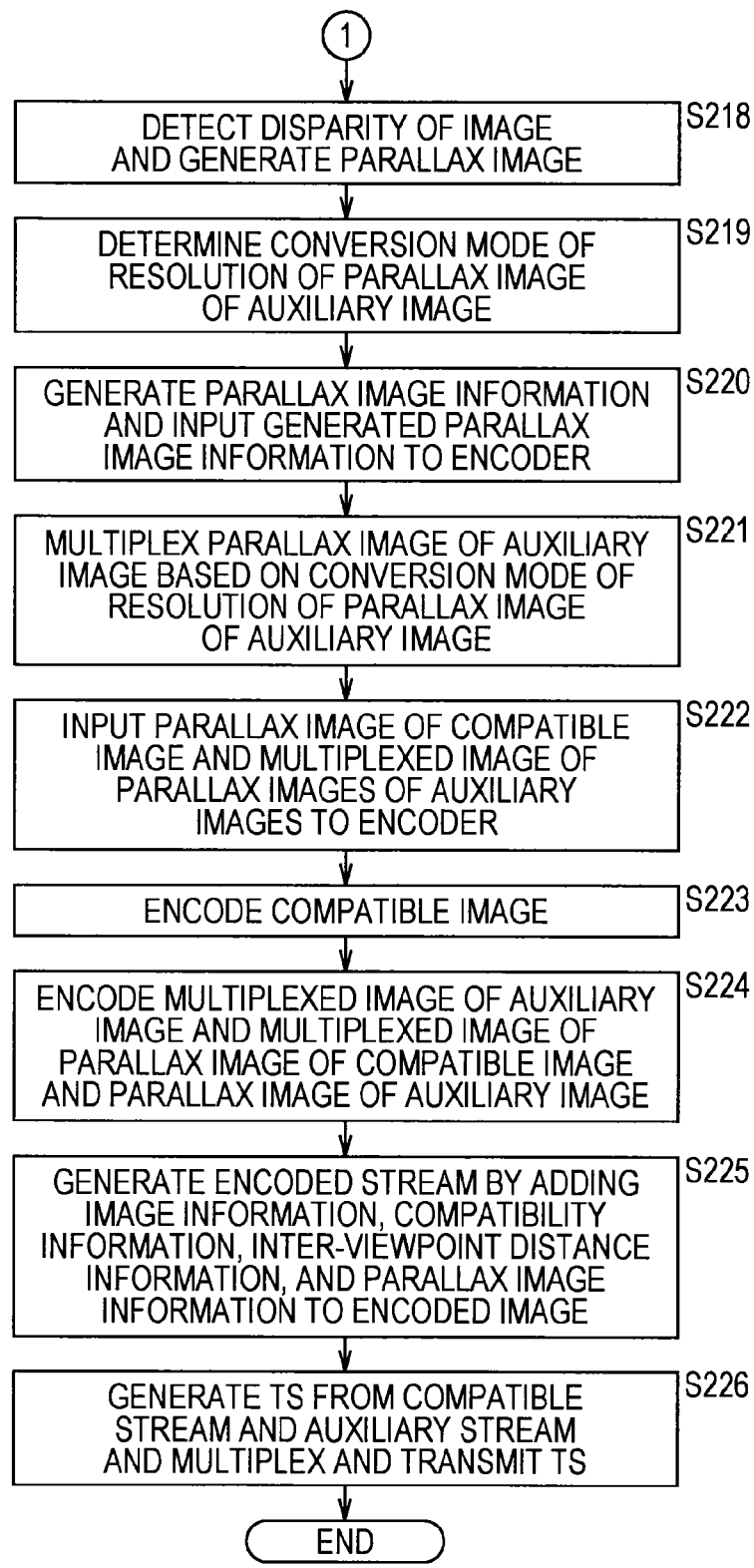
FIG. 31 is a flowchart that illustrates the encoding process performed by the encoding device illustrated in FIG. 28.

FIGS. 30 and 31 are flowcharts that illustrate the encoding process performed by the encoding device 300 illustrated in FIG. 28. This encoding process, for example, is started when the images A1 to C1 are output from the imaging units 51A to 51C.

The encoding process illustrated in FIGS. 30 and 31 is the same as the encoding process illustrated in FIGS. 10 and 11 except that a conversion mode of the resolution is determined instead of the multiplexing mode, and information relating to the resolution lowering process that includes the conversion mode is included in the image information and the disparity image information.

More specifically, the process of Steps S211 and S212 illustrated in FIG. 30 is the same as the process of Steps S11 and S12 illustrated in FIG. 10, and, in Step S213, the image converting unit 301 determines the image A1 supplied from the imaging unit 51A as a compatible image and determines the conversion mode of the resolution of the auxiliary image. The image converting unit 301 supplies information that designates the image A1 as a compatible image to the compatibility information generating unit 55 and supplies the conversion mode of the resolution of the auxiliary image to the image information generating unit 303.

The process of Steps S214 and S215 is the same as the process of Steps S14 and S15 illustrated in FIG. 10. In Step S216, the image converting unit 301 sets images B1 and C1 other than the image A1 as auxiliary images and lowers the resolutions of the auxiliary images based on the conversion mode of the resolution of the auxiliary image that is determined in Step S213 and multiplexes resultant auxiliary images.

The process of Steps S217 and S218 (FIG. 31) is the same as the process of Steps S17 and S18 (FIG. 11), and, in Step S219, the disparity image generating unit 302 determines the conversion mode of the resolution of the disparity images of the auxiliary images and supplies information that represents the conversion mode to the disparity image information generating unit 304.

The process of Step S220 (FIG. 31) is the same as the process of Step S20 illustrated in FIG. 11, and, in Step S221, the disparity image generating unit 302 lowers the resolution of the disparity images of the auxiliary images based on the conversion mode of the resolution of the disparity image of the auxiliary image that is determined in Step S219 and multiplexes resultant disparity images.

The process of Steps S222 to S226 is the same as the process of Steps S22 to S26 illustrated in FIG. 11.

As above, since the encoding device 300 lowers the resolutions of the auxiliary image and the disparity image, the information amount of the encoding result can be suppressed without increasing the compression rate of the compatible image. As a result, an increase in the effect of the compression strain on the compatible image due to an increase in the compression rate is prevented, whereby the image quality of the compatible image can be maintained to be high. This similarly applies to the encoding devices 50, 140, and 180.

[Configuration Example of Decoding Device]

Figure 32:
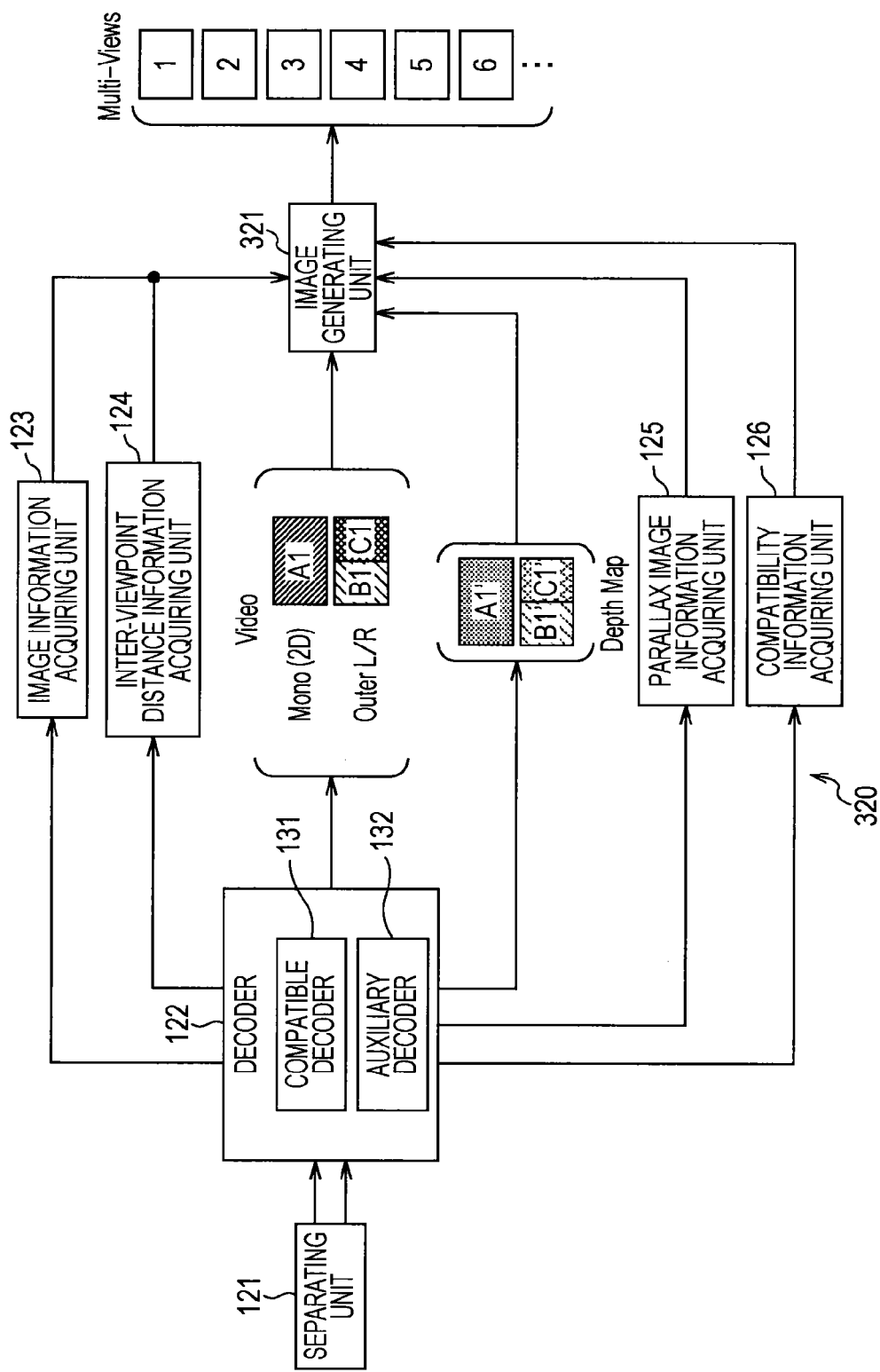
FIG. 32 is a diagram that illustrates a configuration example of a decoding device that corresponds to the encoding device illustrated in FIG. 28.

FIG. 32 is a diagram that illustrates a configuration example of a decoding device that decodes a multiplexed stream that is transmitted from the encoding device 300 illustrated in FIG. 28.

In the configuration illustrated in FIG. 32, the same reference numeral is assigned to a configuration that is the same as that illustrated in FIG. 12. Duplicate description will not be presented as is appropriate.

The configuration of the decoding device 320 illustrated in FIG. 32 is mainly different from the configuration illustrated in FIG. 12 in that an image generating unit 321 is disposed instead of the image generating unit 127. The decoding device 320 decodes a multiplexed stream that is transmitted from the encoding device 300, generates an image of one viewpoint or a multi-viewpoint image, and displays the generated image on a display device not illustrated in the figure.

More specifically, the image generating unit 321 of the decoding device 320 outputs the image in accordance with an instruction made by a viewer, thereby displaying the image on a display device not illustrated in the figure. More specifically, the image generating unit 321 generates images of three or more viewpoints, which correspond to a display device not illustrated in the figure, each having the resolution that is the same as the resolution of the compatible image or the auxiliary image by using the compatible image, the multiplexed image of the auxiliary images, the multiplexed image of the disparity images of the compatible images, and the multiplexed image of the disparity images of the auxiliary images in accordance with a viewer's instruction for displaying a 3D image of the multi-viewpoint mode based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, and the like.

Described in detail, the image generating unit 321 (a separation unit and an image converting unit) separates the disparity image of each auxiliary image from the multiplexed image of the disparity images of the auxiliary images and increases the resolution thereof based on the conversion mode of the resolution that is included in the disparity image information supplied from the disparity image information acquiring unit 125. As a result, the image generating unit 321 acquires the disparity image of each auxiliary image having the same resolution as the resolution of the compatible image. In addition, the image generating unit 321 separates each auxiliary image from the multiplexed image of the auxiliary images, increases the resolution thereof, and acquires each auxiliary image having the same resolution as the resolution of the compatible image based on the conversion mode of the resolution that is included in the image information supplied from the image information acquiring unit 123.

Furthermore, the image generating unit 321 determines the position of each viewpoint of a multi-viewpoint image to be generated based on the inter-viewpoint distance information and the number of viewpoints that corresponds to a display device not illustrated in the figure. Then, the image generating unit 321 generates an image of each viewpoint of which the position is determined by using the compatible image, each auxiliary image having the same resolution as the resolution of the compatible image, the disparity image of the compatible image, and the disparity image of each auxiliary image. Then, the image generating unit 321 converts the resolution of the generated image of each viewpoint into resolution that is "1/the number of viewpoints" of the resolution of the compatible image or the auxiliary image, synthesizes the converted images, and displays a resultant image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 321 outputs an image A1 that is a compatible image supplied from the compatible decoder 131 of the decoder 122 in accordance with an instruction for displaying a 2D image that is supplied from a viewer, thereby displaying the image on a display device not illustrated in the figure. Accordingly, the viewer can view the 2D image.

[Description of Process of Decoding Device]

Figure 33:
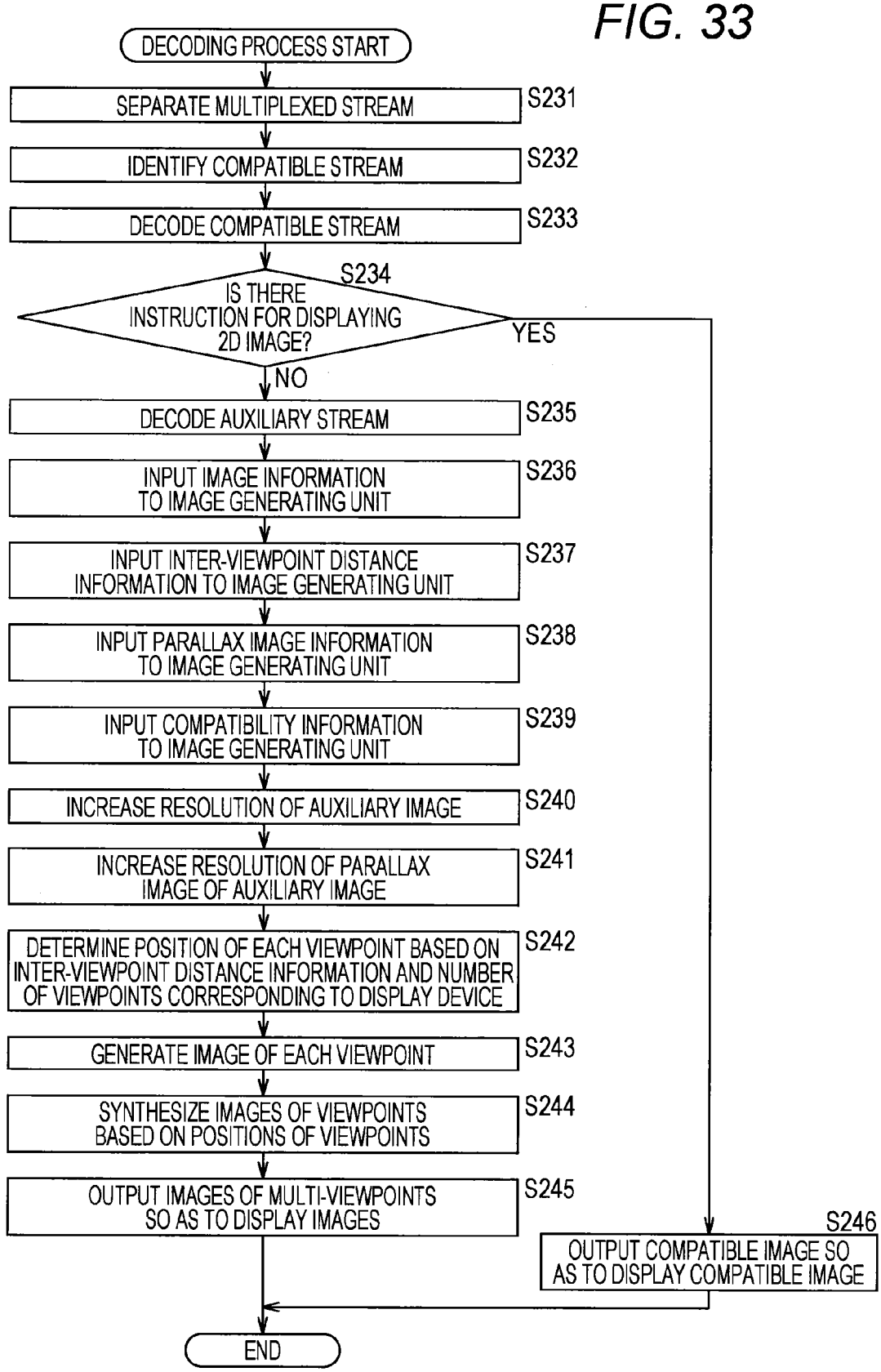
FIG. 33 is a flowchart that illustrates a decoding process performed by the decoding device illustrated in FIG. 32.

FIG. 33 is a flowchart that illustrates a decoding process performed by the decoding device 320 illustrated in FIG. 32. This decoding process, for example, is started when a multiplexed stream that is transmitted from the encoding device 300 illustrated in FIG. 28 is input to the decoding device 320.

The decoding process illustrated in FIG. 33 is the same as the decoding process illustrated in FIG. 13 except that the resolutions of the auxiliary image and the disparity image of the auxiliary image are increased based on the image information and the disparity image information that are included in the auxiliary stream.

More specifically, the process of Steps S231 to S239 illustrated in FIG. 33 is the same as the process of Steps S31 to S39 illustrated in FIG. 13, including a determination in Step S234 of whether there is an instruction for displaying a 2D image, as indicated by "YES" and "NO" in the flow chart, and, in Step S240, the image generating unit 321 separates the multiplexed image of the auxiliary images based on the conversion mode of the resolution that is included in the image information supplied from the image information acquiring unit 123 and increases the resolution of the separated multiplexed image. In this way, the image generating unit 321 acquires images B1 and C1 that are auxiliary images having the resolution that is the same as the compatible image.

In Step S241, the image generating unit 321 separates the multiplexed image of the disparity images of the auxiliary images based on the conversion mode of the resolution that is included in the disparity image information supplied from the disparity image information acquiring unit 125 and increases the resolution of the separated multiplexed image. In this way, the image generating unit 321 acquires images B1' and C1' that are the disparity images of the auxiliary images having the resolution that is the same as the compatible image.

The process of Step S242 is the same as the process of Step S40 illustrated in FIG. 13, and, in Step S243, the image generating unit 321 generates an image of each viewpoint having the resolution that is the same as the resolution of the compatible image or the auxiliary image based on the position of each viewpoint that is determined in Step S242, the compatibility information supplied from the compatibility information acquiring unit 126, and the like by using the compatible image, the auxiliary image having the resolution that is the same as the resolution of the compatible image, the disparity image of the compatible image, and the disparity image of the auxiliary image.

The process of Steps S244 to S246 is the same as the process of Steps S42 to S44 illustrated in FIG. 13.

In a decoding device that can decode only a compatible stream that has compatibility with the decoding device 320, the TS of the auxiliary stream is ignored, and only the process of Steps S233 and S246 is performed.

As above, the decoding device 320 can decode a compatible stream and an auxiliary stream that are encoded in accordance with a mode having compatibility with an existing mode by the encoding device 300.

[Another Example of Arrangement of Disparity Image Information]

In the description presented above, in the fourth embodiment, although the compatibility information, the disparity image information, the image information, and the inter-viewpoint distance information are included in the auxiliary stream, similarly to the first to third embodiments, such information may be included in the TS. In such a case, for example, in descriptors of the PMT or the SIT that is included in the packet of the TS of the auxiliary stream, the compatibility information, the disparity image information, the image information, and the inter-viewpoint distance information are described.

FIG. 34 is a diagram that illustrates an example of the description of a descriptor (depth_map_structure_descriptor) in which the disparity image information is arranged in a case where the compatibility information, the disparity image information, the image information, and the inter-viewpoint distance information are described in descriptors of the PMT.

As illustrated in FIG. 34, in the descriptor (depth_map_structure_descriptor), following the descriptor tag and the descriptor length, the number (num_of_depth_map) of disparity images, a low-resolution flag (is_decimated), a conversion mode (decimation_mode) of the resolution of the disparity image, information (comb_decimated_views) that designates the disparity image of which the resolution has been lowered, and the like are described as the disparity image information.

Although in the fourth embodiment, in the image information and the disparity image information according to the first embodiment, not the information relating to the multiplexing but the information relating to the resolution lowering is included, also in the image information and the disparity image information according to the second and third embodiments, not the information relating to the multiplexing but the information relating to resolution lowering may be included.

Fifth Embodiment

[Configuration Example of Encoding Device According to Fifth Embodiment]

Figure 35:
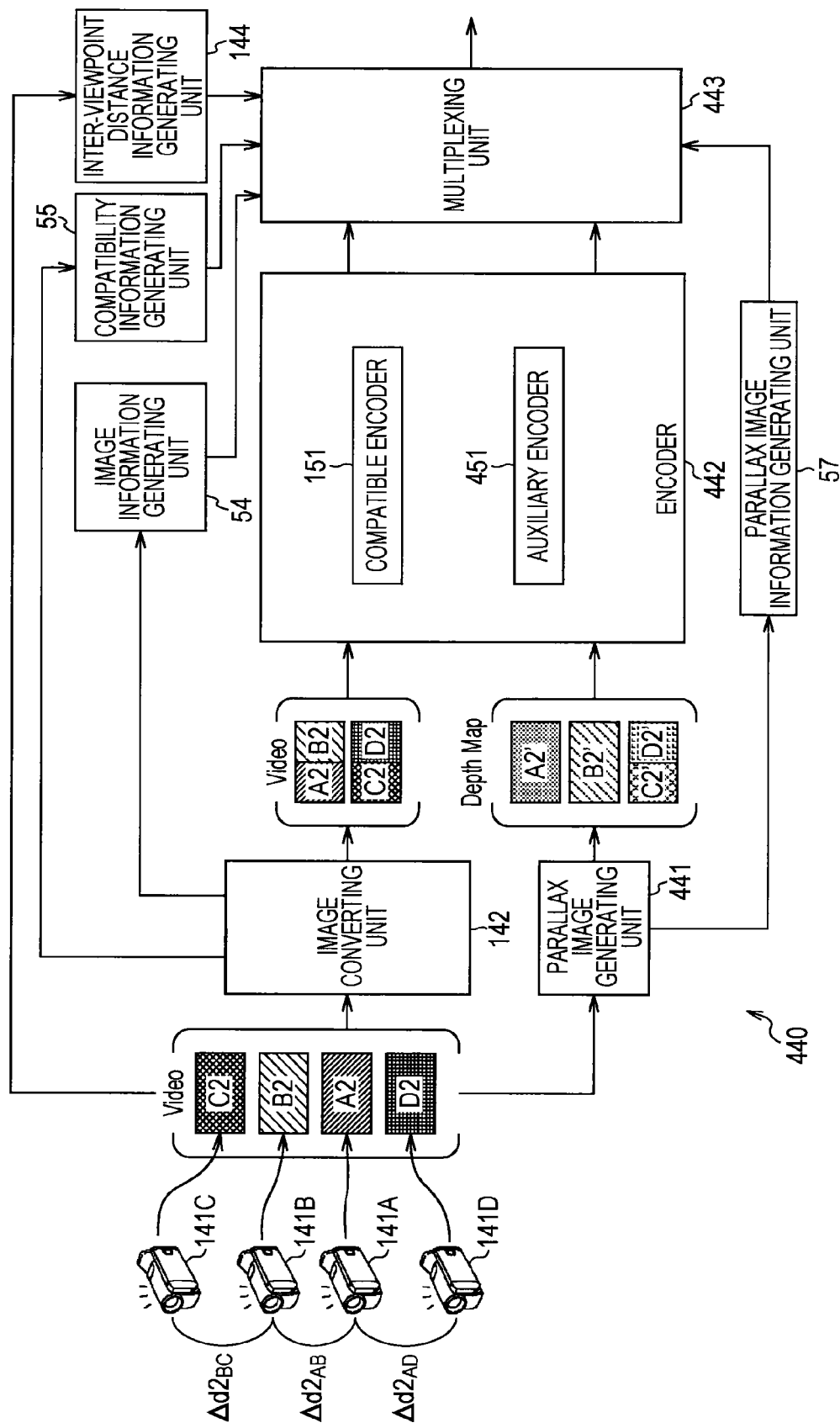
FIG. 35 is a block diagram that illustrates a configuration example of an encoding device according to a fifth embodiment of the present technology.

FIG. 35 is a block diagram that illustrates a configuration example of an encoding device according to a fifth embodiment of the present technology.

In the configuration illustrated in FIG. 35, the same reference numeral is assigned to a configuration that is the same as that illustrated in FIG. 14. Duplicate description will not be presented as is appropriate.

The configuration of the encoding device 440 illustrated in FIG. 35 is mainly different from the configuration illustrated in FIG. 14 in that a disparity image generating unit 441 and an encoder 442 are arranged instead of the disparity image generating unit 143 and the encoder 145. The encoding device 440 does not multiplex the disparity images of compatible images in the spatial direction but multiplexes the disparity images of the compatible images in the time direction and encodes the multiplexed disparity images.

More specifically, the disparity image generating unit 441 of the encoding device 440 detects the disparity of each pixel of images A2 to D2 using the images A2 to D2 that are supplied from the imaging units 141A to 141D. The disparity image generating unit 441 generates a disparity image A2' of the image A2 and a disparity image B2' of the image B2, which are compatible images, and a disparity image C2' of the image C2 and a disparity image D2' of the image D2, which are auxiliary images, based on the detection result.

In addition, the disparity image generating unit 441, similarly to the disparity image generating unit 143 illustrated in FIG. 14, multiplexes the disparity images C2' and D2' in the spatial direction in accordance with a predetermined multiplexing mode. In addition, the disparity image generating unit 441 (multiplexing unit) multiplexes disparity images A2' and B2' and a multiplexed image of disparity images of the auxiliary images in the time direction. The disparity image generating unit 441 supplies a multiplexed image in which disparity images A2' and B2' and the multiplexed image of the disparity images of the auxiliary images corresponding to one frame exist within one frame time, which is acquired as a result thereof, to the encoder 442 as a time-multiplexed image.

In addition, the disparity image generating unit 441 supplies information that represents a multiplexing mode of the disparity images of the auxiliary images and a multiplexing mode (hereinafter, referred to as a frame sequential mode) in the time direction as a multiplexing mode of the disparity images of the compatible images and the auxiliary images to the disparity image information generating unit 57.

The encoder 442 is configured by a compatible encoder 151 and an auxiliary encoder 451. The auxiliary encoder 451 of the encoder 442 encodes the multiplexed image of the auxiliary images that is supplied from the image converting unit 142 and the time-multiplexed image supplied from the disparity image generating unit 441 in accordance with the 3DV mode. Here, the 3DV mode is a mode that is used for encoding a display image in accordance with a mode of multi-viewpoints that is compliant with the AVC mode or the MVC mode. The auxiliary encoder 451 supplies an encoded stream that is acquired as a result of the encoding process to the multiplexing unit 443 as an auxiliary stream.

The multiplexing unit 443 generates TSs by using the compatible stream supplied from the compatible encoder 151, the auxiliary stream supplied from the auxiliary encoder 451, the image information supplied from the image information generating unit 54, the compatibility information supplied from the compatibility information generating unit 55, the inter-viewpoint distance information supplied from the inter-viewpoint distance information generating unit 56, the disparity image information supplied from the disparity image information generating unit 57, and the like. The multiplexing unit 443 multiplexes the generated TSs and transmits a multiplexed stream that is acquired as a result of the multiplexing process.

Hereinafter, the image information, the compatibility information, the inter-viewpoint distance information, and the disparity image information will be collectively referred to as auxiliary information.

[Example of Description of Disparity Image Information]

FIG. 36 is a diagram that illustrates an example of the description of the disparity image information in the encoding device 440 illustrated in FIG. 35 in a case where the auxiliary information is described in a descriptor of the PMT.

As illustrated in FIG. 36, in a descriptor (depth_map_structure_descriptor) in which the disparity image information is arranged, similarly to the case of FIG. 25, following a descriptor tag (descriptor_tag) and a descriptor length (descriptor_length), the disparity image information is described. In addition, as the disparity image information, similarly to the case of FIG. 25, the number (num_of_depth_map) of disparity images, a flag (is_frame_packing) representing whether or not the disparity images are multiplexed, a multiplexing mode (frame_packing_mode) of the disparity images, information (comb_frame_packing_views) that designates the disparity images that are multiplexed, and the like are described. However, as the multiplexing mode of the disparity mode, not only the side-by-side mode (SBS) or the top-and-bottom mode (TOB) but also the frame-sequential mode is described.

In the encoding device 440 illustrated in FIG. 35, although the auxiliary information is included in the TS, the auxiliary information may be included in the auxiliary stream.

FIG. 37 is a diagram that illustrates an example of the description of the disparity image information included in the auxiliary stream in a case where the auxiliary information is included in the auxiliary stream.

In such a case, as illustrated in FIG. 6, the disparity image information (depth_map_structure), for example, is arranged in the SEI that is included in the auxiliary stream.

In addition, as the disparity image information (depth_map_structure), as illustrated in FIG. 37, the number (num_of_depth_map) of disparity images (depth map), a flag (is_frame_packing) representing whether or not the disparity images are multiplexed, a multiplexing system (frame_packing_mode) of the disparity images, information (comb_frame_packing_views) that designates the disparity images that are multiplexed, and the like are described. However, as the multiplexing mode, similarly to the case of FIG. 36, not only the side-by-side mode (SBS) or the top-and-bottom mode (TOB), but also a frame-sequential mode is described.

Although not illustrated in the figure, the image information is the same as the disparity image information except that the image information is not a disparity image but information of the compatible images and the auxiliary images.

[Description of Process of Encoding Device]

Figure 38:
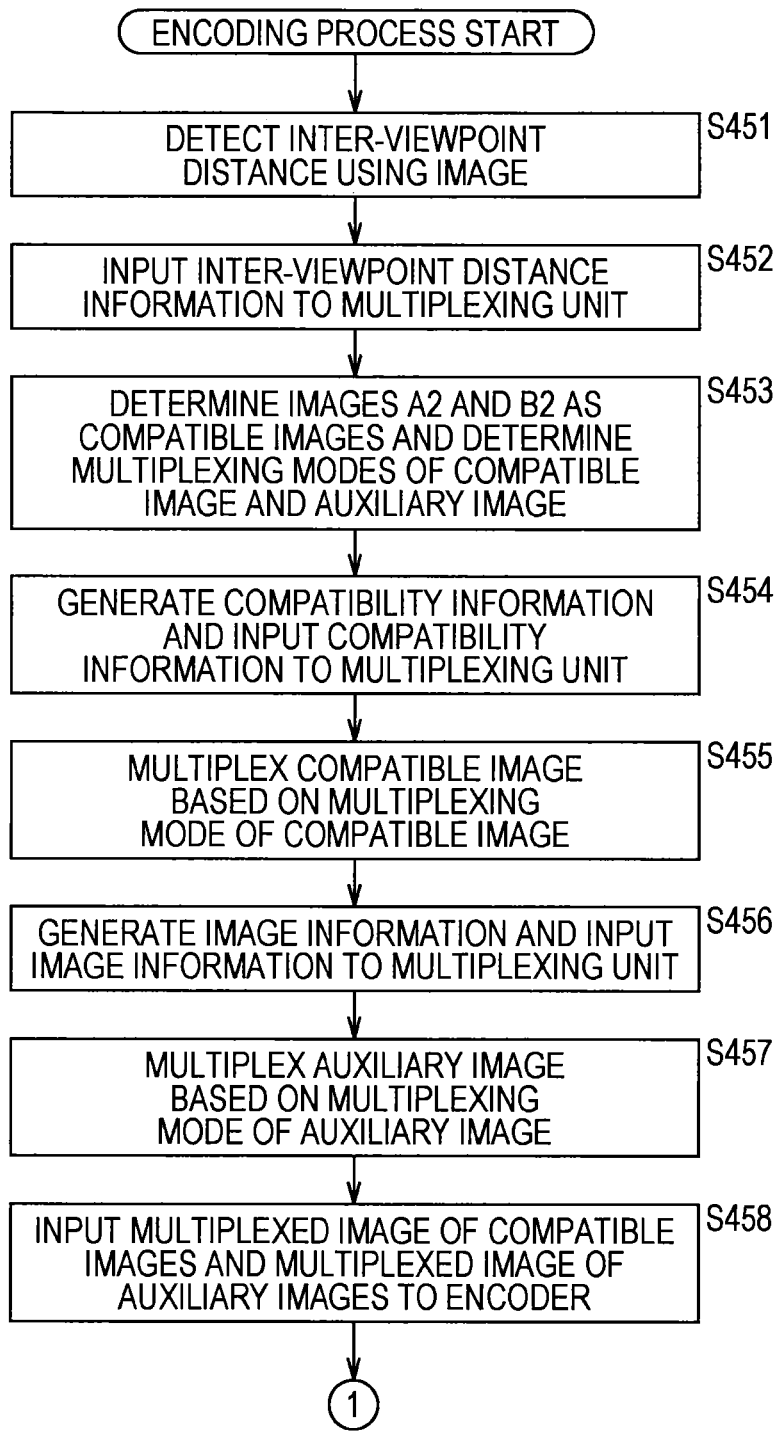
FIG. 38 is a flowchart that illustrates an encoding process performed by the encoding device illustrated in FIG. 35.
Figure 39:
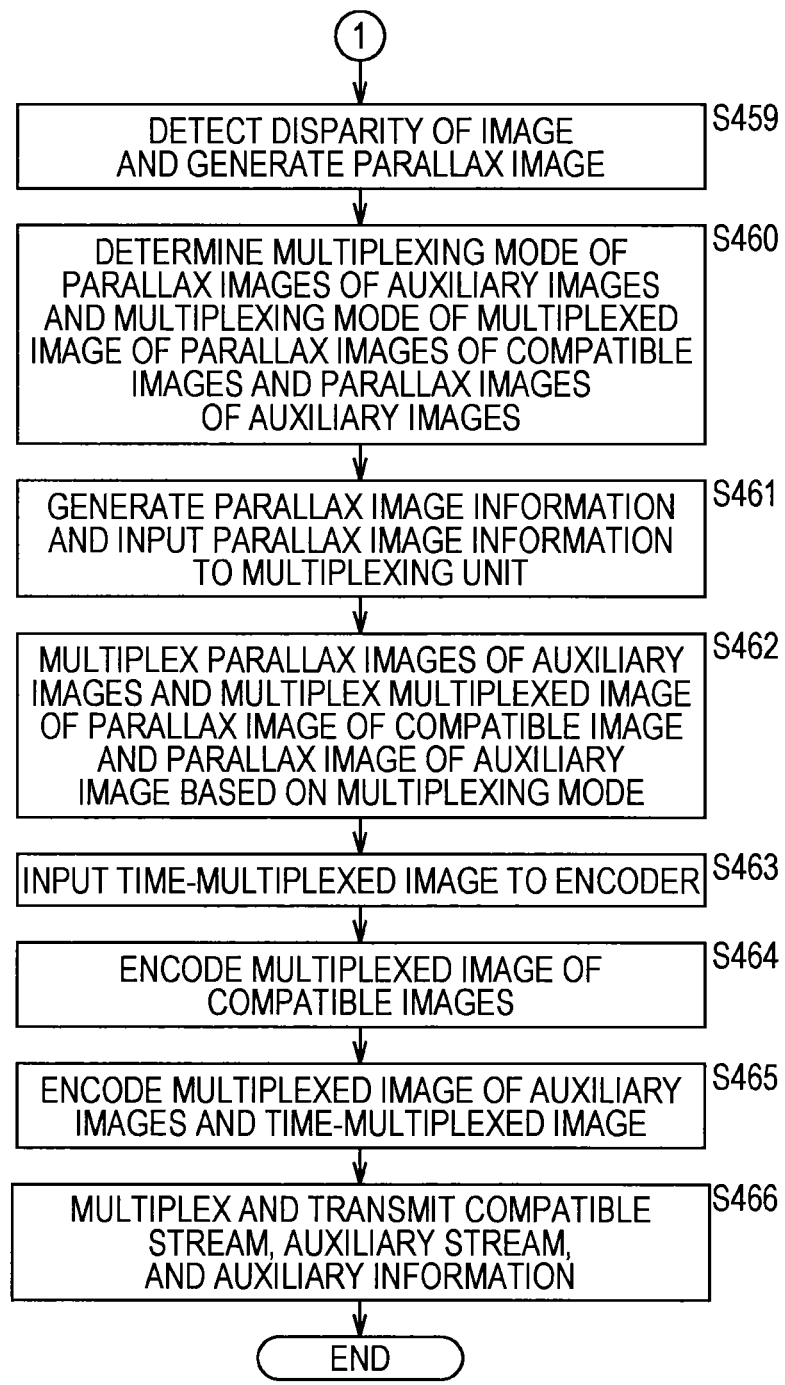
FIG. 39 is a flowchart that illustrates the encoding process performed by the encoding device illustrated in FIG. 35.

FIGS. 38 and 39 are flowcharts that illustrate an encoding process performed by the encoding device 440 illustrated in FIG. 35. This encoding process, for example, is started when images A2 to D2 are output from imaging units 141A to 141D.

The process of Steps S451 to S455 illustrated in FIGS. 38 and 39 is the same as the process of Steps S51 to S55 illustrated in FIGS. 15 and 16, and thus the description thereof will not be presented.

In Step S456, the image information generating unit 54 generates information that represents the multiplexing modes of the compatible images and the auxiliary images and the like as image information based on the information supplied from the image converting unit 142 and inputs the generated image information to the multiplexing unit 443. Then, the process proceeds to Step S457.

The process of Steps S457 to S459 is the same as the process of Steps S57 to S59 illustrated in FIGS. 15 and 16, and thus the description thereof will not be presented.

In Step S460 illustrated in FIG. 39, the disparity image generating unit 441 determines the multiplexing mode of the disparity images of the auxiliary images and the multiplexing mode of the multiplexed image of the disparity images of the compatible images and the disparity images of the auxiliary image and supplies information that represents the multiplexing modes to the disparity image information generating unit 57.

In Step S461, the disparity image information generating unit 57 generates information that represents the multiplexing mode of the disparity images of the auxiliary images and the multiplexing mode of the multiplexed image of the disparity images of the compatible images and the disparity images of the auxiliary images and the like as disparity image information based on the information that is supplied from the disparity image generating unit 441 and inputs the generated disparity image information to the multiplexing unit 443.

In Step S462, the disparity image generating unit 441 multiplexes the disparity images C2' and D2' of the auxiliary images in the spatial direction and multiplexes the disparity images A2' and B2' of the compatible images and the multiplexed image of the disparity images of the auxiliary images in the time direction, based on the multiplexing mode that is determined in Step S460.

In Step S463, the disparity image generating unit 441 inputs the time-multiplexed image that is acquired as a result of the multiplexing process of Step S462 to the encoder 442.

In Step S464, the compatible encoder 151 of the encoder 442 encodes the multiplexed image of the compatible images that is supplied from the image converting unit 142 in accordance with the existing AVC mode and supplies an encoded stream that is acquired as a result thereof to the multiplexing unit 443 as a compatible stream.

In Step S465, the auxiliary encoder 451 encodes the multiplexed image of the auxiliary images that is supplied from the image converting unit 142 and the time-multiplexed image that is supplied from the disparity image generating unit 441 in accordance with the 3DV mode. The auxiliary encoder 451 supplies an encoded stream that is acquired as a result of the encoding process to the multiplexing unit 443 as an auxiliary stream.

In Step S466, the multiplexing unit 443 generates TSs from the compatible stream supplied from the compatible encoder 151 and the auxiliary stream and the auxiliary information that are supplied from the auxiliary encoder 451, performs a multiplexing process thereof, and transmits a multiplexed stream acquired as a result thereof. This multiplexed stream, for example, is recorded on a BD or the like or is transmitted as a broadcast stream. Then, the process ends.

[Configuration Example of Decoding Device]

Figure 40:
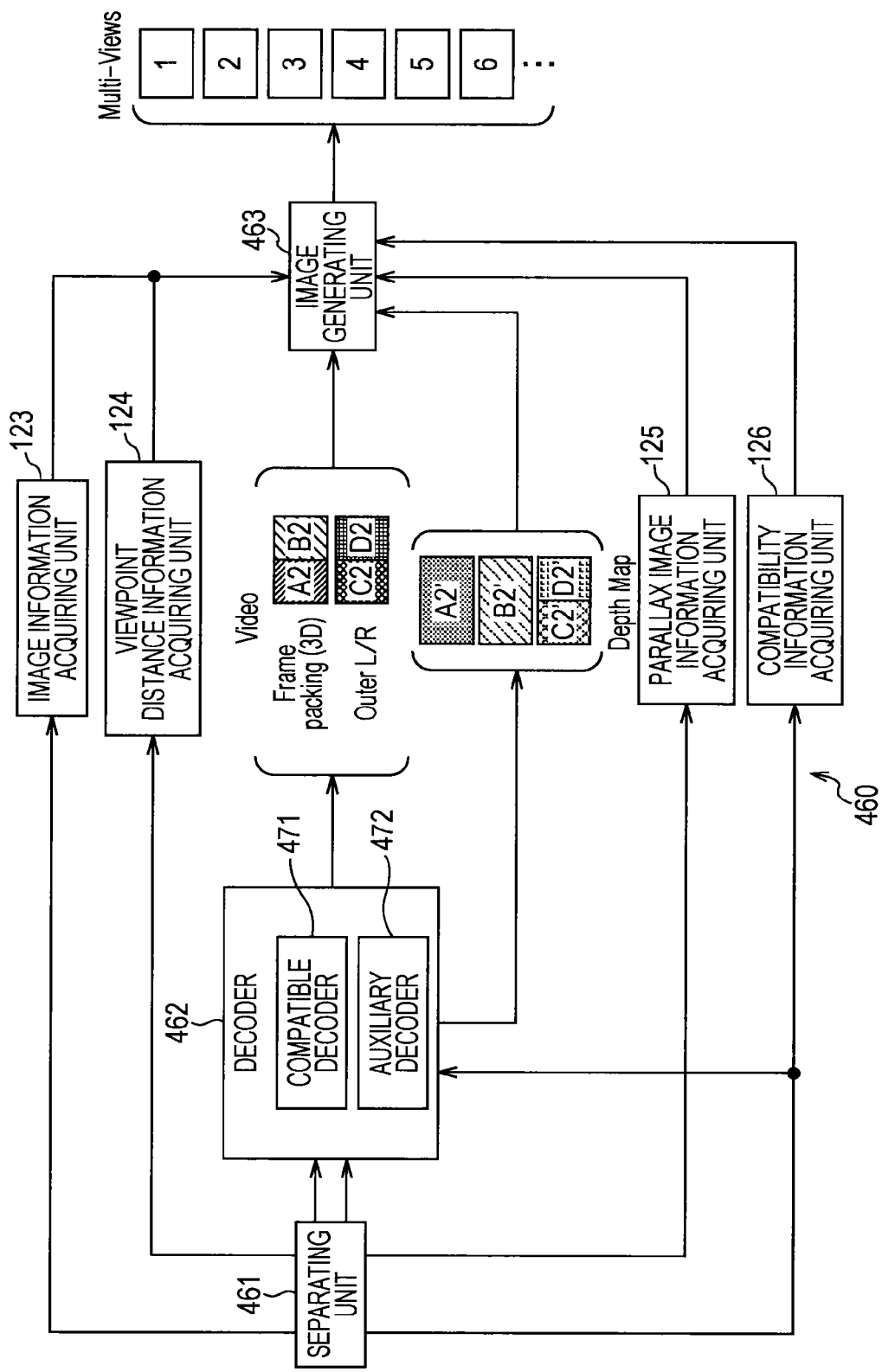
FIG. 40 is a diagram that illustrates a configuration example of a decoding device that corresponds to the encoding device illustrated in FIG. 35.

FIG. 40 is a diagram that illustrates a configuration example of a decoding device that decodes a multiplexed stream that is transmitted from the encoding device 440 illustrated in FIG. 35.

In the configuration illustrated in FIG. 40, the same reference numeral is assigned to a configuration that is the same as that illustrated in FIG. 17. Duplicate description will not be presented as is appropriate.

The configuration of the decoding device 460 illustrated in FIG. 40 is mainly different from the configuration illustrated in FIG. 17 in that a separation unit 461, a decoder 462, and an image generating unit 463 are disposed instead of the separation unit 121, the decoder 122, and the image generating unit 171. The decoding device 460 generates images of two viewpoints or multi-viewpoint images by decoding the multiplexed stream that is transmitted from the encoding device 440 and displays the generated images on a display device not illustrated in the figure.

More specifically, the separation unit 461 of the decoding device 460 receives a multiplexed stream that is transmitted from the encoding device 440 and separates each TS. The separation unit 461 extracts a compatible stream and an auxiliary stream from the separated TS and supplies the extracted streams to the decoder 462. In addition, the separation unit 461 extracts auxiliary information that is included in the TS, supplies image information included in the auxiliary information to the image information acquiring unit 123, and supplies viewpoint distance information to the inter-viewpoint distance information acquiring unit 124. Furthermore, the separation unit 461 supplies disparity image information included in the auxiliary information to the disparity image information acquiring unit 125 and supplies compatibility information to the compatibility information acquiring unit 126 and the decoder 462.

The decoder 462 is configured by a compatible decoder 471 and an auxiliary decoder 472. The compatible decoder 471 of the decoder 462 identifies the compatible stream out of the compatible stream and the auxiliary stream supplied from the separation unit 461 based on the compatibility information that is supplied from the separation unit 461. The compatible decoder 471 decodes the encoded compatible image included in the compatible stream in accordance with a mode that corresponds to the AVC mode and supplies a multiplexed image of the compatible images acquired as a result of the decoding process to the image generating unit 463.

The auxiliary decoder 472 identifies the auxiliary stream out of the compatible stream and the auxiliary stream that are supplied from the separation unit 461 based on the compatibility information that is supplied from the separation unit 461. The auxiliary decoder 472 decodes the multiplexed image of auxiliary images and the time-multiplexed image, which are encoded, included in the auxiliary stream supplied from the separation unit 461 in accordance with a mode that corresponds to the auxiliary encoder 451 illustrated in FIG. 35. The auxiliary decoder 472 supplies the multiplexed image of the auxiliary images and the time-multiplexed image that are acquired as a result of the decoding process to the image generating unit 463.

The image generating unit 463 outputs an image in accordance with an instruction supplied from a viewer and displays the image on a display device not illustrated in the figure. Described in more detail, the image generating unit 463 generates images of three or more viewpoints, which correspond to a display device not illustrated in the figure, each having the resolution that is a half of the resolution of the compatible image or the auxiliary image by using the multiplexed image of compatible images, the multiplexed image of the auxiliary images, and the time-multiplexed image in accordance with a viewer's instruction for displaying a 3D image of the multi-viewpoint mode based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, and the like.

Described in more detail, the image generating unit 463 (separation unit) separates disparity images A2' and B2' that are the disparity images of the compatible images and the multiplexed image of the disparity images of the auxiliary images from the time-multiplexed image based on the information representing the frame sequential mode as the multiplexing mode of the multiplexed image of the disparity images of the compatible images and the disparity images of the auxiliary images included in the disparity image information that is supplied from the disparity image information acquiring unit 125. Then, the image generating unit 463 separates the disparity images C2' and D2' from the multiplexed image of the disparity images of the auxiliary images based on the multiplexing mode of the disparity images of the auxiliary images that is included in the disparity image information.

In addition, the image generating unit 463, similarly to the image generating unit 171 illustrated in FIG. 17, separates each auxiliary image from the multiplexed image of the auxiliary images based on the information that represents the multiplexing mode of the auxiliary images that is included in the image information supplied from the image information acquiring unit 123. Furthermore, the image generating unit 463, similarly to the image generating unit 171, separates each compatible image from the multiplexed image of the compatible images based on the information that represents the multiplexing mode of the compatible images that is included in the image information.

Furthermore, the image generating unit 463, similarly to the image generating unit 171, determines the position of each viewpoint of multi-viewpoint images to be generated based on the inter-viewpoint distance information and the number of viewpoints corresponding to a display device not illustrated in the figure. Then, the image generating unit 463, similarly to the image generating unit 171, generates the image of each viewpoint of which the position is determined by using each compatible image, each auxiliary image, the disparity image of each compatible image, and the disparity image of each auxiliary image. Then, the image generating unit 463, similarly to the image generating unit 171, converts the resolution of the generated multi-viewpoint images into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 463, similarly to the image generating unit 171 separates the multiplexed image of the compatible images that is supplied from the decoder 462 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 463, similarly to the image generating unit 171, alternately outputs the separated images A2 and B2 of which the resolution is a half of the resolution of the compatible image, thereby displaying the separated images on a display device not illustrated in the figure. At this time, the viewer can view a 3D image by wearing glasses in which one a left-eye shutter and a right-eye shutter is open at the time of displaying the image A2, and the other is open at the time of displaying the image B2 and viewing the images A2 and B2 that are alternately displayed on the display device.

[Description of Decoding Process]

Figure 41:
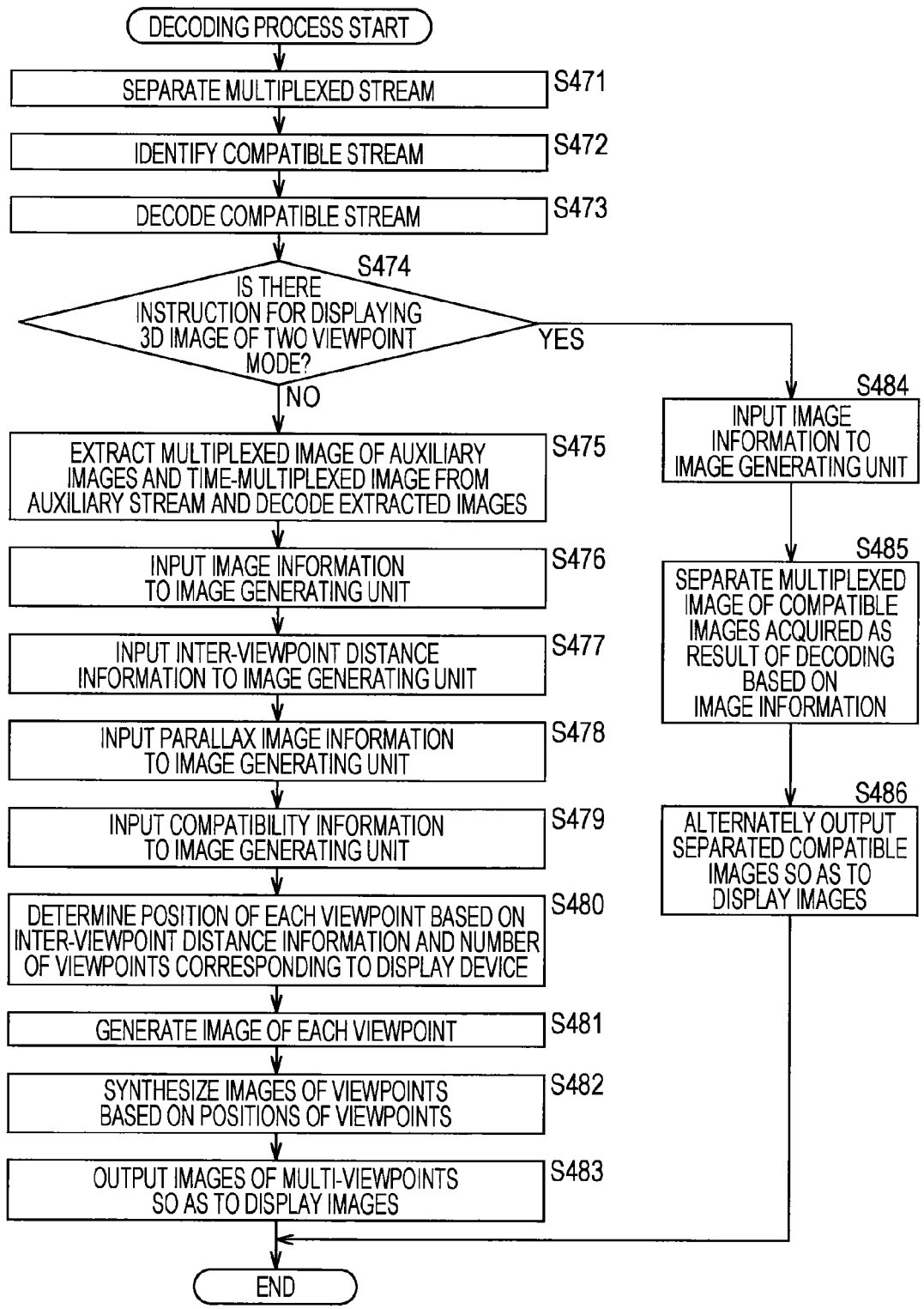
FIG. 41 is a flowchart that illustrates a decoding process performed by the decoding device illustrated in FIG. 40.

FIG. 41 is a flowchart that illustrates a decoding process performed by the decoding device 460 illustrated in FIG. 40. This decoding process, for example, is started when a multiplexed stream that is transmitted from the encoding device 440 illustrated in FIG. 35 is input to the decoding device 460.

In Step S471 illustrated in FIG. 41, the separation unit 461 of the decoding device 460 receives the multiplexed stream that is transmitted from the encoding device 50 and separates each TS. The separation unit 461 supplies the compatible stream and the auxiliary stream that are included in the separated TS to the decoder 462. In addition, the separation unit 461 extracts the auxiliary information included in the TS, supplies the image information included in the auxiliary information to the image information acquiring unit 123, and supplies the viewpoint distance information to the inter-viewpoint distance information acquiring unit 124. Furthermore, the separation unit 461 supplies the disparity image information that is included in the auxiliary information to the disparity image information acquiring unit 125 and supplies the compatibility information to the compatibility information acquiring unit 126 and the decoder 462.

In Step S472, the compatible decoder 471 identifies the compatible stream out of the compatible stream and the auxiliary stream that are supplied from the separation unit 461 based on the compatibility information that is supplied from the separation unit 461.

In Step S473, the compatible decoder 471 decodes the compatible image that is included in the compatible stream in accordance with a mode that corresponds to the AVC mode and supplies a multiplexed image of the compatible images that is acquired as a result of the decoding process to the image generating unit 463.

In Step S474, the image generating unit 463 determines whether or not an instruction for displaying a 3D image of the two-viewpoint mode has been made by a viewer, as indicated by "YES" and "NO" in the flow chart. In a case where it is determined that the instruction for displaying a 3D image of the two-viewpoint mode has not been made by the viewer in Step S474, in other words, in a case where an instruction for displaying a 3D image of the multi-viewpoint mode has been made, the auxiliary decoder 472 identifies the auxiliary stream out of the compatible stream and the auxiliary stream that are supplied from the separation unit 461 based on the compatibility information.

Figure 1:
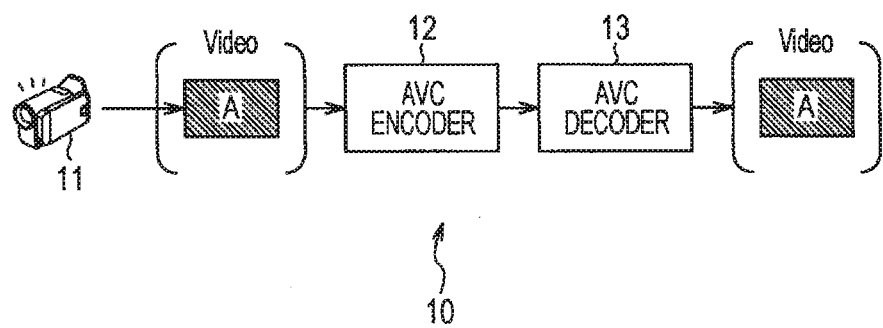
FIG. 1 is a diagram that illustrates an example of an image processing system that encodes a 2D image in accordance with an AVC mode and decodes the encoded image.
Figure 2:
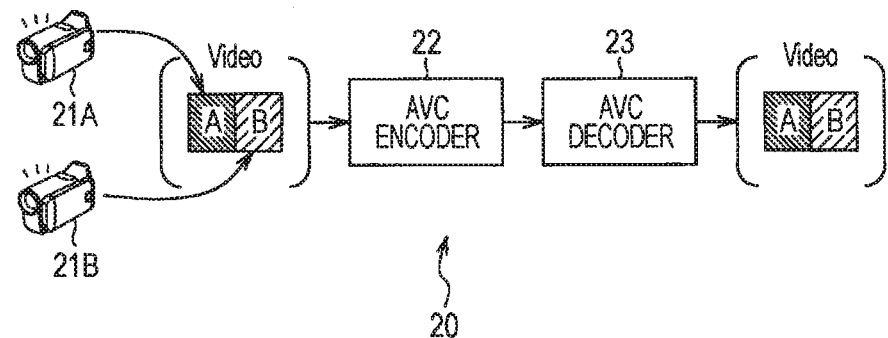
FIG. 2 is a diagram that illustrates an example of an image processing system that encodes an image of two viewpoints in accordance with an AVC mode and decodes the encoded image.
Figure 3:
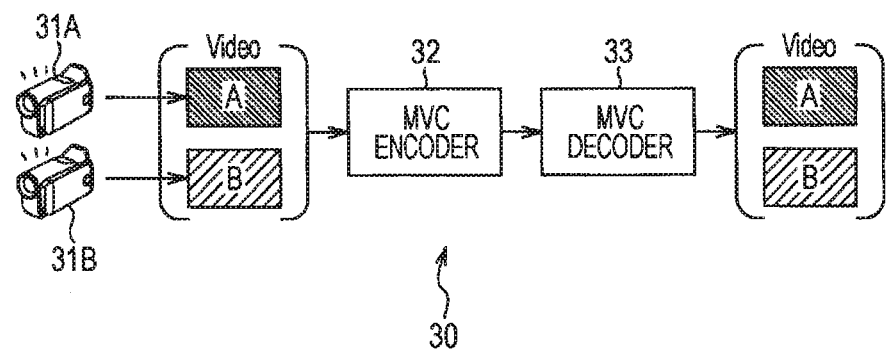
FIG. 3 is a diagram that illustrates an example of an image processing system that encodes an image of two viewpoints in accordance with an MVC mode and decodes the encoded image.
Figure 4:
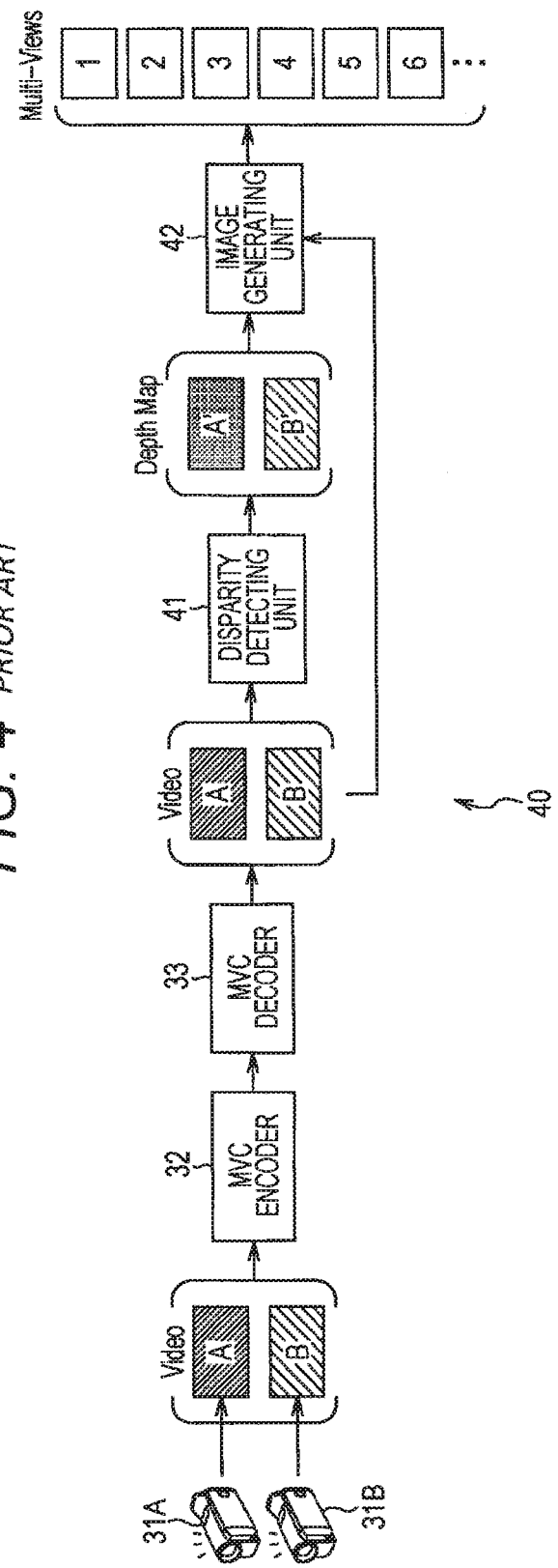
FIG. 4 is a diagram that illustrates an example of an image processing system that generates an image of multi-viewpoints by encoding an image of two viewpoints in accordance with the MVC mode and decoding the encoded image.

Then, in Step S475, the auxiliary decoder 472 extracts a multiplexed image of the auxiliary images and a time-multiplexed image, which are encoded, from the auxiliary stream and decodes the extracted multiplexed images in accordance with a mode that corresponds to the auxiliary encoder 62 illustrated in FIG. 2. The auxiliary decoder 472 supplies the multiplexed image of the auxiliary images and the time-multiplexed image that are acquired as a result of the decoding process to the image generating unit 127, and the process proceeds to Step S476.

In Step S476, the image information acquiring unit 123 acquires the image information that is supplied from the separation unit 461 and inputs the acquired image information to the image generating unit 463. In Step S477, the inter-viewpoint distance information acquiring unit 124 acquires the inter-viewpoint distance information that is supplied from the separation unit 461 and inputs the acquired inter-viewpoint distance information to the image generating unit 463.

In Step S478, the disparity image information acquiring unit 125 acquires the disparity image information that is supplied from the separation unit 461 and inputs the acquired disparity image information to the image generating unit 463. In Step S479, the compatibility information acquiring unit 126 acquires the compatibility information that is supplied from the separation unit 461 and inputs the acquired compatibility information to the image generating unit 463.

In Step S480, the image generating unit 463 determines the position of each viewpoint of a multi-viewpoint image to be generated based on the inter-viewpoint distance information supplied from the inter-viewpoint distance information acquiring unit 124 and the number of viewpoints that corresponds to a display device not illustrated in the figure.

In Step S481, the image generating unit 463 generates images of the viewpoints each having the resolution that is a half of the resolution of the compatible image or the auxiliary image based on the position of each viewpoint determined in Step S480, the image information supplied from the image information acquiring unit 123, the disparity image information supplied from the disparity image information acquiring unit 125, the compatibility information supplied from the compatibility information acquiring unit 126, and the like by using the multiplexed image of the compatible images, the multiplexed image of the auxiliary images, and the time-multiplexed image.

Steps S482 and S483 are the same as Steps S92 and S93 illustrated in FIG. 18, and thus the description thereof will not be presented.

In a case where it is determined that the instruction for displaying a 3D image of the two-viewpoint mode has been made by a viewer in Step S474, in Step S484, the image information acquiring unit 123 acquires the image information that is supplied from the separation unit 461 and inputs the acquired image information to the image generating unit 463.

The process of Steps S485 and S486 is the same as the process of Steps S94 and S95 illustrated in FIG. 18, and thus the description thereof will not be presented.

In addition, in a decoding device that can decode only a compatible stream that has compatibility with the decoding device 460, the auxiliary stream is ignored, and only the process of Steps S473, S484, and S485 is performed. However, in such a case, in the process of Step S484, a multiplexed image of the compatible images is separated based on the multiplexing mode determined in advance.

Sixth Embodiment

[Configuration Example of Encoding Device According to Sixth Embodiment]

Figure 42:
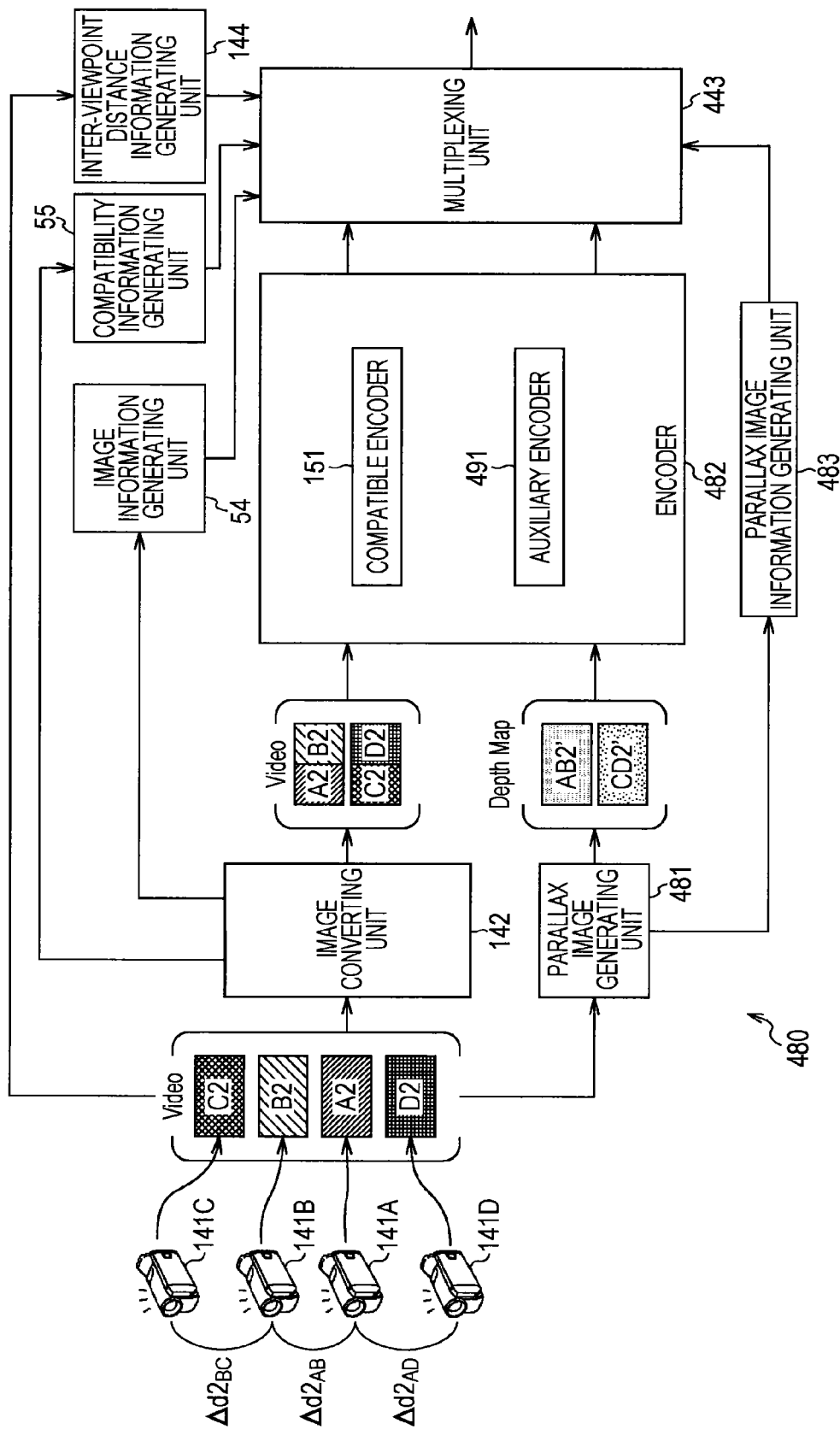
FIG. 42 is a block diagram that illustrates a configuration example of an encoding device according to a sixth embodiment of the present technology.

FIG. 42 is a block diagram that illustrates a configuration example of an encoding device according to a sixth embodiment of the present technology.

In the configuration illustrated in FIG. 42, the same reference numeral is assigned to a configuration that is the same as that illustrated in FIG. 35. Duplicate description will not be presented as is appropriate.

The configuration of the encoding device 480 illustrated in FIG. 42 is mainly different from the configuration illustrated in FIG. 35 in that a disparity image generating unit 481, an encoder 482, and a disparity image information generating unit 483 are disposed instead of the disparity image generating unit 143, the encoder 145, and the disparity image information generating unit 57. The encoding device 480 encodes a common disparity image that shows a disparity value that is common to the compatible images and a common disparity image of the auxiliary images.

More specifically, the disparity image generating unit 481 of the encoding device 480 detects the disparity of each pixel between images A2 and B2 and the disparity of each pixel between images C2 and D2 using the images A2 to D2 that are supplied from the imaging units 141A to 141D. The disparity image generating unit 481 generates a disparity image formed by disparity values that represent the disparity of each pixel between the images A2 and B2 as a common disparity image AB2' of the compatible images and supplies the generated common disparity image to the encoder 482. In addition, the disparity image generating unit 481 generates a disparity image formed by disparity values that represent the disparity of each pixel between the images C2 and D2 as a common disparity image CD2' of the auxiliary images and supplies the generated common disparity image to the encoder 482.

Furthermore, the disparity image generating unit 481 supplies information that represents that the disparity images of the compatible images and the auxiliary images are common disparity images to the disparity image information generating unit 483.

The encoder 482 is configured by a compatible encoder 151 and an auxiliary encoder 491. The auxiliary encoder 491 encodes the multiplexed image of auxiliary images that is supplied from the image converting unit 142 and the common disparity image AB2' of the compatible images and the common disparity image CD2' of the auxiliary images that are supplied from the disparity image generating unit 481 in accordance with the 3DV mode. The auxiliary encoder 491 supplies an encoded stream acquired as a result thereof to the multiplexing unit 443 as an auxiliary stream.

The disparity image information generating unit 483 generates information representing that the disparity images of the compatible images and the auxiliary images are common disparity images and the like as disparity image information based on the information that is supplied from the disparity image generating unit 53 and supplies the generated disparity image information to the multiplexing unit 443.

[Description of Process of Encoding Device]

Figure 43:
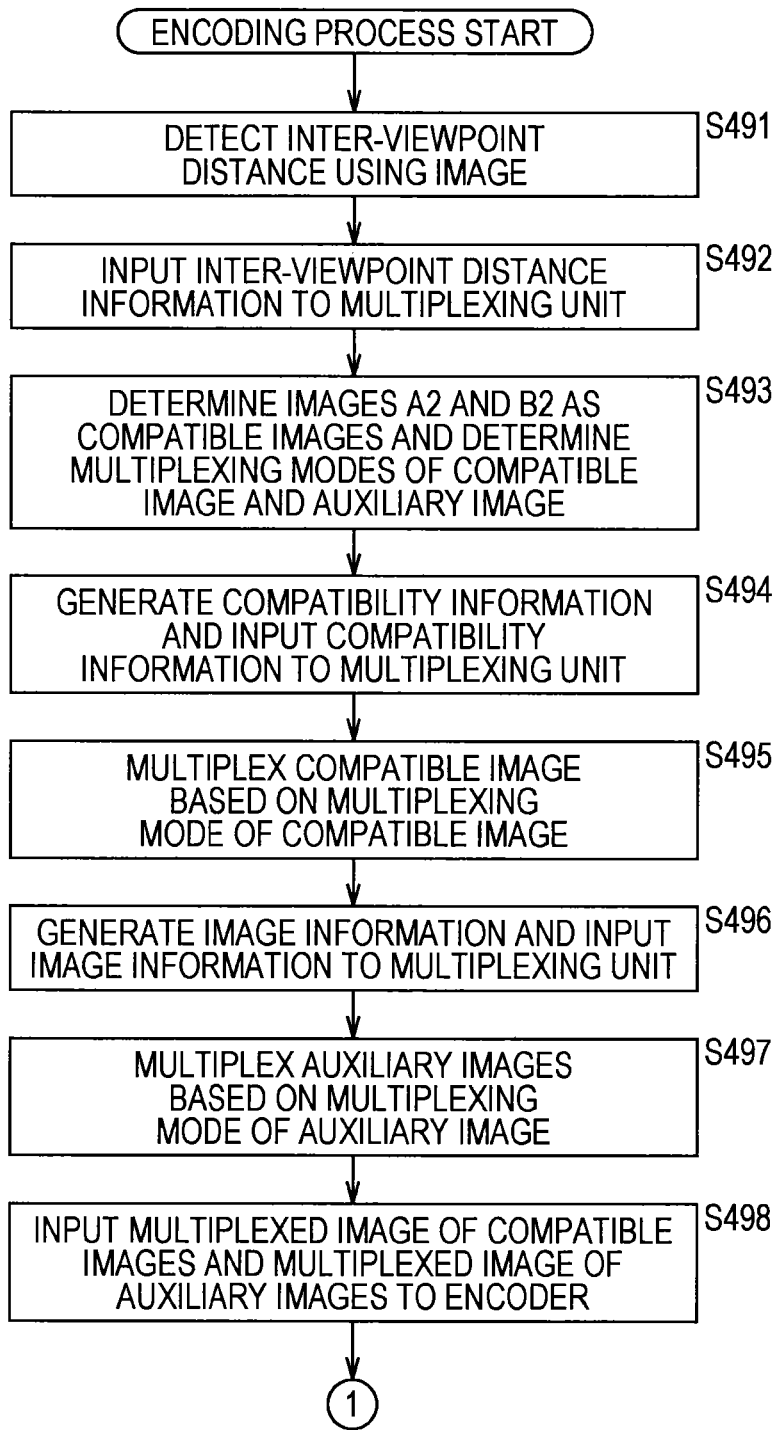
FIG. 43 is a flowchart that illustrates an encoding process performed by the encoding device illustrated in FIG. 42.
Figure 44:
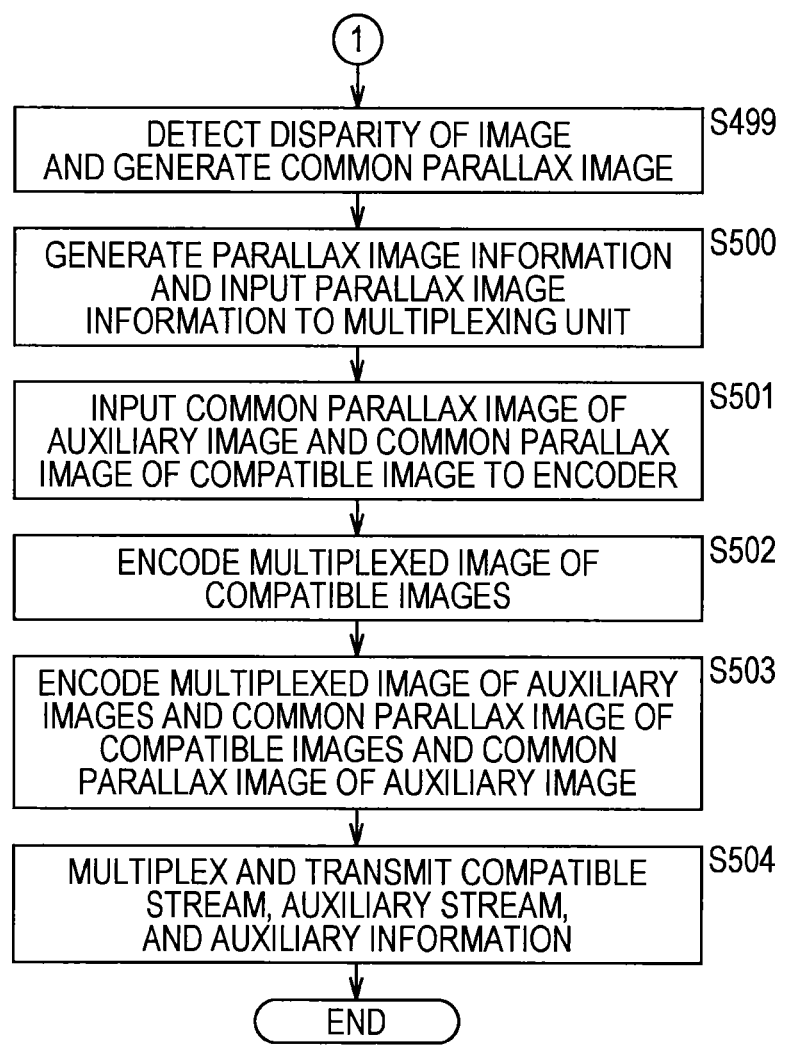
FIG. 44 is a flowchart that illustrates the encoding process performed by the encoding device illustrated in FIG. 42.

FIGS. 43 and 44 represent a flowchart that illustrates an encoding process that is performed by the encoding device 480 illustrated in FIG. 42. This encoding process, for example, is started when images A2 to D2 are output from the imaging units 141A to 141D.

The process of Steps S491 to S498 illustrated in FIG. 43 is similar to that of Steps S451 to S458 illustrated in FIG. 38, and thus, the description thereof will not be presented.

In Step S499 illustrated in FIG. 44, the disparity image generating unit 481 detects the disparity of each pixel between images A2 and B2 and the disparity of each pixel between images C2 and D2 using the images A2 to D2 that are supplied from the imaging units 141A to 141D. Then, the disparity image generating unit 481 generates a common disparity image AB2' that is formed by disparity values that represent the disparity of each pixel between the images A2 and B2 and a common disparity image CD2' that is formed by disparity values that represent the disparity of each pixel between the images C2 and D2.

In Step S500, the disparity image information generating unit 483 generates information representing that the disparity images of the compatible images and the auxiliary images are common disparity images and the like as disparity image information based on the information that is supplied from the disparity image generating unit 481 and inputs the generated disparity image information to the multiplexing unit 443.

In Step S501, the disparity image generating unit 481 inputs the common disparity images CD2' of the auxiliary images and the common disparity images AB2' of the compatible images, which are generated in Step S499, to the encoder 482.

In Step S502, the compatible encoder 151 of the encoder 482 encodes the multiplexed image of the compatible images that is supplied from the image converting unit 142 in accordance with the existing AVC mode and supplies an encoded stream acquired as a result thereof to the multiplexing unit 443 as a compatible stream.

In Step S503, the auxiliary encoder 491 encodes the multiplexed image of the auxiliary images supplied from the image converting unit 142 and the common disparity image of the compatible images and the common disparity image of the auxiliary images that are supplied from the disparity image generating unit 481 in accordance with the 3DV mode. The auxiliary encoder 491 supplies an encoded stream acquired as a result of the encoding process to the multiplexing unit 443 as an auxiliary stream.

In Step S504, the multiplexing unit 443 generates TSs from the compatible stream that is supplied from the compatible encoder 151 and the auxiliary stream and the auxiliary information that are supplied from the auxiliary encoder 491, performs a multiplexing process thereof, and transmits a multiplexed stream acquired as a result thereof. This multiplexed stream, for example, is recorded on a BD or the like or is transmitted as a broadcast stream. Then, the process ends.

[Configuration Example of Decoding Device]

Figure 45:
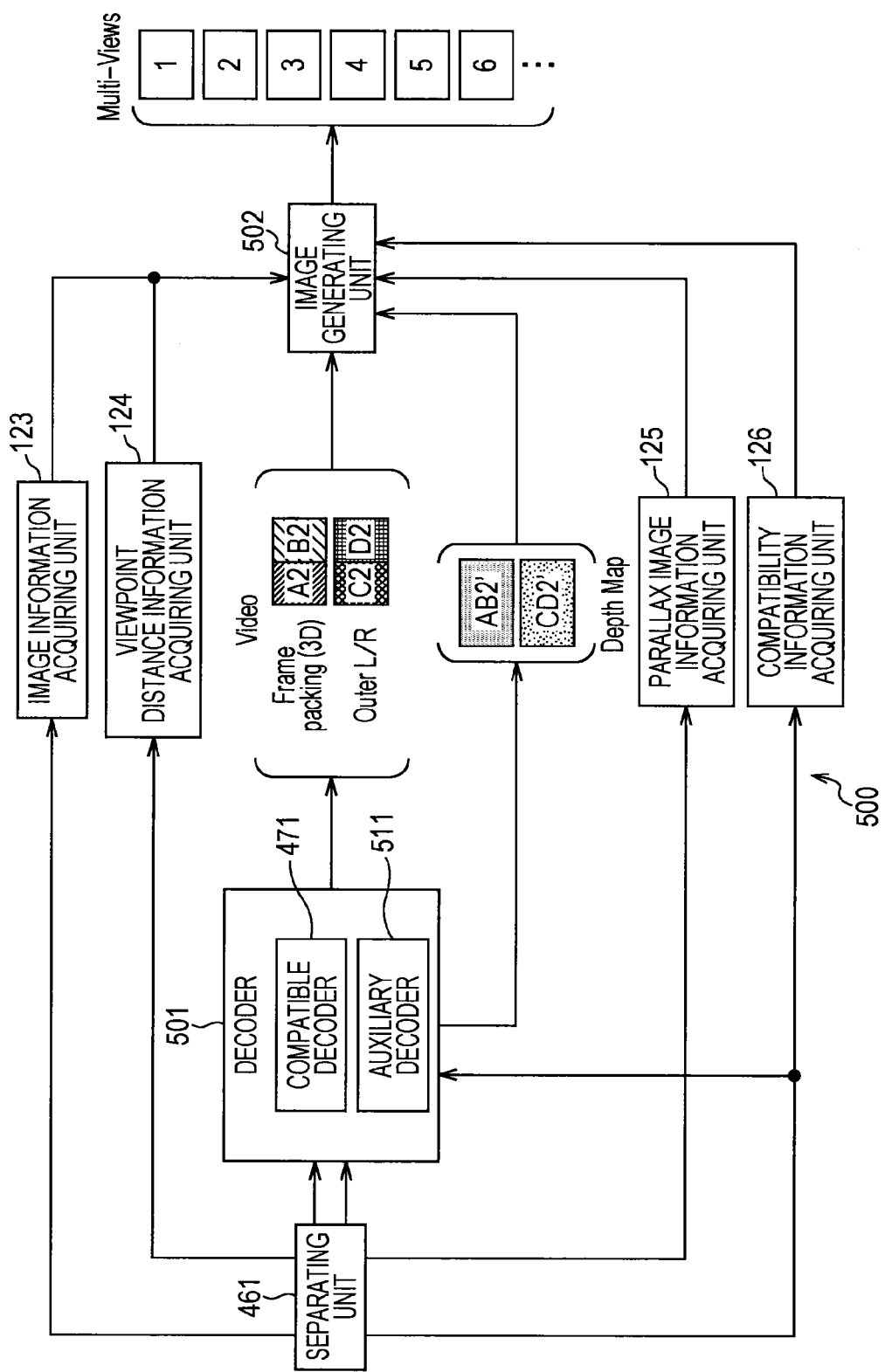
FIG. 45 is a diagram that illustrates a configuration example of a decoding device that corresponds to the encoding device illustrated in FIG. 42.

FIG. 45 is a diagram that illustrates a configuration example of a decoding device that decodes the multiplexed stream transmitted from the encoding device 480 illustrated in FIG. 42.

In the configuration illustrated in FIG. 45, the same reference numeral is assigned to a configuration that is the same as that illustrated in FIG. 40. Duplicate description will not be presented as is appropriate.

The configuration of the decoding device 500 illustrated in FIG. 45 is mainly different from the configuration illustrated in FIG. 40 in that a decoder 501 and an image generating unit 502 are disposed instead of the decoder 122 and the image generating unit 171. The decoding device 500 generates images of two viewpoints or multi-viewpoint images by decoding the multiplexed stream that is transmitted from the encoding device 480 and displays the generated images on a display device not illustrated in the figure.

More specifically, the decoder 501 of the decoding device 500 is configured by a compatible decoder 471 and an auxiliary decoder 511. The auxiliary decoder 511 of the decoder 501 identifies the compatible stream out of the compatible stream and the auxiliary stream that are supplied from the separation unit 461 based on the compatibility information that is supplied from the separation unit 461. In addition, the auxiliary decoder 511 decodes the multiplexed image of auxiliary images that is included in the auxiliary stream, the common disparity image AB2' of the compatible images, and the common disparity image CD2' of the auxiliary images in accordance with a mode that corresponds to the auxiliary encoder 491 illustrated in FIG. 42. The auxiliary decoder 511 supplies the multiplexed image of the auxiliary images and the common disparity images AB2' and CD2' that are acquired as a result of the decoding process to the image generating unit 502.

The image generating unit 502 outputs an image in accordance with an instruction supplied from a viewer and displays the image on a display device not illustrated in the figure. When described in more detail, the image generating unit 502 generates images of three or more viewpoints, which correspond to a display device not illustrated in the figure, each having the resolution that is a half of the resolution of the compatible image or the auxiliary image by using the multiplexed image of compatible images, the multiplexed image of the auxiliary images, and the common disparity images AB2' and CD2' in accordance with a viewer's instruction for displaying a 3D image of the multi-viewpoint mode based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, and the like.

Described in more detail, the image generating unit 502 maintains the common disparity images AB2' and CD2' without being changed based on the information representing that the disparity images of the compatible images and the auxiliary images are common disparity images that is included in the disparity image information supplied from the disparity image information acquiring unit 125.

In addition, the image generating unit 502, similarly to the image generating unit 171 illustrated in FIG. 17, separates each auxiliary image from the multiplexed image of the auxiliary images based on the information that represents the multiplexing mode of the auxiliary images that is included in the image information supplied from the image information acquiring unit 123. Furthermore, the image generating unit 502, similarly to the image generating unit 171, separates each compatible image from the multiplexed image of the compatible images based on the information that represents the multiplexing mode of the compatible images that is included in the image information.

Furthermore, the image generating unit 502, similarly to the image generating unit 171, determines the position of each viewpoint of the multi-viewpoint images to be generated based on the inter-viewpoint distance information and the number of viewpoints that corresponds to a display device not illustrated in the figure. Then, the image generating unit 502 generates the image of each viewpoint of which the position is determined by using each compatible image, each auxiliary image, the common disparity image AB2', and the common disparity image CD2'. Then, the image generating unit 502, similarly to the image generating unit 171, converts the resolution of the generated multi-viewpoint images into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 502, similarly to the image generating unit 171, separates from the multiplexed image of the compatible images that is supplied from the decoder 501 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 502, similarly to the image generating unit 171, alternately outputs the separated images A2 and B2 of which the resolution is a half of the resolution of the compatible image, thereby displaying the separated images on a display device not illustrated in the figure. At this time, the viewer can view a 3D image by wearing glasses in which one a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 46:
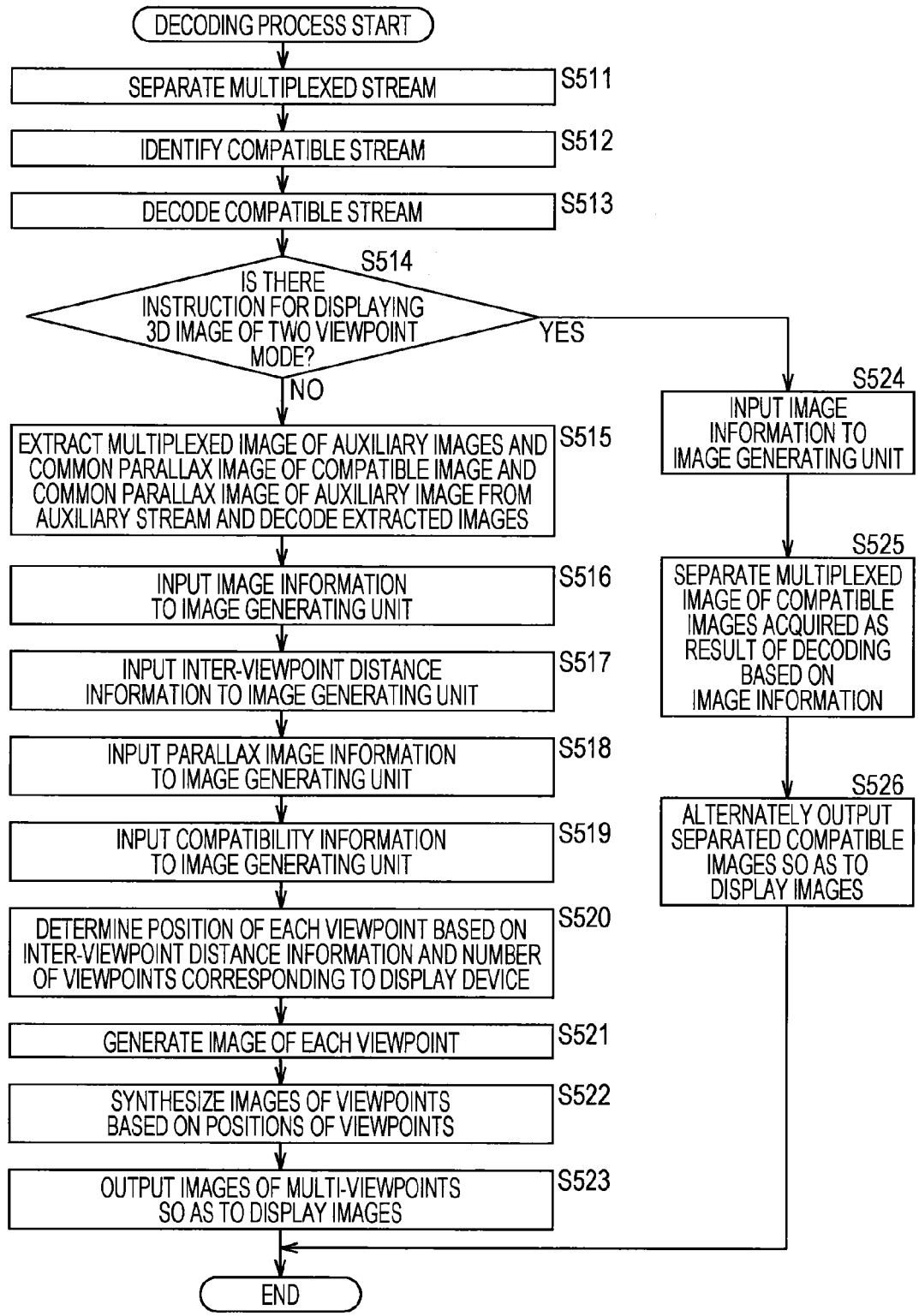
FIG. 46 is a flowchart that illustrates a decoding process performed by the decoding device illustrated in FIG. 45.

FIG. 46 is a flowchart that illustrates a decoding process performed by the decoding device 500 illustrated in FIG. 45. This decoding process, for example, is started when a multiplexed stream that is transmitted from the encoding device 480 illustrated in FIG. 42 is input to the decoding device 500.

The process of Steps S511 to S514 illustrated in FIG. 46 is similar to that of Steps S471 to S474 illustrated in FIG. 41, including Step S514 of determining whether there is an instruction for displaying a 3D image of a two-viewpoint mode, as indicated by "YES" and "NO" in the flow chart, and thus, the description thereof will not be presented.

In Step S515, the auxiliary decoder 511 extracts the multiplexed image of the auxiliary images, the common disparity image AB2' of the compatible images, and the common disparity image CD2' of the auxiliary images, which are encoded, and decodes the extracted images in accordance with a mode that corresponds to the auxiliary encoder 491 illustrated in FIG. 42. The auxiliary decoder 511 supplies the multiplexed image of the auxiliary images, the common disparity image AB2', and the common disparity image CD2', which are acquired as a result of the decoding process, to the image generating unit 502.

The process of Steps S516 to S520 is similar to that of Steps S476 to S480 illustrated in FIG. 41, and thus, the description thereof will not be presented.

After the process of Step S520, in Step S521, the image generating unit 502 generates an image of each viewpoint of which the resolution is a half of the resolution of the compatible image or the auxiliary image by using the compatible images, the multiplexed image of the auxiliary images, the common disparity image AB2', and the common disparity image CD2' based on the position of each viewpoint determined in Step S519, the image information supplied from the image information acquiring unit 123, the disparity image information supplied from the disparity image information acquiring unit 125, and the compatibility information supplied from the compatibility information acquiring unit 126, and the like.

The process of Steps S522 to S526 is similar to that of Steps S482 to S486 illustrated in FIG. 41, and thus, the description thereof will not be presented.

Although the encoding devices 440 and 480, similarly to the encoding device 140, multiplex and encode compatible images of two view points, similarly to the encoding device 180 illustrated in FIG. 19, the encoding devices 440 and 480 may encode compatible images of two viewpoints without multiplexing them. In addition, the encoding devices 440 and 480, similarly to the encoding device 50 illustrated in FIG. 5, may encode a compatible image of one viewpoint.

In addition, the encoding devices 140 and 180 may encode the disparity images of the compatible images and the auxiliary images without multiplexing the above-described disparity images. Furthermore, the encoding device 50 may encode the disparity images of the auxiliary images without multiplexing the above-described disparity images.

<Example of Multiplexed Pattern of Encoding Target>

Figure 47:
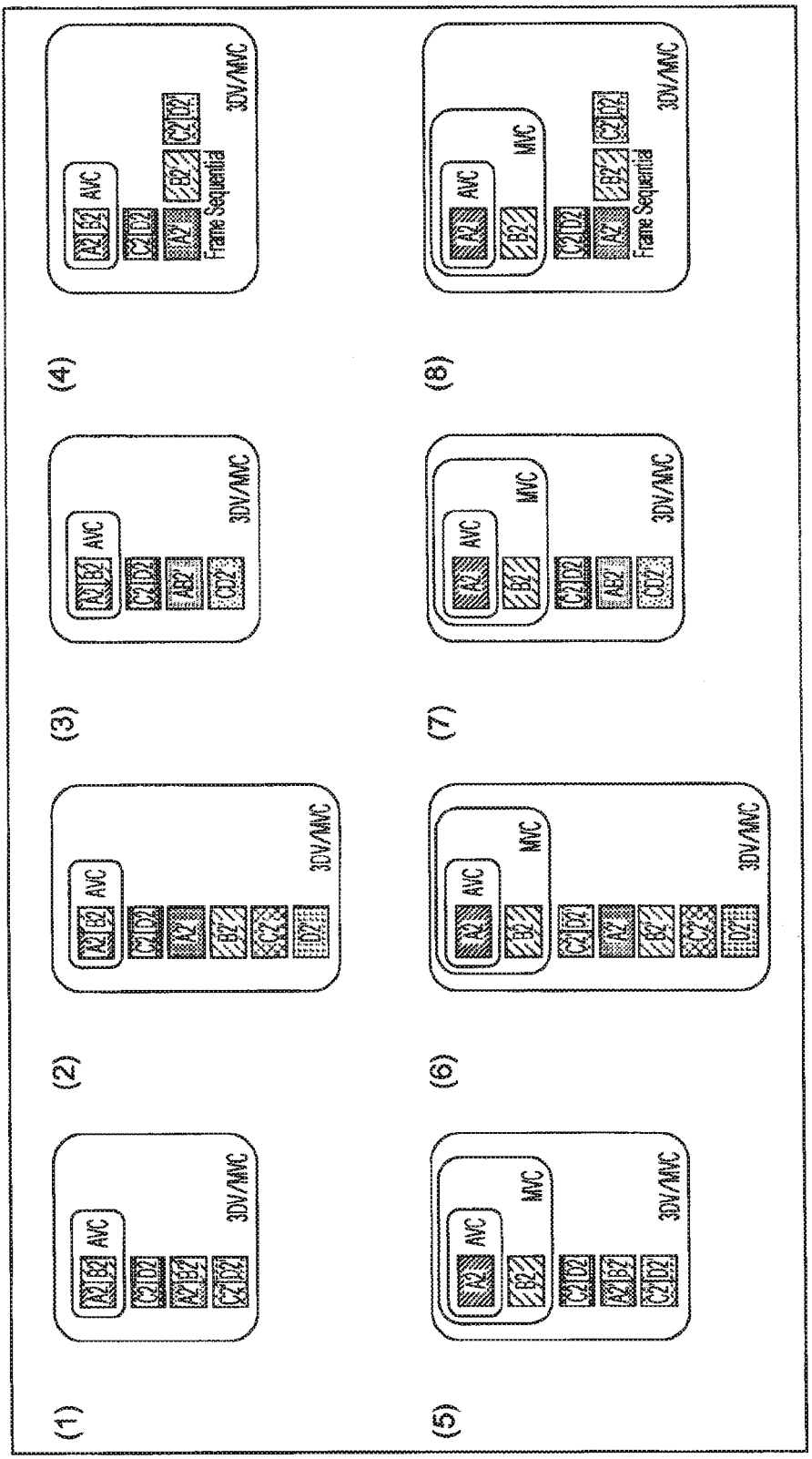
FIG. 47 is a diagram that illustrates examples of a multiplexed pattern of an encoding target.

FIG. 47 is a diagram that illustrates an example of a multiplexing pattern of an encoding target in a case where the number of viewpoints of the compatible images is two, and the number of viewpoints of the auxiliary images is two.

As illustrated in (1) of FIG. 47, the encoding device 140 illustrated FIG. 14 multiplexes images A2 and B2 that are compatible images in the spatial direction and encodes the multiplexed image in accordance with the AVC mode. In addition, the encoding device 140 multiplexes the images C2 and D2 that are auxiliary images, the disparity images A2' and B2' that are disparity images of the compatible images, and the disparity images C2' and D2' that are disparity images of the auxiliary images in the spatial direction and encodes the multiplexed image in accordance with the 3DV mode that is compliant with the MVC mode.

Furthermore, as illustrated in (2) of FIG. 47, the encoding device 140 may encode the disparity images A2' to D2' in accordance with the 3DV mode that is compliant with the MVC mode without multiplexing the disparity images. In addition, as illustrated in (3) of FIG. 47, the encoding device 480 illustrated in FIG. 42 may encode the common disparity image AB2' instead of the disparity images A2' and B2' that are disparity images of the compatible images and encode the common disparity image CD2' instead of the disparity images C2' and D2' that are disparity images of the auxiliary images.

Furthermore, as illustrated in (4) of FIG. 47, the encoding device 440 illustrated in FIG. 35 multiplexes the disparity images A2' and B2' and the multiplexed image of the disparity images of the auxiliary images in accordance with the frame sequential mode without multiplexing the disparity images A2' and B2' that are disparity images of the compatible images in the spatial direction and encodes the multiplexed image in accordance with the 3DV mode that is compliant with the MVC mode.

As illustrated in (5) of FIG. 47, the encoding device 180 illustrated in FIG. 19 encodes the image A2 in accordance with the AVC mode and encodes the image B2 with the image A2 set as a base view in accordance with the MVC mode without multiplexing the images A2 and B2 that are compatible images. In addition, the encoding device 180 encodes the images C2 and D2 that are auxiliary images, the disparity images A2' and B2' that are the disparity images of the compatible images, and the disparity images C2' and D2' that are the disparity images of the auxiliary images in the spatial direction and encodes a resultant multiplexed image in accordance with a 3DV mode that is in compliant with the MVC mode.

In addition, as illustrated in (6) of FIG. 47, the encoding device 180 may encode the disparity images A2' to D2' in accordance with the 3DV mode that is compliant with the MVC mode without multiplexing them. Furthermore, as illustrated in (7) of FIG. 47, similarly to the encoding device 480, the encoding device 180 may encode the common disparity image AB2' instead of the disparity images A2' and B2' and encode the common disparity image CD2' instead of the disparity images C2' and D2'.

Furthermore, as illustrated in (8) of FIG. 47, the encoding device 180, similarly to the encoding device 440, may multiple the disparity images A2' and B2' and the multiplexed image of the disparity images of the auxiliary images in accordance with the frame sequential mode and encode a resultant multiplexed image in accordance with the 3DV mode that is compliant with the MVC mode without multiplexing the disparity images A2' and B2' in the spatial direction.

In addition, the multiplexing pattern is not limited to the example illustrated in FIG. 47. For example, the multiplexed image of the auxiliary images, the disparity image of the compatible image, and the multiplexed image of the disparity images of the auxiliary images may be further multiplexed in accordance with a frame sequential mode.

FIG. 48 is a diagram that illustrates features of the effects of multiplexing in the multiplexing patterns illustrated in (1) to (8) of FIG. 47.

In the table represented in FIG. 48, items of the effects "Compatibility", "Image Quality", and "Data Amount" are arranged, and the degrees of the effects of the items for the multiplexing patterns illustrated in (1) to (8) of FIG. 47 are represented. In the table represented in FIG. 48, a circle represents the presence of an effect, and a double circle represents a remarkable effect.

In a case where multiplexing is performed using the multiplexing pattern illustrated in (1) of FIG. 47, the multiplexing mode and the encoding mode of compatible images are the same as those of an existing mode, whereby the compatibility is secured. In addition, since disparity images, similarly to the compatible images, are multiplexed in the spatial direction, for example, the disparity images can be separated using a separation unit, which separates compatible images, prepared on the decoding device side. Accordingly, it is assured that the disparity images can be separated on the decoding device side. Therefore, in this case, there is a remarkable effect on the compatibility, and a double circle is described in correspondence with the item "Compatibility" illustrated in FIG. 48.

In a case where multiplexing is performed using the multiplexing pattern illustrated in (2) of FIG. 47, the multiplexing mode and the encoding mode of compatible images are the same as those of an existing mode, whereby the compatibility is secured. In addition, since the resolution of the disparity image is the same as that of the image before being multiplexed, the accuracy is high. As a result, in the decoding device, the accuracy of an image of a predetermined viewpoint that is generated using the disparity image is improved. Therefore, in this case, there are effects on the compatibility and the image quality of an image that is generated using the disparity image, and accordingly, circles are described in correspondence with items "Compatibility" and "Image Quality" represented in FIG. 48.

In a case where multiplexing is performed using the multiplexing pattern illustrated in (3) of FIG. 47, the multiplexing mode and the encoding mode of compatible images are the same as those of an existing mode, whereby the compatibility is secured. In addition, the amount of data of the disparity images of the compatible images and the auxiliary images each having the same resolution as that of the image before multiplexing decreases to be the amount of data of the disparity images of two viewpoints. Accordingly, in this case, since there are effects on the compatibility and the data amount, circles are described in correspondence with items "Compatibility" and "Data Amount" represented in FIG. 48.

In a case where multiplexing is performed using the multiplexing pattern illustrated in (4) of FIG. 47, the multiplexing mode and the encoding mode of compatible images are the same as those of an existing mode, whereby the compatibility is secured. In addition, since the disparity images are multiplexed in the time direction, the amount of data of the disparity images at each time is less than that of the case of (3) of FIG. 47, whereby the amount of data that can be transmitted increases. Accordingly, even in a situation in which there is no room for a transmission bandwidth for transmitting a disparity image having the same resolution as the image before multiplexing, a disparity image of which the resolution is the same as the resolution of the image before multiplexing can be transmitted, whereby the accuracy of images of predetermined viewpoints to be generated in the decoding device using the disparity image is improved. Accordingly, in this case, there are effects on the compatibility and the image quality of an image generated using the disparity image, and there is a remarkable effect on the data amount. Therefore, circles are described in correspondence with items "Compatibility" and "Image Quality" illustrated in FIG. 48, and a double circle is described in correspondence with "Data Amount".

The multiplexing process using the multiplexing patterns illustrated in (1) to (4) of FIG. 47 is performed, for example, when an image used for broadcasting, the IP (internet protocol) that is compliant with broadcasting, ATSC (Advanced Television Systems Committee) 2.0 specifications and the like, next-generation broadcasting that is converged broadcasting, or internet delivery application is set as an encoding target.

In a case where multiplexing is performed using the multiplexing pattern illustrated in (5) of FIG. 47, the multiplexing mode and the encoding mode of compatible images are the same as those of an existing mode, whereby the compatibility is secured. In addition, since the resolution of each disparity image is a half of the resolution of the image, the amount of data of the disparity images of the compatible image and the auxiliary image decreases to be the amount of data of the disparity images of two viewpoints. Accordingly, in this case, there are effects on the compatibility and the data amount, and circles are described in correspondence with items "Compatibility" and "Data Amount" illustrated in FIG. 48.

In a case where multiplexing is performed using the multiplexing pattern illustrated in (6) of FIG. 47, similarly to the case of (2) of FIG. 47, the compatibility is secured, and the accuracy of images of predetermined viewpoints generated in the decoding device using the disparity images is improved. Accordingly, in this case, there are effects on the compatibility and the image quality of an image generated using disparity images, and circles are described in correspondence with items "Compatibility" and "Image Quality" illustrated in FIG. 48.

In a case where multiplexing is performed using the multiplexing pattern illustrated in (7) of FIG. 47, similarly to the case of (3) of FIG. 47, the compatibility is secured, and the amount of data of the disparity image decreases. Accordingly, in this case, there are effects on the compatibility and the data amount, and circles are described in correspondence with items "Compatibility" and "Data Amount" illustrated in FIG. 48.

In a case where multiplexing is performed using the multiplexing pattern illustrated in (8) of FIG. 47, similarly to the case of (4) of FIG. 47, the compatibility is secured. In addition, similarly to the case of (4) of FIG. 47, the amount of data of the disparity images at each time is less than that of the case of (7) of FIG. 47, and as a result, the accuracy of images of predetermined viewpoints generated in the decoding device using the disparity images is improved. Accordingly, in this case, there are effects on the compatibility and the image quality of an image generated using the disparity images, and there is a remarkable effect on the data amount. Therefore, circles are described in correspondence with items "Compatibility" and "Image Quality" illustrated in FIG. 48, and a double circle is described in correspondence with "Data Amount".

The multiplexing process using the multiplexing patterns illustrated in (5), (7), and (8) of FIG. 47 is performed, for example, when an image used for an application for the BD, broadcasting, next-generation broadcasting or Internet delivery is set as an encoding target. In addition, the multiplexing process using the multiplexing pattern illustrated in (6) of FIG. 47 is performed, for example, when an image used for an application for the BD, next-generation broadcasting or internet delivery is set as an encoding target.

Figure 49:
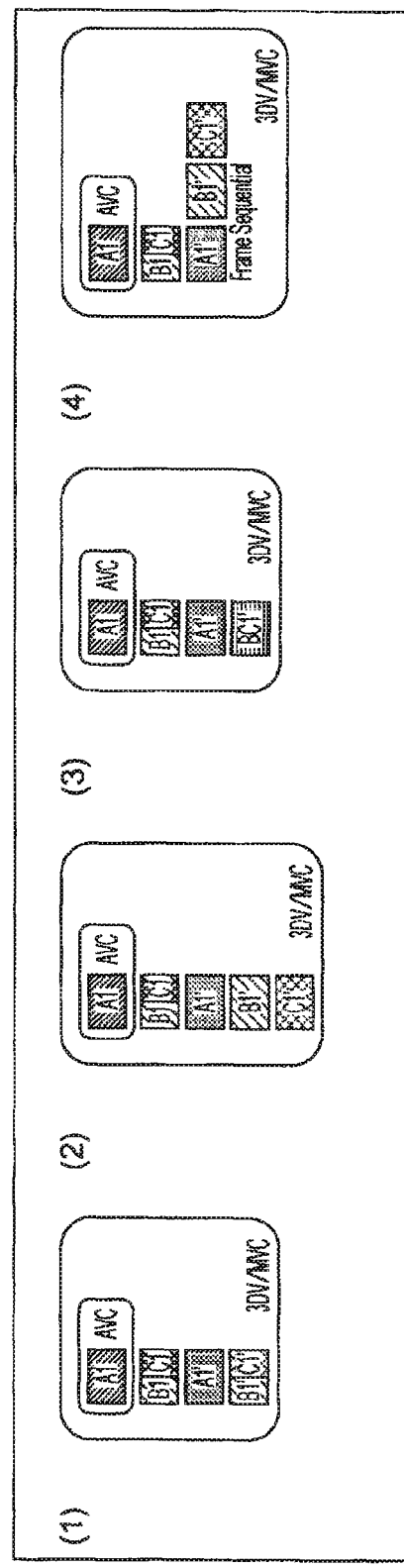
FIG. 49 is a diagram that illustrates other examples of the multiplexed pattern of the encoding target.

FIG. 49 is a diagram that illustrates an example of the multiplexing pattern of the encoding target in a case where the number of viewpoints of the compatible image is one, and the number of viewpoints of the auxiliary image is two.

As illustrated in (1) of FIG. 49, the encoding device 50 illustrated in FIG. 5 encodes an image A1 that is a compatible image in accordance with the AVC mode. In addition, the encoding device 50 multiplexes images B1 and C1 that are auxiliary images and disparity images B1' and C1' that are the disparity images of the auxiliary images in the time direction. Then, the encoding device 50 encodes a disparity image A1' that is the disparity image of the compatible image, a multiplexed image of the auxiliary images, and a multiplexed image of the disparity images of the auxiliary images in accordance with the 3DV mode that is compliant with the MVC mode.

The encoding device 50, as illustrated in (2) of FIG. 49, may encode the disparity images A1' to C1' in accordance with the 3DV mode that is compliant with the MVC mode without multiplexing the disparity images. In addition, as illustrated in (3) of FIG. 49, the encoding device 50, similarly to the encoding device 480, may encode a common disparity image BC1' of images B and C that are auxiliary images instead of the multiplexed image of the disparity images of the auxiliary images.

In addition, as illustrated in (4) of FIG. 49, the encoding device 50, similarly to the encoding device 440, may multiplex the disparity images A1' to C1' in accordance with the frame sequential mode and encode a resultant multiplexed image in accordance with the 3DV mode that is compliant with the MVC mode without multiplexing the disparity images 131' and C1' in the spatial direction.

The effects of the multiplexing processes using the multiplexing patterns illustrated in (1) to (4) of FIG. 49 and the encoding targets at the time of performing the multiplexing processes using the multiplexing patterns are the same as the effects and the encoding targets of the multiplexing process using the multiplexing patterns illustrated in (5) to (8) of FIG. 47. However, in the multiplexing process using the multiplexing pattern illustrated in (1) of FIG. 49, since the resolution of the disparity image of the compatible image is the same as the resolution of the compatible image, a decrease in the amount of data of the disparity image as an effect of this multiplexing process is an effect only for the disparity image of the auxiliary image.

Figure 50:
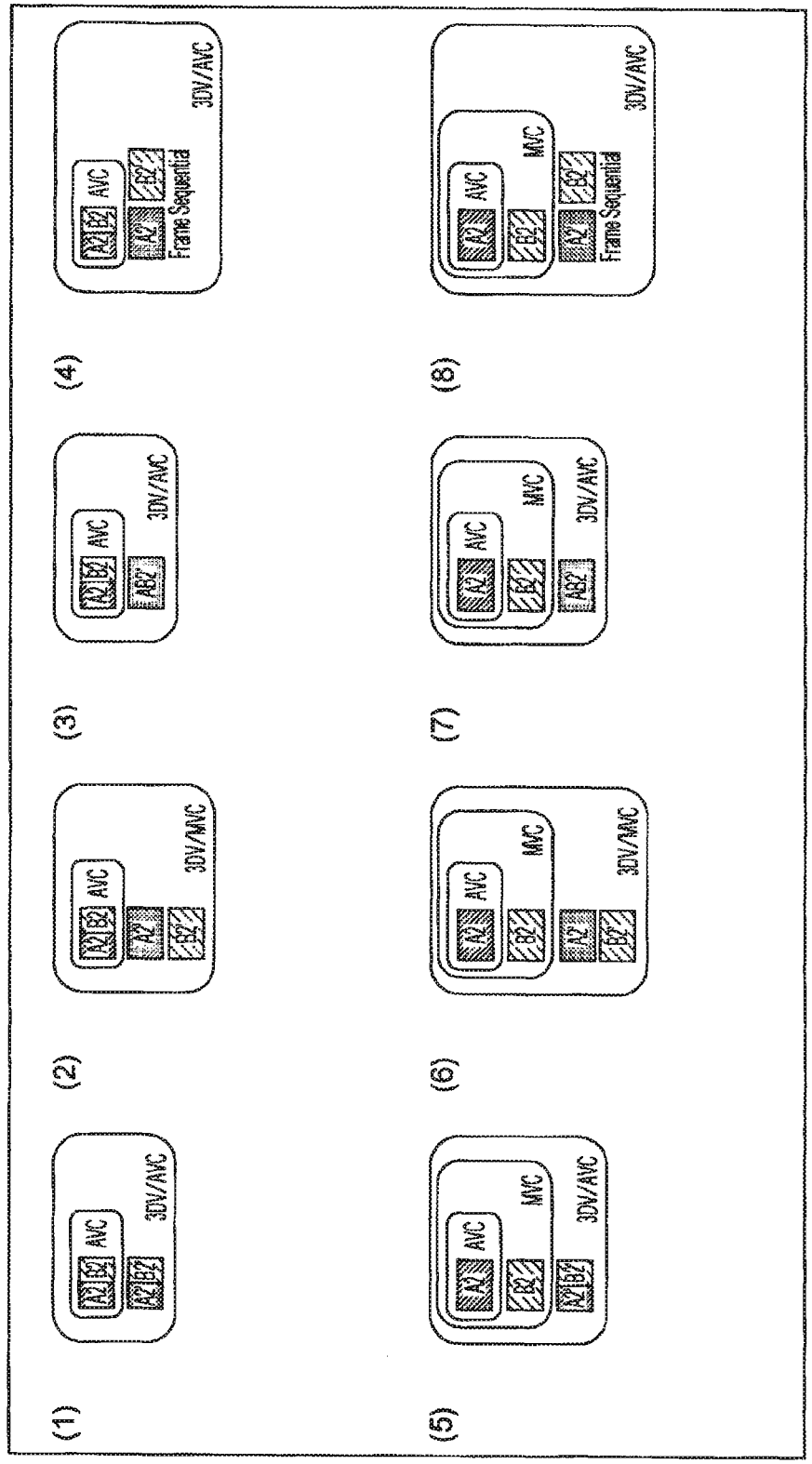
FIG. 50 is a diagram that illustrates further other examples of the multiplexed pattern of the encoding target.

FIG. 50 is a diagram that illustrates an example of the multiplexing pattern of an encoding target in a case where the number of viewpoints of the compatible image is two, and the number of viewpoints of the auxiliary image is zero.

In a case where the number of viewpoints of the compatible images is two, and the number of viewpoints of the auxiliary image is zero, as illustrated in (1) of FIG. 50, similarly to the case of the encoding device 140 illustrated in FIG. 14, the images A2 and B2 that are compatible images are multiplexed in the spatial direction and are encoded in accordance with the AVC mode. In addition, the disparity images A2' and B2' that are the disparity images of the compatible images are multiplexed in the spatial direction and are encoded in accordance with the 3DV mode that is compliant with the AVC mode.

As illustrated in (2) of FIG. 50, the disparity images A2' and B2' may be encoded in accordance with the 3DV mode that is compliant with the MVC mode without being multiplexed. In addition, as illustrated in (3) of FIG. 50, similarly to the case of the encoding device 480, the common disparity image AB2' may be encoded instead of the disparity images A2' and B2'.

Furthermore, as illustrated in (4) of FIG. 50, similarly to the case of the encoding device 440, the disparity images A2' and B2' may be multiplexed in the frame sequential mode and be encoded without being multiplexed in the time direction.

In addition, as illustrated in (5) of FIG. 50, similarly to the case of the encoding device 180, it may be configured such that the image A2 is encoded in accordance with the AVC mode, and the image B2 is encoded with the MVC mode in which the image A2 is set as a base view without multiplexing the images A2 and B2 that are compatible images.

In this case, as illustrated in (6) of FIG. 50, similarly to the case of (2) of FIG. 50, the disparity images may be encoded without being multiplexed, or, as illustrated in (7) of FIG. 50, similarly to the case of (3) of FIG. 50, the common disparity image AB2' may be encoded. In addition, as illustrated in (8) of FIG. 50, similarly to the case of (4) illustrated in FIG. 50, the disparity images of the compatible images may be multiplexed in accordance with the frame sequential mode and be encoded.

In addition, the effects of the multiplexing processes using the multiplexing patterns illustrated in (1) to (8) of FIG. 49 and the encoding targets at the time of performing the multiplexing processes using the multiplexing patterns are the same as the effects and the encoding targets of the multiplexing processes using the multiplexing patterns illustrated in (1) to (8) of FIG. 47.

In the description presented above, although the resolution of the disparity images that are multiplexed in accordance with the frame sequential mode has been described to be the same as the resolution of the image before the multiplexing process, the resolution may be lower than the resolution of the image before the multiplexing process. In addition, the auxiliary images, similarly to the disparity images, may be also multiplexed in accordance with the frame sequential mode.

Furthermore, in the description presented above, although the information representing the multiplexing mode of the images and the information representing the multiplexing mode of the disparity images have been described to be transmitted in the encoding device, information used for identifying the multiplexing patterns illustrated in FIGS. 47, 49, and 50 may be transmitted.

In addition, the encoding device may transmit a flag that is used for identifying an application that corresponds to an image that is an encoding target.

Seventh Embodiment

[Configuration Example of Encoding Device According to Seventh Embodiment]

Figure 51:
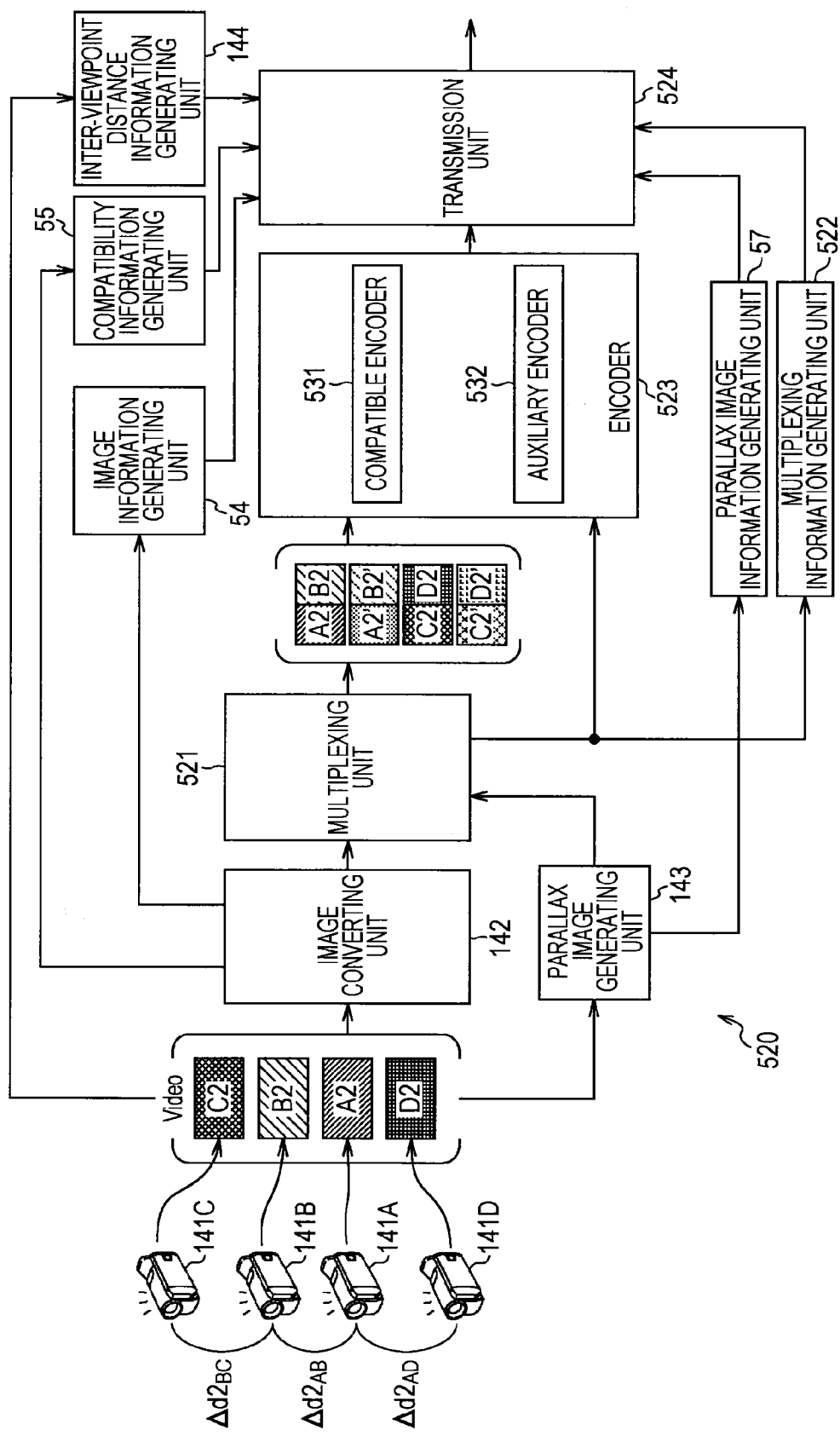
FIG. 51 is a block diagram that illustrates a configuration example of an encoding device according to a seventh embodiment of the present technology.

FIG. 51 is a block diagram that illustrates a configuration example of an encoding device according to a seventh embodiment of the present technology.

In the configuration illustrated in FIG. 51, the same reference numeral is assigned to a configuration that is the same as that illustrated in FIG. 35. Duplicate description will not be presented as is appropriate.

The configuration of the encoding device 520 illustrated in FIG. 51 is mainly different from the configuration illustrated in FIG. 35 in that an encoder 523 and a transmission unit 524 are disposed instead of the encoder 145 and the multiplexing unit 443, and a multiplexing unit 521 and a multiplexing information generating unit 522 are newly arranged.

The encoding device 520 multiplexes a multiplexed image of compatible images, a multiplexed image of auxiliary images, a multiplexed image of disparity images of the compatible images, and a multiplexed image of disparity images of the auxiliary images in accordance with the frame sequential mode and encodes a resultant multiplexed image.

More specifically, the multiplexing unit 521 of the encoding device 520 multiplexes a multiplexed image of a compatible image and an auxiliary image that is acquired as a result of the multiplexing process performed by an image converting unit 142 and a multiplexed image of the disparity images of the compatible image and the auxiliary image that is acquired as a result of the multiplexing process performed by a disparity image generating unit 143 in accordance with the frame sequential mode.

Then, the multiplexing unit 521 supplies a multiplexed image in which a multiplexed image of compatible images, a multiplexed image of the disparity images of the compatible images, a multiplexed image of auxiliary images, and a multiplexed image of the disparity images of the auxiliary images, which can be acquired as a result of the multiplexing process, are sequentially present to the encoder 523 as a time-direction multiplexed image within one frame time.

In addition, the multiplexing unit 521 supplies information representing that multiplexed images of the compatible images and the auxiliary images and a multiplexed image of the disparity images of the compatible image and the auxiliary image are multiplexed in accordance with the frame sequential mode and representing the arrangement order of images in the time-multiplexed image to the multiplexing information generating unit 522 and the encoder 523.

The multiplexing information generating unit 522, based on the information that is supplied from the multiplexing unit 521, generates the information and the like as whole multiplexing information relating to the multiplexing of the compatible images and the auxiliary images and the disparity images of the compatible images and the auxiliary images and supplies the generated whole multiplexing information to the transmission unit 524.

The encoder 523 is configured by a compatible encoder 531 and an auxiliary encoder 532. The encoder 523 designates the multiplexed image of the compatible images that is included in the time-multiplexed image supplied from the multiplexing unit 521 based on the information supplied from the multiplexing unit 521 and supplies the multiplexed image of the compatible images to the compatible encoder 531. In addition, the encoder 523 supplies the multiplexed image of the auxiliary images and the multiplexed images of the disparity images of the compatible images and the auxiliary images that are included in the time-multiplexed image to the auxiliary encoder 532 based on the information that is supplied from the multiplexing unit 521.

The compatible encoder 531 of the encoder 523 encodes the multiplexed image of the compatible images that are included in the time-multiplexed image in accordance with the existing AVC mode. The auxiliary encoder 532 encodes the multiplexed image of the auxiliary images and the multiplexed images of the disparity images of the compatible images and the auxiliary images that are included in the time-multiplexed image in accordance with the 3DV mode. At this time, the multiplexed image of the auxiliary images are encoded by referring to the multiplexed image of the compatible images, and the multiplexed image of the disparity images of the auxiliary images is encoded by referring to the multiplexed image of the disparity images of the compatible images.

The encoder 523 supplies a bit stream that is formed from encoded data of the time-multiplexed image that is acquired as a result of the encoding process performed by the compatible encoder 531 or the auxiliary encoder 532 to the transmission unit 524.

The transmission unit 524 generates a TS using the bit stream supplied from the encoder 523, image information supplied from the image information generating unit 54, compatibility information supplied from the compatibility information generating unit 55, inter-viewpoint distance information supplied from the inter-viewpoint distance information generating unit 144, disparity image information supplied from the disparity image information generating unit 57, the whole multiplexing information supplied from the multiplexing information generating unit 522, and the like. The multiplexing unit 443 transmits the generated TS.

[Description of Process of Encoding Device]

Figure 52:
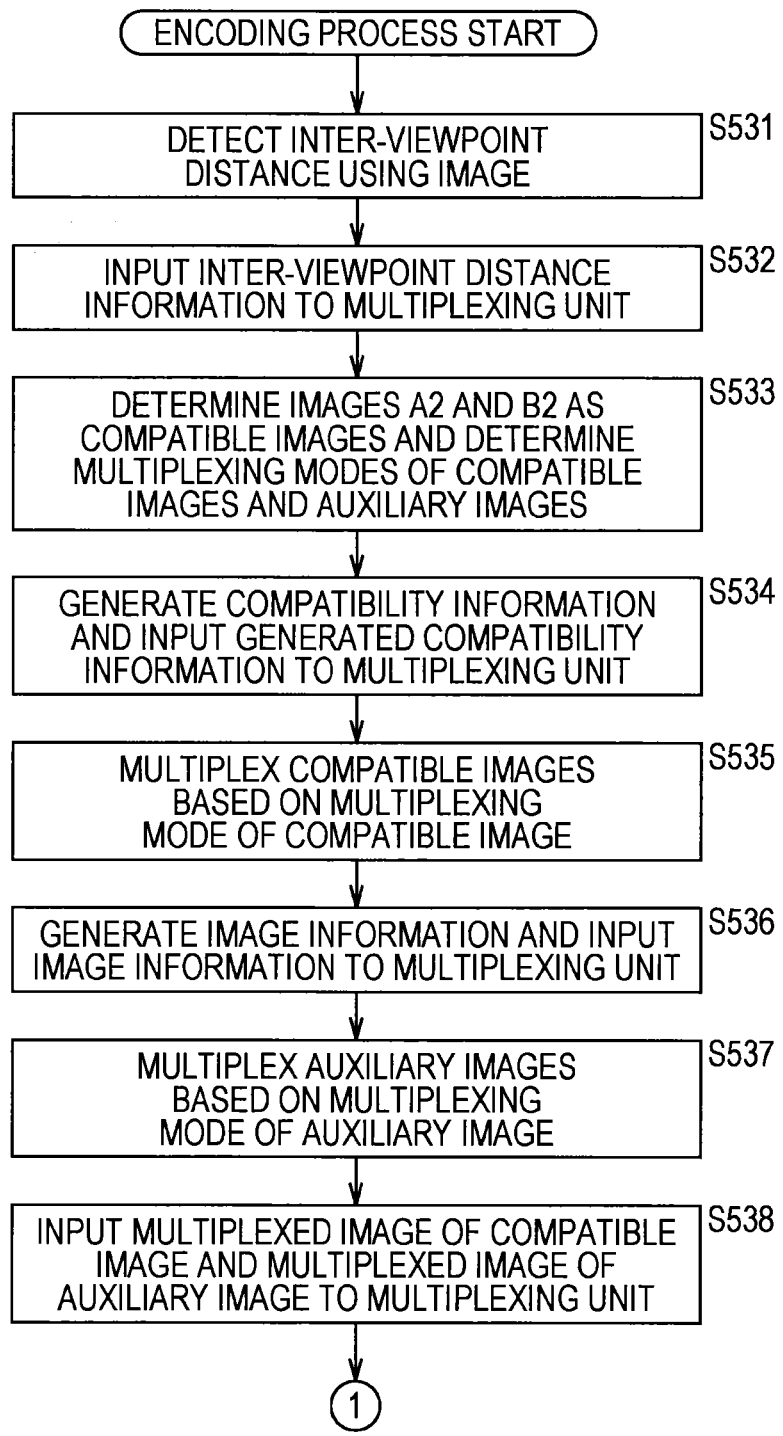
FIG. 52 is a flowchart that illustrates an encoding process performed by the encoding device illustrated in FIG. 51.
Figure 53:
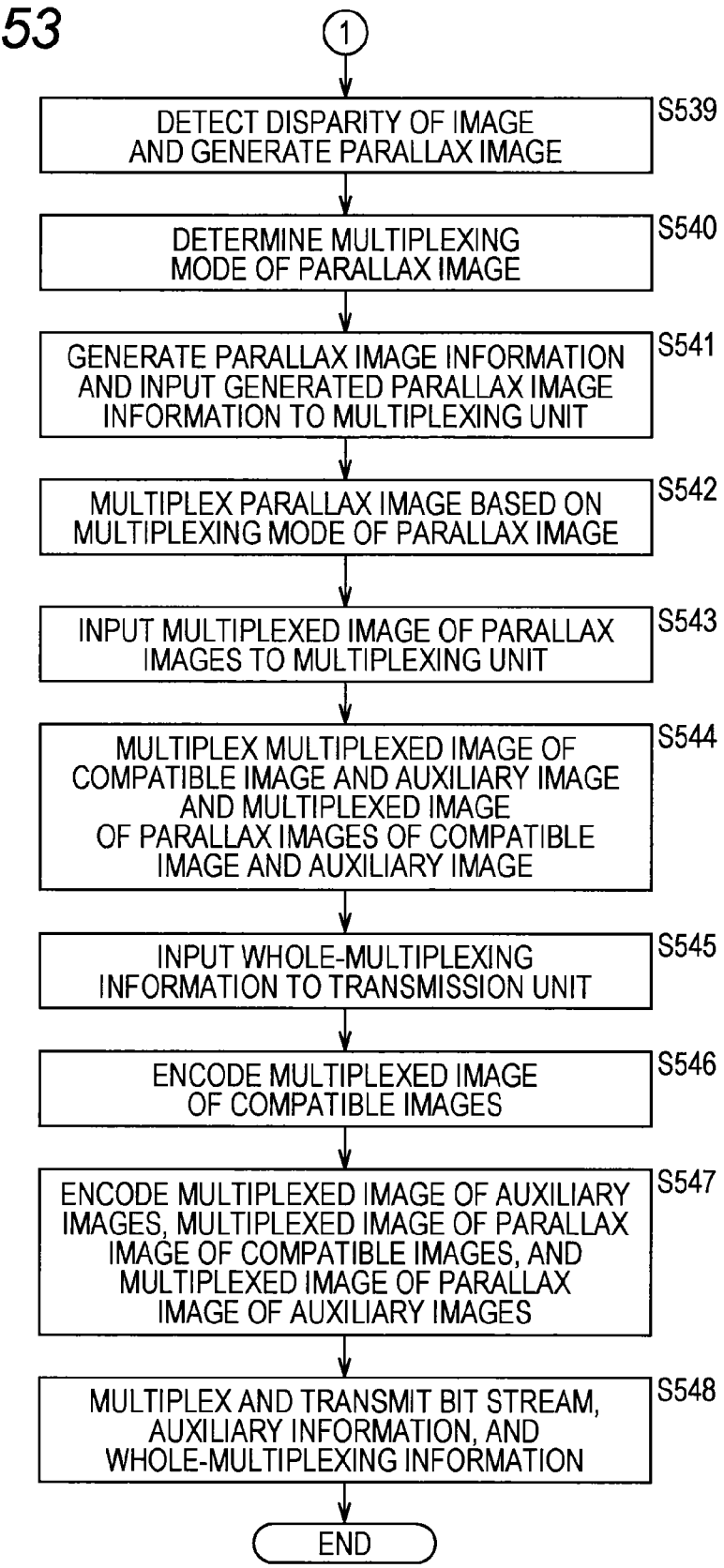
FIG. 53 is a flowchart that illustrates the encoding process performed by the encoding device illustrated in FIG. 51.

FIGS. 52 and 53 are a flowchart that illustrates an encoding process that is performed by the encoding device 520 illustrated in FIG. 51. This encoding process, for example, is started when images A2 to D2 are output from the imaging units 141A to 141D.

The process of Steps S531 to S537 illustrated in FIG. 52 is the same as the process of Steps S451 to S457 illustrated in FIG. 38, and thus the description thereof will not be presented.

After the process of Step S537, in Step S538, the image converting unit 142 inputs a multiplexed image of the compatible images and a multiplexed image of the auxiliary images to the multiplexing unit 521, and the process proceeds to Step S539 illustrated in FIG. 53.

The process of Steps S539 to S542 illustrated in FIG. 53 is the same as the process of Steps S459 to S462 illustrated in FIG. 39, and thus the description thereof will not be presented. In Step S543, the multiplexed image is input to the multiplexing unit.

After the process of Step S543, in Step S544, the multiplexing unit 521 multiplexes the multiplexed images of the compatible images and the auxiliary images that are acquired as a result of the multiplexing process performed by the image converting unit 142 and the multiplexed images of the disparity images of the compatible images and the auxiliary images that are acquired as a result of the multiplexing process performed by the disparity image generating unit 143 in accordance with the frame sequential mode. The multiplexing unit 521 supplies a multiplexed image that is acquired as a result of the multiplexing process to the encoder 523 as a time-direction multiplexed image.

In addition, the multiplexing unit 521 supplies information representing that multiplexed images of the compatible images and the auxiliary images and multiplexed images of the disparity images are multiplexed in accordance with the frame sequential mode and representing the arrangement order of images in the time-multiplexed image to the multiplexing information generating unit 522 and the encoder 523.

In Step S545, the multiplexing information generating unit 522, based on the information that is supplied from the multiplexing unit 521, generates the information and the like as whole multiplexing information and supplies the generated whole multiplexing information to the transmission unit 524.

In Step S546, the compatible encoder 531 encodes the multiplexed image of the compatible images that is included in the time-multiplexed image input based on the information supplied from the multiplexing unit 521 by the encoder 523 in accordance with the existing AVC mode.

In Step S547, the auxiliary encoder 532 encodes the multiplexed image of the auxiliary images, the multiplexed image of the disparity images of the compatible images, and the multiplexed image of the disparity images of the auxiliary images that are included in the time-multiplexed image that is input based on the information supplied from the multiplexing unit 521 by the encoder 523 in accordance with the 3DV mode. The encoder 523 supplies a bit stream that is formed from encoded data of the time-multiplexed image that is acquired as a result of the encoding process of Steps S546 and S547 to the transmission unit 524.

In Step S548, the transmission unit 524 generates a TS from the bit stream supplied from the encoder 523, the auxiliary information, and the whole multiplexing information supplied from the multiplexing information generating unit 522 and transmits the generated TS. This TS, for example, is recorded on a BD or the like or is transmitted as a broadcast stream. Then, the process ends.

As above, the encoding device 520 generates one bit stream from encoded data of the multiplexed image of the compatible images, the multiplexed image of the auxiliary images, the multiplexed image of the disparity images of the compatible images, and the multiplexed image of the disparity images of the auxiliary images. Accordingly, a decoding device that includes a decoder that can decode only one bit stream can decode the bit stream that is generated by the encoding device 520.

In the description presented above, although the disparity images of the compatible images, the auxiliary images and the disparity images of the auxiliary images have been described to be encoded in accordance with the 3DV mode that is compliant with the encoding mode of the compatible images, the images may be encoded in accordance with MPEG2 (Moving Picture Experts Group phase 2) or the like that is not compliant with an encoding mode of compatible images.

[Configuration Example of Decoding Device]

Figure 54:
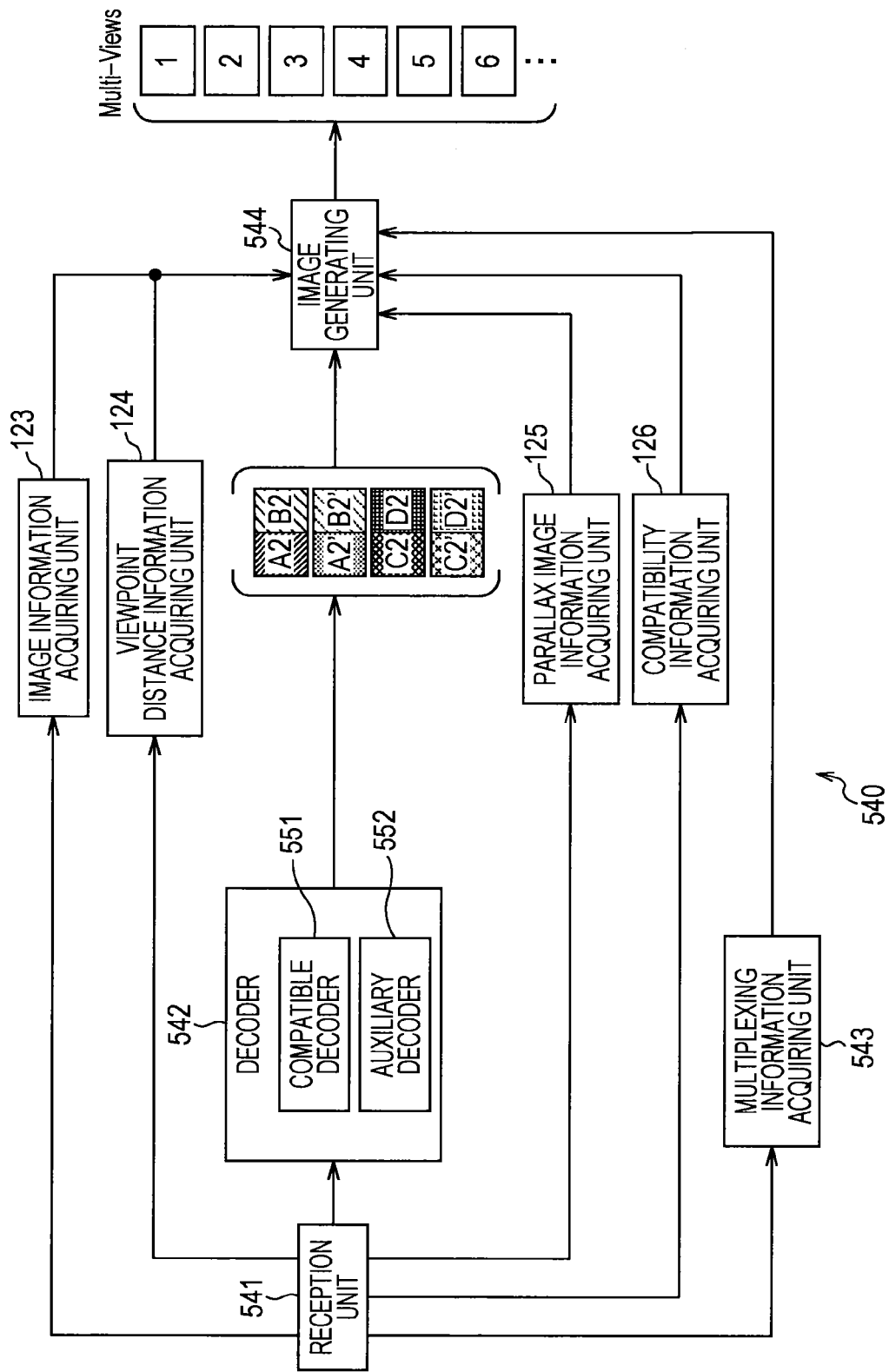
FIG. 54 is a flowchart that illustrates an encoding process performed by the encoding device illustrated in FIG. 51.

FIG. 54 is a diagram that illustrates a configuration example of a decoding device that decodes the TS transmitted from the encoding device 520 illustrated in FIG. 51.

In the configuration illustrated in FIG. 54, the same reference numeral is assigned to a configuration that is the same as that illustrated in FIG. 40. Duplicate description will not be presented as is appropriate.

The configuration of the decoding device 540 illustrated in FIG. 54 is mainly different from the configuration illustrated in FIG. 40 in that a reception unit 541, a decoder 542, and an image generating unit 544 are disposed instead of the separation unit 121, the decoder 122, and the image generating unit 171, and a multiplexing information acquiring unit 543 is newly arranged. The decoding device 540 decodes a bit stream of a time-multiplexed image that is included in a TS transmitted from the encoding device 520, generates images of two viewpoints or multi-viewpoint images, and displays the generated images on a display device not illustrated in the figure.

More specifically, the reception unit 541 of the decoding device 540 receives a TS that is transmitted from the encoding device 520. The reception unit 541 extracts a bit stream of a time-multiplexed image that is included in the TS and supplies the bit stream to the decoder 542. In addition, the reception unit 541 extracts auxiliary information that is included in the TS and supplies image information that is included in the auxiliary information to the image information acquiring unit 123 and supplies viewpoint distance information to an inter-viewpoint distance information acquiring unit 124. Furthermore, the reception unit 541 supplies disparity image information included in the auxiliary information to a disparity image information acquiring unit 125 and supplies compatibility information to a compatibility information acquiring unit 126 and the decoder 501. In addition, the reception unit 541 extracts whole multiplexing information that is included in the TS and supplies the extracted whole multiplexing information to the multiplexing information acquiring unit 543.

The decoder 542 is configured by a compatible decoder 551 and an auxiliary decoder 552. The compatible decoder 551 of the decoder 542 extracts encoded data of the multiplexed image of the compatible images from the bit stream that is supplied from the reception unit 541 based on the compatibility information that is supplied from the separation unit 461. The compatible decoder 551 decodes the extracted encoded data of the multiplexed image of the compatible images in accordance with a mode that corresponds to the AVC mode and supplies the decoded data to the image generating unit 544.

The auxiliary decoder 552 extracts encoded data of the multiplexed image of the auxiliary images, the multiplexed image of the disparity images of the compatible images, and the multiplexed image of the disparity images of the auxiliary images from the bit stream that is supplied from the reception unit 541 based on the compatibility information supplied from the separation unit 461. The auxiliary decoder 552 decodes encoded data of the multiplexed image of the auxiliary images, the multiplexed image of the disparity images of compatible images, and the multiplexed image of the disparity images of the auxiliary images, that are extracted, in accordance with a mode that corresponds to the decoding mode of the auxiliary encoder 532 illustrated in FIG. 51 and supplies the decoded data to the image generating unit 544.

The multiplexing information acquiring unit 543 acquires the whole multiplexing information that is supplied from the reception unit 541 and supplies the acquired whole multiplexing information to the image generating unit 544.

The image generating unit 544 outputs an image in accordance with a viewer's display instruction, thereby displaying the image on a display device not illustrated in the figure. More specifically, the image generating unit 544, in accordance with a viewer's instruction for displaying a 3D image of the multi-viewpoint system, generates images of three or more viewpoints, which correspond to a display device not illustrated in the figure, each having the resolution that is a half of the resolution of the compatible image or the auxiliary image by using the multiplexed image of the compatible images, the multiplexed image of the auxiliary images, the multiplexed image of the disparity images of the compatible images, and the multiplexed image of the disparity images of the auxiliary images based on the image information supplied from the image information acquiring unit 123, the inter-viewpoint distance information supplied from the inter-viewpoint distance information acquiring unit 124, the disparity image information supplied from the disparity image information acquiring unit 125, the compatibility information supplied from the compatibility information acquiring unit 126, the whole multiplexing information supplied from the multiplexing information acquiring unit 543, and the like.

Described in more detail, the image generating unit 544 identifies the multiplexed image of the auxiliary image, the multiplexed image of the disparity image of the compatible image, and the multiplexed image of the disparity image of the auxiliary image, which are supplied from the auxiliary decoder 552, based on the whole multiplexing information supplied from the multiplexing information acquiring unit 543. In addition, the image generating unit 544, similarly to the image generating unit 171 illustrated in FIG. 17, separates the disparity image of each auxiliary image from the multiplexed image of the disparity images of the auxiliary images based on the information that represents the multiplexing mode of the disparity image of the auxiliary image that is included in the disparity image information supplied from the disparity image information acquiring unit 125. Furthermore, the image generating unit 544, similarly to the image generating unit 171, separates the disparity image of each compatible image from the multiplexed image of the disparity images of the compatible images based on the information that represents the multiplexing mode of the disparity images of the compatible images that is included in the disparity image information.

Furthermore, the image generating unit 544, similarly to the image generating unit 171, separates each auxiliary image from the multiplexed image of the auxiliary images based on the information that represents the multiplexing mode of the auxiliary images that is included in the image information supplied from the image information acquiring unit 123. In addition, the image generating unit 544, similarly to the image generating unit 171, separates each compatible image from the multiplexed image of the compatible images based on the information that represents the multiplexing mode of the compatible images that is included in the image information.

In addition, the image generating unit 544, similarly to the image generating unit 171, determines the position of each viewpoint of the multi-viewpoint images to be generated based on the inter-viewpoint distance information and the number of viewpoints that corresponds to a display device not illustrated in the figure. Then, the image generating unit 544, similarly to the image generating unit 171, generates an image of each viewpoint of which the position is determined by using each compatible image, each auxiliary image, the disparity image of each compatible image, and the disparity image of each auxiliary image. Then, the image generating unit 544 converts the resolution of the generated multi-viewpoint images to the resolution that is "1/the number of viewpoints" of the resolution of the compatible image or the auxiliary image, synthesizes the converted images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 544, similarly to the image generating unit 171, separates the multiplexed image of the compatible images that is supplied from the decoder 542 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 544, similarly to the image generating unit 171, alternately outputs the separated images A2 and B2 of which the resolution is a half of the resolution of the compatible image, thereby displaying the separated images on a display device not illustrated in the figure. At this time, the viewer can view a 3D image by wearing glasses in which one a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 55:
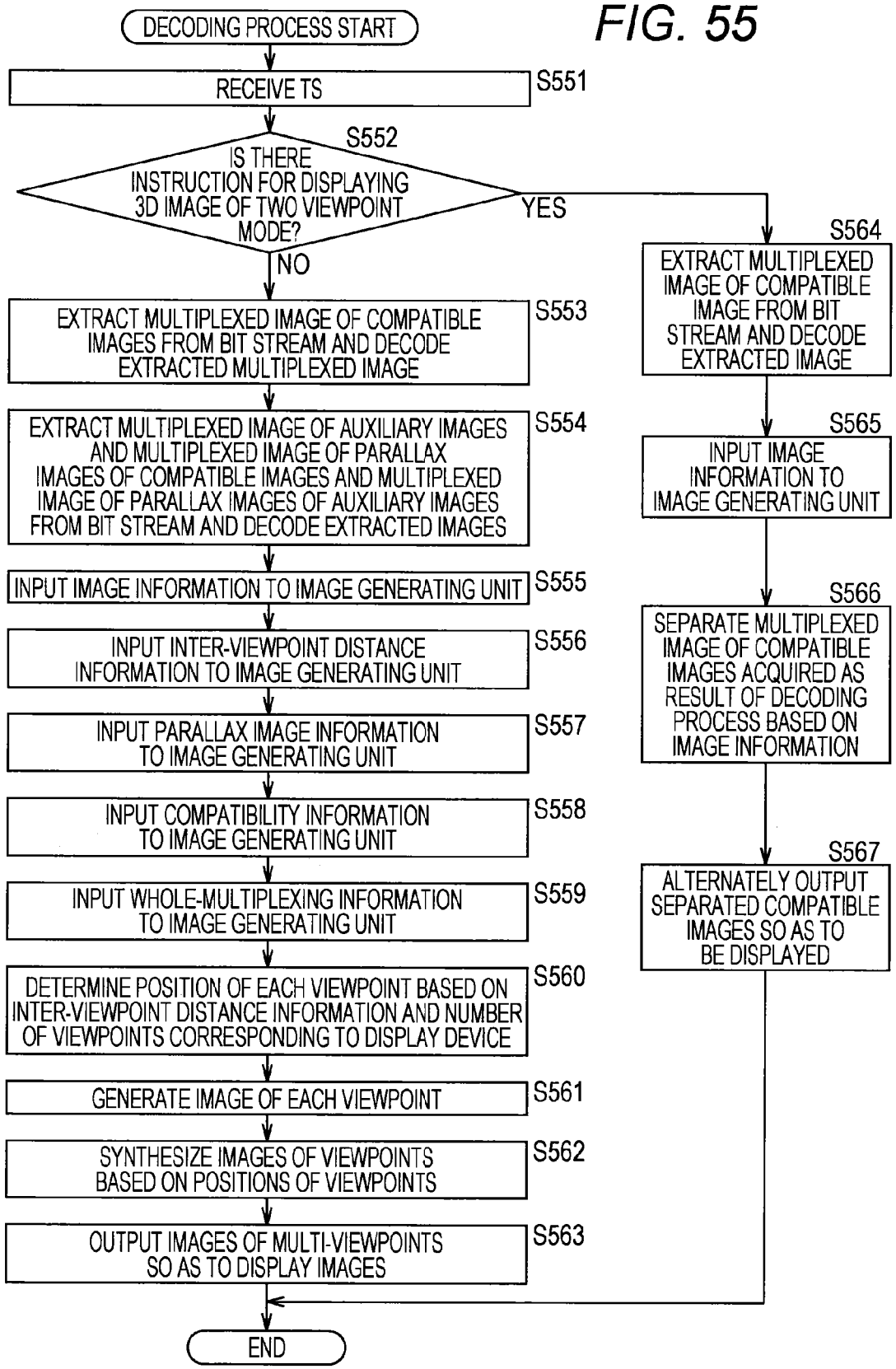
FIG. 55 is a flowchart that illustrates an encoding process performed by the encoding device illustrated in FIG. 54.

FIG. 55 is a flowchart that illustrates a decoding process performed by the decoding device 540 illustrated in FIG. 54. This decoding process, for example, is started when a TS that is transmitted from the encoding device 520 illustrated in FIG. 51 is input to the decoding device 540.

In Step S551 illustrated in FIG. 55, the reception unit 541 of the decoding device 540 receives a TS that is transmitted from the encoding device 520. The reception unit 541 extracts a bit stream included in the TS and supplies the extracted bit stream to the decoder 542. In addition, the reception unit 541 extracts auxiliary information that is included in the TS, supplies image information included in the auxiliary information to the image information acquiring unit 123, and supplies viewpoint distance information to the inter-viewpoint distance information acquiring unit 124. Furthermore, the reception unit 541 supplies disparity image information included in the auxiliary information to the disparity image information acquiring unit 125 and supplies compatibility information to the compatibility information acquiring unit 126. In addition, the reception unit 541 extracts whole multiplexing information that is included in the TS and supplies the extracted whole multiplexing information to the multiplexing information acquiring unit 543.

In Step S552, similarly to the process of Step S474 illustrated in FIG. 41, the image generating unit 544 determines whether or not an instruction for displaying a 3D image of the two-viewpoint mode has been made by a viewer, as indicated by "YES" and "NO" in the flow chart. In a case where it is determined that the instruction for displaying a 3D image of the two-viewpoint mode has not been made by the viewer in Step S552, in other words, in a case where an instruction for displaying a 3D image of the multi-viewpoint mode has been made, the process proceeds to Step S553.

In Step S553, the compatible decoder 551 of the decoder 542 extracts encoded data of the multiplexed image of the compatible images from the bit stream based on the compatibility information that is supplied from the reception unit 541 and decodes the extracted encoded data in a mode that corresponds to the AVC mode. Then, the compatible decoder 551 supplies a multiplexed image of the compatible images that is acquired as a result of the decoding process to the image generating unit 544.

In Step S554, the auxiliary decoder 552 extracts encoded data of the multiplexed image of the auxiliary images, the multiplexed image of the disparity images of the compatible images, and the multiplexed image of the disparity images of the auxiliary images from the bit stream based on the compatibility information that is supplied from the reception unit 541 and decodes the extracted encoded data in a mode that corresponds to the auxiliary encoder 532 illustrated in FIG. 51. The auxiliary decoder 552 supplies the multiplexed image of the auxiliary images, the multiplexed image of the disparity images of the compatible images, and the multiplexed image of the disparity images of the auxiliary images, which are acquired as a result of the decoding process, to the image generating unit 544, and the process proceeds to Step S555.

The process of Steps S555 to S558 is the same as that of Steps S476 to S479 illustrated in FIG. 41, and thus description thereof will not be presented.

After the process of Step S558, in Step S559, the multiplexing information acquiring unit 543 acquires the whole multiplexing information that is supplied from the reception unit 541 and inputs the acquired whole multiplexing information to the image generating unit 544.

In Step S560, the image generating unit 544, similarly to the process of Step S480 illustrated in FIG. 41, determines the position of each viewpoint of multi-viewpoint images to be generated based on the inter-viewpoint distance information supplied from the inter-viewpoint distance information acquiring unit 124 and the number of viewpoints that corresponds to a display device not illustrated in the figure.

In Step S561, the image generating unit 544 generates an image of each viewpoint of which the resolution is a half of the resolution of the compatible image or the auxiliary image by using the multiplexed image of the compatible images, the multiplexed image of the auxiliary images, the multiplexed image of the disparity images of the compatible images, and the multiplexed image of the disparity images of the auxiliary images based on the position of each viewpoint that is determined in Step S560, the image information supplied from the image information acquiring unit 123, the disparity image information supplied from the disparity image information acquiring unit 125, the compatibility information supplied from the compatibility information acquiring unit 126, the whole multiplexing information supplied from the multiplexing information acquiring unit 543, and the like. Then, the process proceeds to Step S562.

The process of Steps S562 and S563 is the same as that of Steps S482 and S483 illustrated in FIG. 41, and thus description thereof will not be presented.

In a case where it is determined that the instruction for displaying a 3D image of the two-viewpoint mode has been made by a viewer in Step S552, in Step S564, the compatible decoder 551 extracts encoded data of the multiplexed image of the compatible images from the bit stream based on the compatibility information that is supplied from the reception unit 541 and decodes the extracted encoded data in accordance with a mode that corresponds to the AVC mode. Then, the compatible decoder 551 supplies a multiplexed image of the compatible images that is acquired as a result of the decoding process to the image generating unit 544.

The process of Steps S565 to S567 is the same as that of Steps S484 to S486 illustrated in FIG. 41, and thus description thereof will not be presented.

In addition, in a decoding device that can decode only a compatible image that has compatibility with the decoding device 540, encoded data other than the encoded data of the compatible images that can be processed is ignored, and the process of Steps S564, S566, and S567 is performed. However, in such a case, in the process of Step S566, a multiplexed image of the compatible images is separated in accordance with a multiplexing mode that is determined in advance.

As above, the decoding device 540 can decode one bit stream that is generated from the encoded data of the multiplexed image of the compatible images, the multiplexed image of the auxiliary images, the multiplexed image of the disparity images of the compatible images, and the multiplexed image of the disparity images of the auxiliary images.

<Bit Stream According to This Embodiment>
[Configuration Example of Bit Stream]

Figure 56:
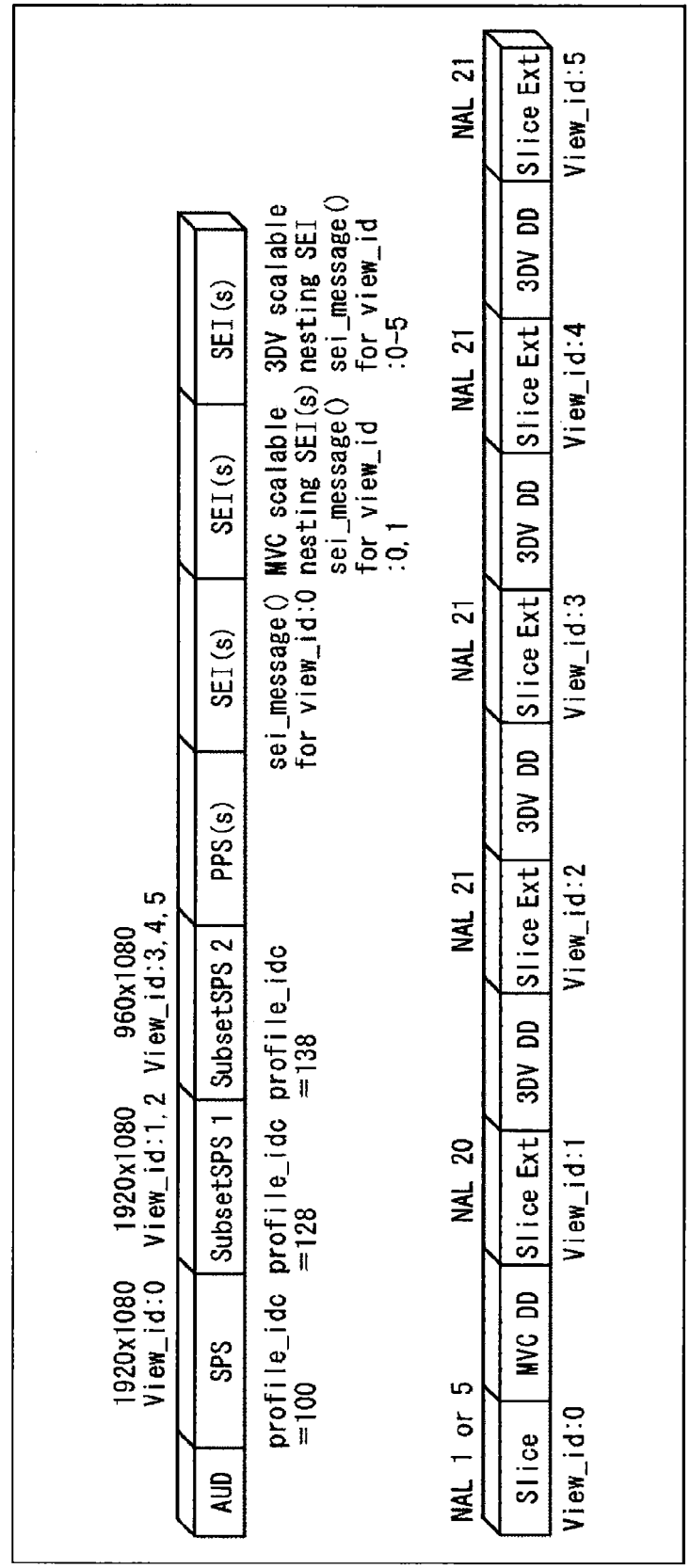
FIG. 56 is a diagram that illustrates a configuration example of a bit stream.

FIG. 56 is a diagram that illustrates a configuration example of a bit stream (encoded stream) in units of access units that is generated in accordance with this embodiment.

In the example illustrated in FIG. 56, the compatible images are an L image and an R image of 1920×1080 pixels, and the auxiliary image is an O image of 1920×1080 pixels. In addition, the size of the L disparity image, the R disparity image, and the O disparity image is 960×1080 pixels. Furthermore, the L image is encoded in accordance with the AVC mode, the R image is encoded in accordance with the MVC mode, and the O image, the L disparity image, the R disparity image, and the O disparity image are encoded in according with the 3DV mode. In addition, the view IDs of the L image, the R image, the O image, the L disparity image, the R disparity image, and the O disparity image are 0, 1, 2, 3, 4, and 5, respectively. Here, the view ID is an ID that is unique to the image of each viewpoint and the disparity image.

As illustrated in FIG. 56, in the bit stream in units of access units, for example, an access unit delimiter (AUD), an SPS (sequence parameter set), a Subset SPS (Subset SPS1) according to the MVC mode for an image, a Subset SPS (Subset SPS2) according to the 3DV mode for a disparity image, a PPS (picture parameter set), SEI according to the AVC mode, SEI according to the MVC mode, SEI according to the 3DV mode, and an NAL (network abstraction layer) unit of encoded data are arranged in order from the head.

The NAL unit of the access unit delimiter is an NAL unit that represents a boundary of an access unit. The NAL unit of the SPS is an NAL unit of the SPS that includes a profile_idc (100 in the example illustrated in FIG. 56) that represents a profile of the L image out of profiles defined in accordance with the AVC mode. The NAL unit of the Subset SPS for an image is an NAL unit of the Subset SPS including profile_idc (128 in the example illustrated in FIG. 56) that represents profiles of the R image and the O image out of profiles defined in accordance with the MVC mode. The NAL unit of the Subset SPS for a disparity image is an NAL unit of the Subset SPS that includes profile_idc (138 in the example of FIG. 56) that represents profiles of the L disparity image, the R disparity image, and the O disparity image out of profiles defined as profiles for a disparity image in accordance with the 3DV mode.

The NAL unit of the SEI according to the AVC mode is an NAL unit of the SEI of the L image. The NAL unit of the SEI according to the MVC mode is an NAL unit of the SEI of the L image or the R image. The NAL unit of the SEI of the 3DV mode is an NAL unit of the SEI of the L image, the R image, the O image, the L disparity image, the R disparity image, or the O disparity image.

As NAL units of the encoded data, NAL units of encoded data of an L image, a delimiter (MVC DD), encoded data of an R image, a delimiter (3DV DD), encoded data of an O image, a delimiter (3DV DD), encoded data of an L disparity image, a delimiter (3DV DD), encoded data of an R disparity image, a delimiter (3DV DD), encoded data of an O disparity image are arranged in order from the head.

In the NAL unit of the encoded data of the L image, an NAL header that includes 1 or 5 as the type of the NAL unit representing a picture according to the AVC mode is added. In addition, the NAL unit of the delimiter (MVC DD) is an NAL unit that represents a head of the encoded data of the MVC mode. In the NAL unit of the encoded data of the R image, an NAL header that includes 20 representing encoded data according to the MVC mode as the type of the NAL unit is added. In addition, the NAL unit of the delimiter (3DV DD) is an NAL unit that represents a head of the encoded data of the 3DV mode. Furthermore, in the NAL units of the encoded data of the O image, the L disparity image, the R disparity image, and the O disparity image, an NAL header that includes 21 representing encoded data according to the 3DV mode as the type of the NAL unit is added.

FIG. 57 is a diagram that illustrates an example of the description of a Subset SPS, identified as subset_seq_parameter_set_rbsp( ), according to the 3DV mode for a disparity image illustrated in FIG. 56.

As illustrated in FIG. 57, in a Subset SPS according to the 3DV mode for a disparity image, SPS (seq_parameter_set_data) that includes profile_idc (138 in the example illustrated in FIG. 57) representing the profiles of the L disparity image, the R disparity image, and the O disparity image and information for each profile_idc that is defined in accordance with the 3DV mode are described.

More specifically, in the Subset SPS of the 3DV mode for a disparity image, as information when profile_idc is 138, extension information (seq_parameter_set_depth_extension) for a disparity image, a VUI information flag (depth_vui_parameters_present_flag) for a disparity image that represents whether or not VUI extension information for a disparity image is included and the like are described. In addition, in a case where the VUI information flag for a disparity image represents that the VUI extension information for a disparity image is included, VUI extension information (depth_vui_parameters_extension) for a disparity image is also described.

In addition, in a case where the Subset SPS of the 3DV mode for a disparity image is referred to in a decoding process, in other words, in a case where the L disparity image, the R disparity image, and the O disparity image are decoded, similarly to a case where an IDR picture is decoded, the reference image is reset.

FIG. 58 is a diagram that illustrates an example of the description of extension information for a disparity image that is illustrated in FIG. 57.

As illustrated in FIG. 58, the extension information for disparity information, similarly to the extension information within the Subset SPS of the MVC mode, is formed by described information and a view ID (ref_view_id) of an image corresponding to each disparity image.

In FIG. 58, similarly to the extension information within the Subset SPS of the MVC mode, the described information is expanded and is included in the extension information for a disparity image. Accordingly, the view ID (view_id) of each disparity view and the view ID of an image that corresponds to each disparity image can be described together for each disparity image. In other words, information (num_views_minus1) that represents the number of disparity images is described, and a description for reading out the view ID of a disparity image and the view ID of an image that corresponds to the disparity image can be made as many times as the number.

In contrast to this, similarly to the extension information within the Subset SPS of the MVC mode, in a case where the described information is not expanded and is included in the extension information for a disparity image, in addition to the extension information for a disparity image, information representing the number of disparity images is described, and a description for reading out a view ID of an image that corresponds to the disparity image needs to be made as many times as the number. As a result, the description of the information that represents the number of disparity images and the description for reading out the information as many times as the number overlap each other.

Accordingly, as illustrated in FIG. 58, in a case where described information is expanded and is included in the extension information for a disparity image, similarly to the extension information within the Subset SPS of the MVC mode, the amount of data of the extension information for a disparity image can be less than that of a case where the information is not expanded and is included in the extension information for a disparity image.

FIG. 59 is a diagram that illustrates an example of the description of VUI extension information for a disparity image illustrated in FIG. 57.

As illustrated in FIG. 59, the VUI extension information for a disparity image is described in the same manner as the VUI extension information (depth_vui_parameters_extension) of the MVC mode except for the following points. In other words, in the VUI information for a disparity image, for each pixel of a disparity image, a position type flag (depth_loc_info_present_flag) that represents whether or not a position type representing the type of a position of an image that corresponds to the disparity image is included and a before-conversion size information flag (video_src_info_present_flag) representing whether or not before-conversion size information representing the size of the disparity image before resolution conversion is included are included. In addition, in a case where the position type flag represents that the position type is included, the position type is also included in the VUI information for a disparity image, and, in a case where the before-conversion size information flag represents that the before-conversion size information is included, the before-conversion size information is also included in the VUI information for a disparity image.

The position type is formed by a top field position type (depth_sample_loc_type_top_field) and a bottom field position type (depth_sample_loc_type_bottom_field). The top field and bottom field position types are described similarly to the top field position type and the bottom field position type that are included in the VUI extension information of the MVC mode.

In addition, the before-conversion size information is configured by information (pic_width_in_mbs_minus1) that represents the number of macro blocks of the disparity image before resolution conversion in the horizontal direction, information (pic_height_in_mbs_minus1) that represents the number of macro blocks in the vertical direction, an aspect ratio flag (aspect_ratio_info_present_flag) that represents whether or not aspect information representing an aspect ratio is included, and the like. In a case where the aspect ratio flag represents that the aspect information is included, the aspect information is also included in the before-conversion size information.

The aspect information is formed by an aspect ratio ID (aspect_ratio_idc) that is an ID unique to an aspect ratio and the like. This aspect ratio IDs are assigned not only to aspect ratios that are defined in advance but also to all the aspect ratios that are not defined. In a case where an aspect ratio ID that is included in the aspect information is an aspect ratio ID (Extended_SAR) that is given to all the aspect ratios that are not defined, values (sar_width and sar_height) of the aspect ratio of the disparity image before resolution conversion in the horizontal and vertical directions are also included in the aspect information.

[Example of Description of NAL Header of Encoded Data of 3DV Mode]

FIG. 60 is a diagram that illustrates an example of the description of an NAL header of an NAL unit of encoded data according to the 3DV mode in which 21 is included as the type of the NAL unit.

As illustrated in FIG. 60, in the NAL header of the encoded data according to the 3DV mode, as information at a time when the type of the NAL unit is 21, a disparity image header extension information flag (depth_extension_flag) representing whether or not disparity image header extension information is included and the like are described. Here, the disparity image header extension information is also described in the NAL header of the encoded data of the disparity image according to the 3DV mode.

In a case where the disparity image header extension information flag represents that the disparity image header extension information is included, in the NAL header of the encoded data of the 3DV mode, the disparity image header extension information (nal_unit_header_depth_extension) is also described. On the other hand, in a case where the disparity image header extension information flag represents that the disparity image header extension information is not included, in the NAL header of the encoded data of the 3DV mode, MVC mode header extension information (nal_unit_header_mvc_extension) is also described.

FIG. 61 is a diagram that illustrates an example of the description of the disparity image header extension information illustrated in FIG. 60.

As illustrated in FIG. 61, the disparity image header extension information is configured to be the same as the MVC mode header extension information except that a view ID (ref_view_id) of an image corresponding to the disparity image is included.

[Example of Description of SEI according to 3DV Mode]

FIG. 62 is a diagram that illustrates an example of the description of SEI according to the 3DV mode illustrated in FIG. 56.

As illustrated in FIG. 62, in the SEI according to the 3DV mode, similarly to the SEI according to the MVC mode, a message of SEI is described.

In other words, in the SEI according to the 3DV mode, an operation point flag (operation_point_flag) representing whether or not an operation point is designated is described, and, in a case where the operation point flag represents that the operation point is not designated, an all-component flag (all_view_components_in_au_flag) representing whether or not the message of the SEI is adapted to all the images and the disparity images within the access unit is described. On the other hand, in a case where the all-component flag represents that the message of the SEI is not adapted to all the images and the disparity images within the access unit, the number (num_view_components_minus1) of view IDs and the view IDs (sei_view_id) of the images and the disparity images to which the message of the SEI is adapted are described.

On the other hand, in a case where the operation point flag represents that the operation point is designated, out of operation points to which the message of the SEI is adapted, view IDs (sei_op_view_id) of the images and the disparity images that are adaptation targets and the number (sei_op_temporal_id) of the operation points are described. Then, the message (sei_rbsp) of the SEI is described. In addition, in the SEI according to the 3DV mode, a plurality of messages of the SEI can be described.

In the example illustrated in FIG. 56, although the profiles of the R and O images are assumed to be the same, the profiles of the R and O images may be different from each other.

[Another Configuration Example of Bit Stream]

Figure 63:
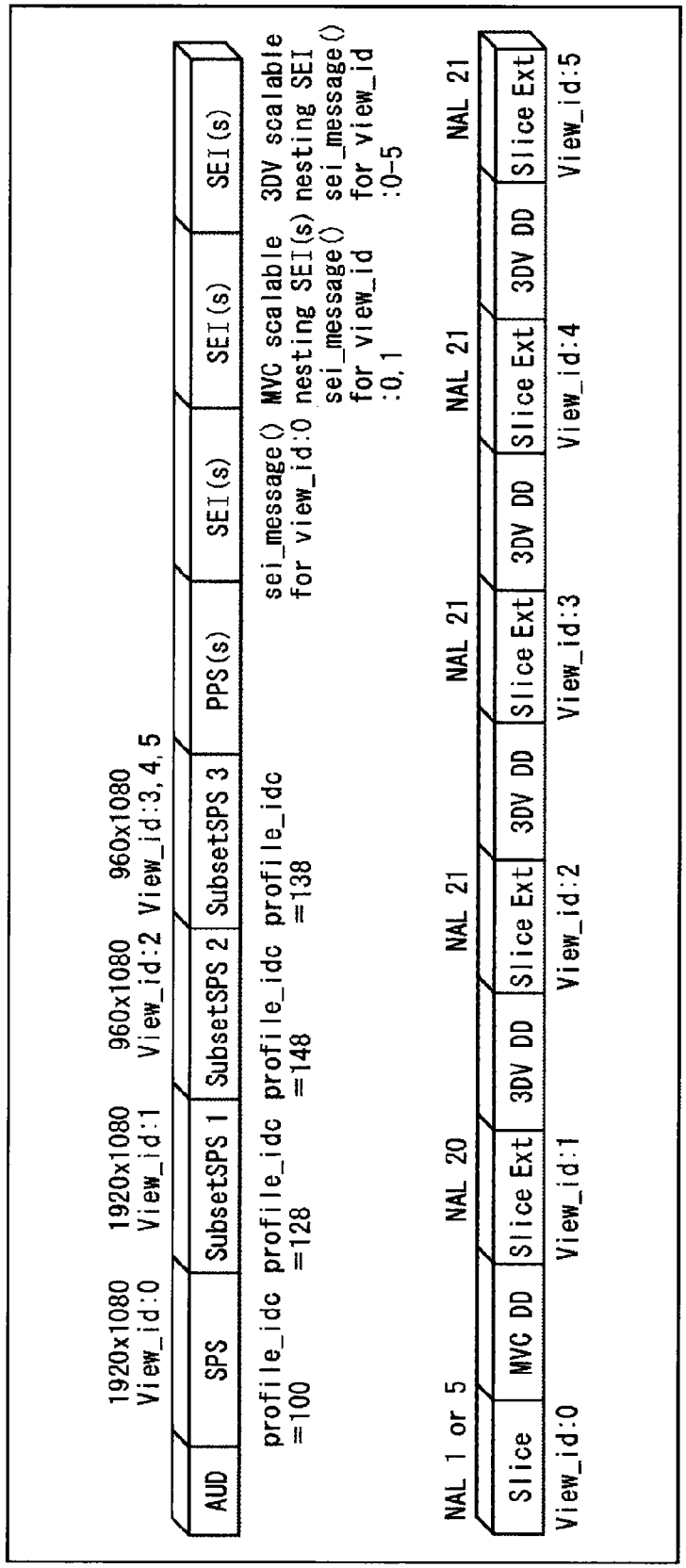
FIG. 63 is a diagram that illustrates another configuration example of the bit stream.

FIG. 63 is a diagram that illustrates a configuration example of the bit stream in units of access units in a case where profiles of the R and O images illustrated in FIG. 56 are different from each other.

The configuration of the bit stream illustrated in FIG. 63 is different from the configuration of the bit stream illustrated in FIG. 56 in that a Subset SPS according to the 3DV mode for an image other than the Subset SPS according to the MVC mode for an image and the Subset SPS according to the 3DV mode for a disparity image is arranged.

The NAL unit (Subset SPS1) of the Subset SPS according to the MVC mode for an image is an NAL unit of the Subset SPS that includes profile_idc (128 in the example illustrated in FIG. 63) representing the profile of the R image out of profiles defined in the MVC mode. The NAL unit of the Subset SPS (Subset SPS2) according to the 3DV mode for an image is an NAL unit of the Subset SPS that includes profile_idc (148 in the example illustrated in FIG. 63) representing the profile of the O image out of profiles defined as profiles for an image in the 3DV mode. The NAL unit of the Subset SPS (Subset SPS3) for a disparity image is an NAL unit of the Subset SPS that includes profile_idc (138 in the example illustrated in FIG. 63) representing the profiles of the L disparity image, the R disparity image, and the O disparity image out of profiles defined as profiles for a disparity image in the 3DV mode.

[Example of Description of Subset SPS According to 3DV Mode for Image]

FIG. 64 is a diagram that illustrates an example of the description of Subset SPS according to the 3DV mode for an image that is illustrated in FIG. 63.

As illustrated in FIG. 64, in the Subset SPS according to the 3DV mode for an image, SPS (seq_parameter_set_data) that includes profile_idc (148 in the example illustrated in FIG. 64) representing the profile of the image O and information for each profile_idc that is defined in the 3DV mode are described.

More specifically, in the Subset SPS according to the 3DV mode for an image, similarly to the Subset SPS according to the MVC mode as information at a time when profile_idc is 148, the extension information (seq_parameter_set_mvc_extension) according to the MVC mode, the VUI information flag (mvc_vui_parameters_present_flag) according to the MVC mode that represents whether or not the VUI extension information according to the MVC mode is included, and the like are described. In addition, in a case where the VUI information flag according to the MVC mode represents that the VUI extension information according to the MVC mode is included, the VUI extension information (mvc_vui_parameters_extension) according to the MVC mode is also described. Furthermore, as the information at a time when profile_idc is 138, information similar to that illustrated in FIG. 57 is described.

Here, the 3DV mode may be a mode for encoding a display image according to a multi-viewpoint mode that is compliant with an HEVC (High Efficiency Video Coding) mode other than the AVC mode and the MVC mode. A bit stream of such a case will be described as below. In this specification, it is assumed that the HEVC mode is based on HEVC Working Draft: Thomas Wiegand, Woo-jin Han, Benjamin Bross, Jens-Rainer Ohm, Gary J. Sullivian, "WD3: Working Draft3 of High-Efficiency Video Coding", JCTVc-E603_d5 (version5), written on May 20, 2011.

<Bit Stream in Case where 3DV Mode is Mode that is Compliant with HEVC Mode>

[Configuration Example of Bit Stream]

Figure 65:
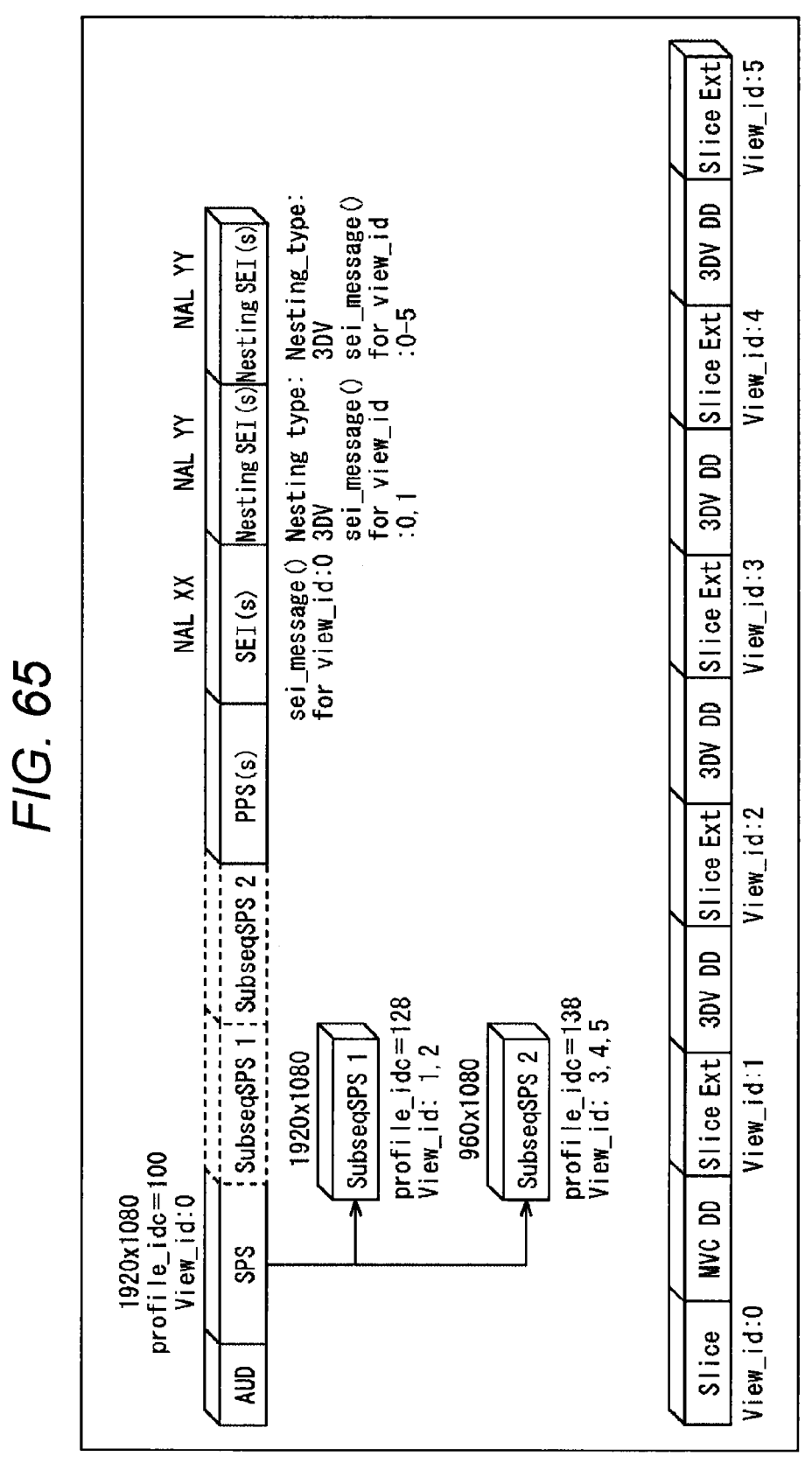

FIG. 65 is a diagram that illustrates a configuration example of a bit stream in units of access units in a case where the 3DV mode is a mode that is compliant with the HEVC mode.

In the example illustrated in FIG. 65, it is assumed that the L viewpoint image, the R viewpoint image, and the 0 viewpoint image as in the example illustrated in FIG. 56 are encoding targets, the L image is encoded in accordance with the AVC mode, and the L viewpoint image, the R viewpoint image, and the O viewpoint image are encoded in accordance with the 3DV mode.

The bit stream illustrated in FIG. 65 is different from the bit stream illustrated in FIG. 56 in that the Subset SPS (Subset SPS1) according to the 3DV mode for an image and the Subset SPS (Subset SPS2) according to the 3DV mode for a disparity image can be described within the SPS, and NAL headers including mutually-different types of the NAL units are added to the NAL units of the SEI according to the HEVC mode and the SEI according to the 3DV mode.

In the bit stream illustrated in FIG. 65, the Subset SPS according to the 3DV mode for an image and the Subset SPS according to the 3DV mode for a disparity image may be described only within the SPS, may be described to be separate from the SPS, or may be described in the SPS and described to be separate from the SPS. Here, the description of the Subset SPS according to the 3DV mode for an image and the Subset SPS according to the 3DV mode for a disparity image separated from the SPS is compliant with the BD standard and is appropriate for a case where the encoded data according to the HEVC mode and the encoded data according to the 3DV mode are generated as ES (elementary streams) different from each other.

In the bit stream illustrated in FIG. 65, since the types of the NAL units that are included in the NAL headers added to the NAL unit of the SEI according to the HEVC mode and the NAL unit of the SEI according to the 3DV mode are different from each other, an NAL unit of the SEI according to the HEVC mode or the SEI according to the 3DV mode can be easily extracted in a decoding process.

[Example of Description of SPS]

FIG. 66 is a diagram that illustrates an example of the description of SPS illustrated in FIG. 65.

The description of the SPS illustrated in FIG. 66 is the same as the description of the SPS according to the HEVC mode except that a Subset SPS information flag (subset_seq_present_flag) representing whether or not information of the Subset SPS is included is described, and the information of the Subset SPS is described in a case where the Subset SPS information flag represents that the information of the Subset SPS is included.

As illustrated in FIG. 66, the information of the Subset SPS includes the number (num_subset_seq) of Subset SPS and a Subset SPS flag (subset_seq_info_present_flag) that represents whether or not the Subset SPS is included. In addition, in a case where the Subset SPS flag represents that the Subset SPS is included, the Subset SPS (subset_seq_parameter_set_data) is also included in the information of the Subset SPS.

As above, since the number of Subset SPS is described as the information of the Subset SPS, it can be recognized whether or the Subset SPS is present by only reading out the description of the SPS in the decoding process. In addition, since the Subset SPS flag is described, the Subset SPS can be described separated from the SPS without being described within the SPS, whereby duplicate on the description of the Subset SPS can be prevented.

[Example of Description of Subset SPS]

FIG. 67 is a diagram that illustrates an example of the description of the Subset SPS illustrated in FIG. 66.

The description of the Subset SPS illustrated in FIG. 67 is the same as the description of the SPS according to the HEVC mode except that images to which the Subset SPS is adapted, the number (num_subset_seq_views) of view IDs of disparity images, a disparity image flag (depth_extension_flag) that represents whether or not the adaptation target of the Subset SPS is a disparity image, and an invalidness flag (seq_param_override_flag) that represents whether or not the SPS is invalidated at the time of adapting the Subset SPS are described.

In a case where the disparity image flag represents that the adaptation target of the Subset SPS is a disparity image, a view ID (ref_view_id) of an image that corresponds to the disparity image that is the adaption target is described in the Subset SPS. In addition, in a case where the invalidness flag represents that the SPS is invalidated at the time of adapting the Subset SPS, similarly to the SPS, information (subset_seq_profile_idc) that represents profiles and the like are described in the Subset SPS.

Of the descriptions of the Subset SPS, as descriptions similar to the descriptions of the SPS, for example, there are information (subset_seq_frame_cropping_flag) that represents whether or not an adapted image and a disparity image are cropped, a VUI information flag (subset_seq_vui_parameters_present_flag) that represents whether or not the VUI information (subset_seq_vui_parameters) is included, and the like. In a case whether VUI information flag represents that the VUI information is included, similarly to the SPS, the VUI information is also described. On the other hand, in a case where the VUI information flag represents that the VUI information is not included, similarly to the SPS, the VUI information is not described. In such a case, the VUI information of the SPS is adapted as the VUI information.

[Example of Description of VUI information of Subset SPS]

FIG. 68 is a diagram that illustrates an example of the description of the VUI information of the Subset SPS illustrated in FIG. 67.

The description of the VUI information of the Subset SPS illustrated in FIG. 68 is the same as the description of the VUI information of the SPS according to the HEVC mode except that a before-conversion size information flag (video_src_info_present_flag) representing whether or not before-conversion size information that is an adaptation target is included is described.

In a case where the before-conversion size information flag represents that the before-conversion size information of an adaption target is included, the before-conversion size information is described in the VUI information illustrated in FIG. 68. In other words, information (src_pic_width_in_mbs_minus1) that represents the number of macro blocks of the adaptation target before resolution conversion in the horizontal direction, information (src_pic_height_in_mbs_minus1) that represents the number of macro blocks in the vertical direction, an aspect ratio flag (src_aspect_ratio_info_present_flag) that represents whether or not aspect information representing an aspect ratio is included, and the like are described.

In a case where the aspect ratio flag represents that the aspect information is included, the aspect information that is formed by an aspect ratio ID (src_aspect_ratio_idc) and the like are also included in the before-conversion size information. In a case where the aspect ratio ID included in the aspect information is an aspect ratio ID (Extended_SAR) given to all the aspect ratios that are not defined, values (sar_width and sar_height) of the aspect ratio of the adaption target before resolution conversion in the horizontal and vertical directions are also included in the aspect information.

In addition, in the VUI information of the Subset SPS illustrated in FIG. 68, points different from those of the VUI information of the SPS may be described. In such a case, for information that is not described in the VUI information of the Subset SPS, information that is included in the VUI information of the SPS is applied.

[Example of Description of SEI]

FIG. 69 is a diagram that illustrates an example of the description of the SEI according to the 3DV mode that is illustrated in FIG. 65.

The description of the SEI according to the 3DV mode illustrated in FIG. 69 is the same as the description of the SEI message of the type of the SEI message except that the type (nesting_type) of the SEI message, an all-component flag (all_view_components_in_au_flag), and the like are described.

As the types of the SEI message, there are SEI message according to the MVC mode, SEI message according to the 3DV mode, SEI message defined by a user, and the like. In a case where the all-component flag represents that adaptation to all the images and the disparity images within the access unit is not performed, the number of view IDs (num_view_components_minus1) of the images and the disparity images to which the SEI message is adapted and view IDs (nesting_sei_view_id) corresponding to the number are also described in the SEI according to the 3DV mode.

Eighth Embodiment

[Description of Computer to which Present Technology is Applied]

Next, a series of processes described above may be performed by either hardware or software. In a case where the series of processes is performed by software, a program configuring the software is installed to a general-purpose computer or the like.

Figure 70:
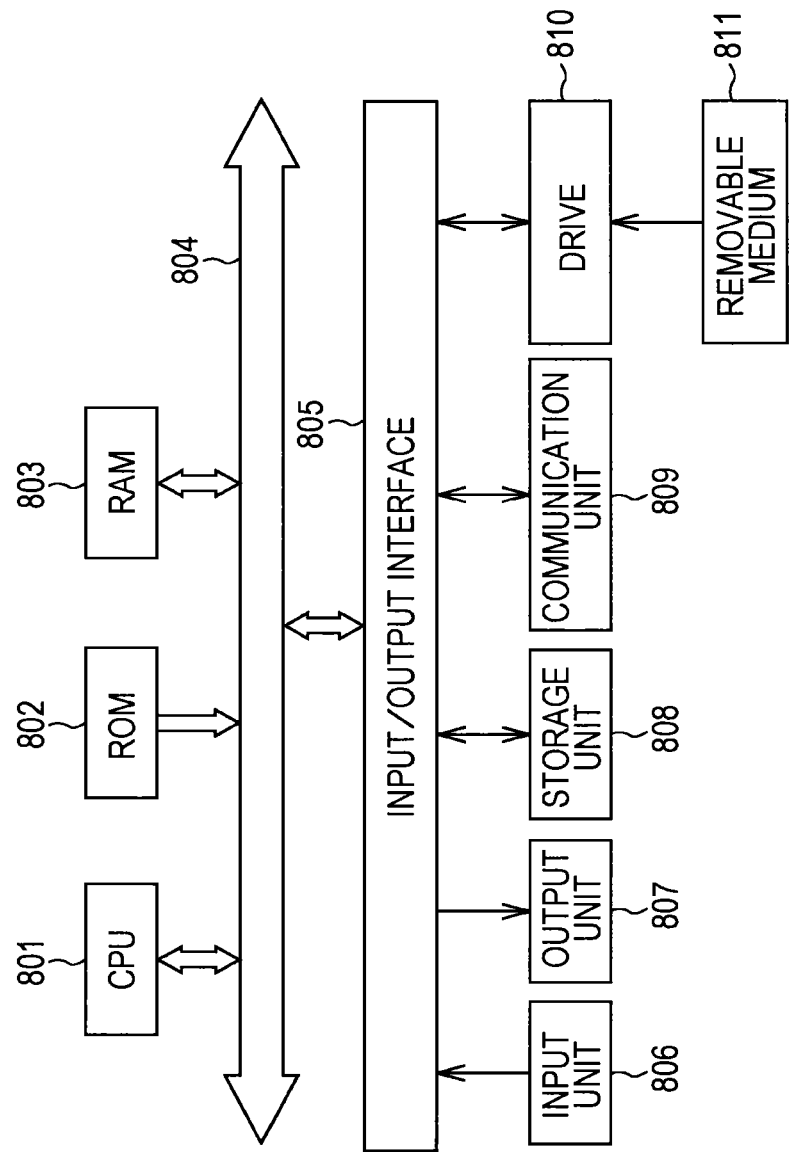
FIG. 70 is a diagram that illustrates a configuration example of a computer according to an embodiment.

FIG. 70 illustrates a configuration example of a computer according to an embodiment to which a program that executes the above-described series of processes is installed.

The program may be recorded in a storage unit 808 as a recording medium that is built in the computer or a ROM (Read Only Memory) 802 in advance.

Alternatively, the program may be stored (recorded) on a removable medium 811. Such removable medium 811 may be provided as so-called package software. Here, examples of the removable medium 811 include a flexible disk, a compact disc read only memory (CD-ROM), a magneto optical (MO) disk, a digital versatile disc (DVD), a magnetic disk, and a semiconductor memory.

In addition to installing the program on the computer from a removable medium 811 as described above through a drive 810, the program may be downloaded into the computer through a communication network or a broadcast network and be installed to the storage unit 808 that is built therein. In other words, the program may be transmitted to the computer in a wireless manner, for example, from a download site through a satellite used for digital satellite broadcasting or be transmitted to the computer in a wired manner through a network such as a local area network (LAN) or the Internet.

The computer includes a CPU (central processing unit) 801 therein, and an input/output interface 805 is connected to the CPU 801 through a bus 804.

When an instruction is input from a user through the input/output interface 805 by operating an input unit 806, the CPU 801 executes a program that is stored in the ROM 802 in accordance with the instruction. Alternatively, the CPU 801 loads a program that is stored in the storage unit 808 into a RAM (random access memory) 803 and executes the program.

Accordingly, the CPU 801 performs the process according to the above-described flowchart or the process that is performed by the configuration of the above-described block diagram. Then, the CPU 801 outputs a processing result from an output unit 807, for example, through the input/output interface 805, transmits the processing result from a communication unit 809, or records the processing result in the storage unit 808 as is needed.

Here, the input unit 806 is configured by a keyboard, a mouse, a microphone, and the like. In addition, the output unit 807 is configured by an LCD (liquid crystal display), a speaker, and the like.

Here, in this specification, the process that is performed by a computer in accordance with a program does not need to be performed necessarily in a time series in accordance with the sequence described in the flowchart. In other words, the process that is performed by the computer in accordance with the program includes a process (for example, a parallel process or a process using an object) that is performed in a parallel manner or in an individual manner.

In addition, the program may be processed by one computer (processor) or may be processed by a plurality of computers in a distributed manner. Furthermore, the program may be transmitted to a remote computer and be executed.

The present technology can be applied to an encoding device and a decoding device that are used when data is received through a network medium such as satellite broadcasting, cable TV (television), the Internet, or a cellular phone or data is processed on a storage medium such as an optical disc, a magnetic disk, or a flash memory.

In addition, the encoding device and the decoding device described above can be applied to an arbitrary electronic apparatus. Hereinafter, the examples thereof will be described.

Ninth Embodiment

[Configuration Example of Television Apparatus]

Figure 71:
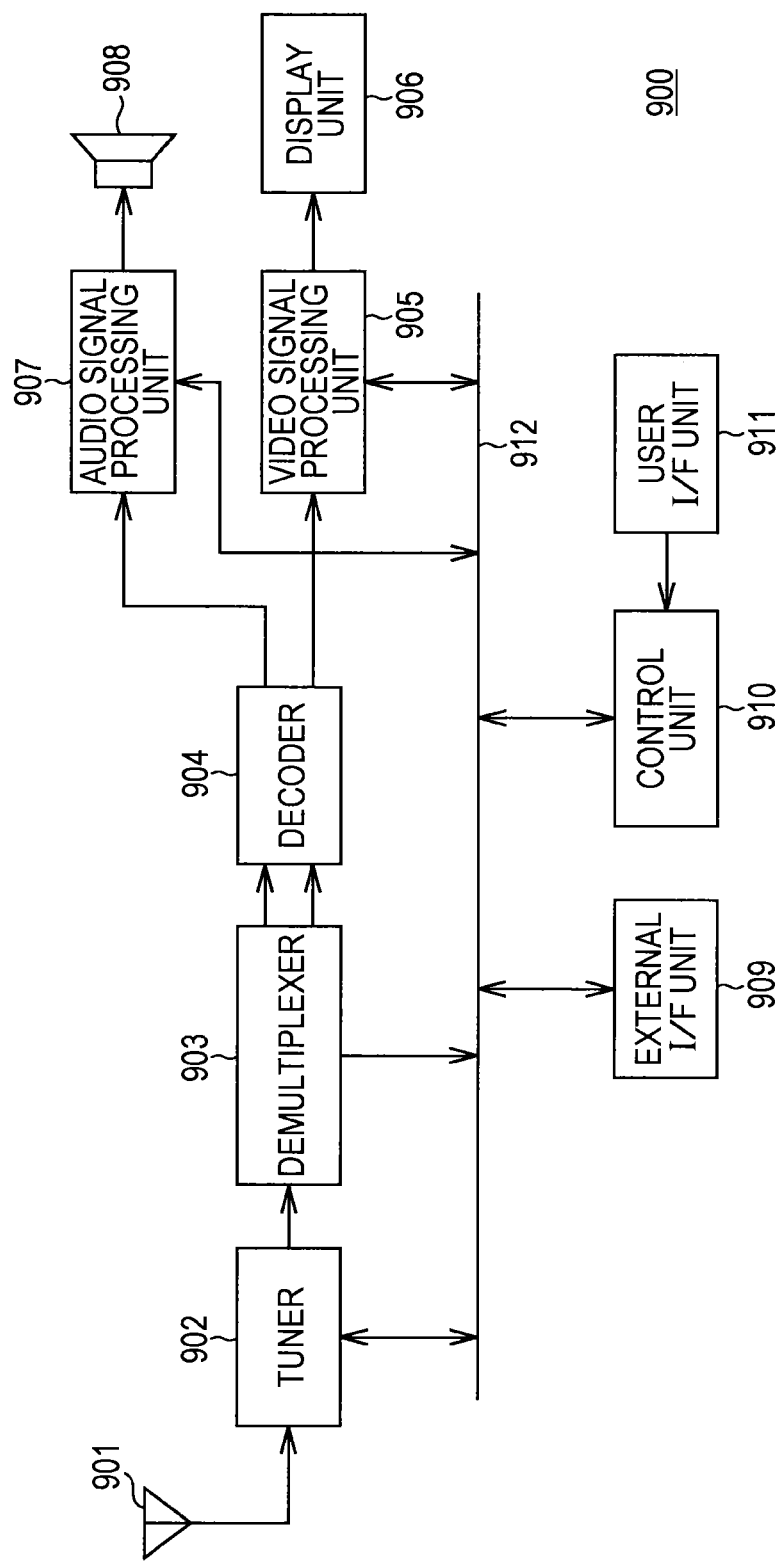
FIG. 71 is a diagram that illustrates a schematic configuration of a television apparatus according to the present technology.

FIG. 71 illustrates a schematic configuration of a television apparatus according to the present technology as an example. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. In addition, the television apparatus 900 includes a control unit 910, user interface unit 911, and the like.

The tuner 902 selects a desired channel from among broadcasting signals received by the antenna 901, demodulates a corresponding broadcasting signal, and outputs an acquired decoded bit stream to the demultiplexer 903.

The demultiplexer 903 extracts packets of a video and an audio of a program that is a viewing target from the encoded bit stream and outputs data of the extracted packets to the decoder 904. In addition, the demultiplexer 903 supplies packets of data such as EPG (electronic program guide) to the control unit 910. Furthermore, in a case where scrambling is performed, the scrambling is cancelled by the demultiplexer.

The decoder 904 performs a decoding process of the packets, outputs video data generated by the decoding process to the video signal processing unit 905, and outputs audio data to the audio signal processing unit 907.

The video signal processing unit 905 performs noise elimination or video processing according to a user's setting for the video data. The video signal processing unit 905 generates video data of a program to be displayed on the display unit 906, image data acquired by a process that is based on an application supplied through a network, and the like. In addition, the video signal processing unit 905 generates video data used for displaying a menu screen of item selection or the like and superimposes the generated video data on the video data of the program. The video signal processing unit 905 generates a driving signal based on the video data generated as above and drives the display unit 906.

The display unit 906 drives a display device (for example, a liquid crystal display device or the like) based on the driving signal supplied from the video signal processing unit 905, thereby displaying a video of the program or the like.

The audio signal processing unit 907 performs predetermined processing such as noise elimination for the audio data, performs a D/A conversion process or an amplification process for the audio data after processing, and supplies resultant audio data to the speaker 908, thereby performing an audio output process.

The external interface unit 909 is an interface for a connection with an external device or a network and performs data transmission or data reception of video data, audio data, and the like.

The user interface unit 911 is connected to the control unit 910. The user interface unit 911 is configured by an operating switch, a remote control signal reception unit, and the like and supplies an operating signal according to a user's operation to the control unit 910.

The control unit 910 is configured by a CPU (central processing unit), a memory, and the like. The memory stores various kinds of data, EPG data, data acquired through the network, and the like that are necessary for a program that is executed by the CPU or the CPU to performing a process. The program stored in the memory is read out and executed by the CPU at predetermined timing such as start-up of the television apparatus 900. The CPU controls each unit so as to enable the television apparatus 900 to perform an operation according to a user's operation by executing the program.

In addition, in the television apparatus 900, a bus 912 is disposed so as to connect the tuner 902, the demultiplexer 903, the video signal processing unit 905, the audio signal processing unit 907, the external interface unit 909, and the like and the control unit 910 to each other.

In the television apparatus configured as above, the function of the decoding device (decoding method) according to this application is arranged in the decoder 904. Accordingly, multi-viewpoint images can be decoded in accordance with a mode having compatibility with an existing mode.

Tenth Embodiment

[Configuration Example of Cellular Phone]

Figure 72:
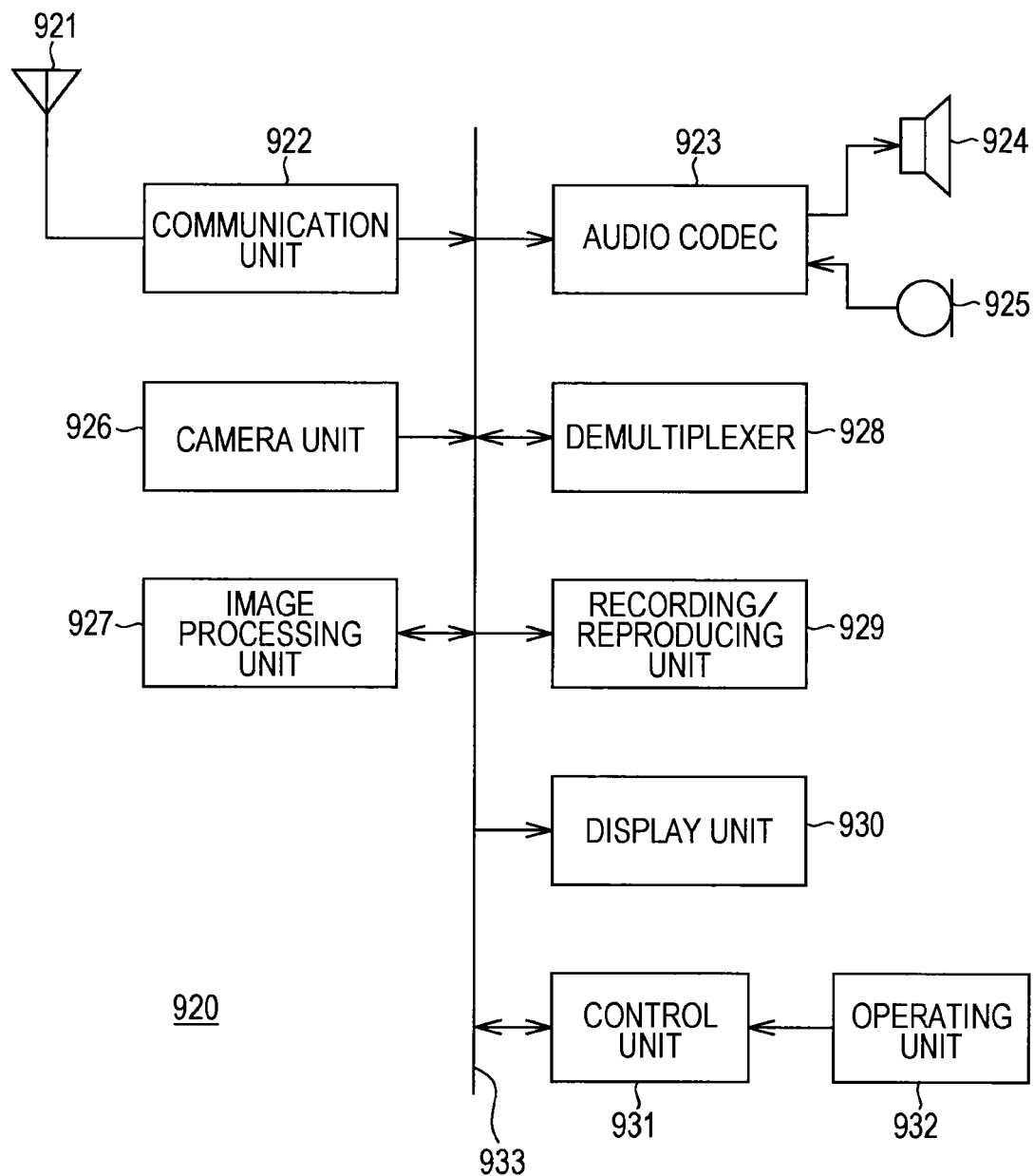
FIG. 72 is a diagram that illustrates a schematic configuration of a cellular phone according to the present technology.

FIG. 72 illustrates a schematic configuration of a cellular phone according to the present technology. The cellular phone 920 includes a communication unit 922, an audio codec 923, a camera unit 926, an image processing unit 927, a demultiplexing unit 928, a recording/reproducing unit 929, a display unit 930, and a control unit 931. These are interconnected through a bus 933.

In addition, an antenna 921 is connected to the communication unit 922, and a speaker 924 and a microphone 925 are connected to the audio codec 923. Furthermore, an operating unit 932 is connected to the control unit 931.

The cellular phone 920 performs various operations such as transmission and reception of an audio signal, transmission and reception of an electronic mail or image data, image capturing, and data recording in various modes such as a voice phone mode and a data communication mode.

In the voice phone mode, an audio signal generated by the microphone 925 is converted into audio data and is compressed by the audio codec 923, and resultant audio data is supplied to the communication unit 922. The communication unit 922 performs a modulation process, a frequency converting process, and the like for the audio data, thereby generating a transmission signal. In addition, the communication unit 922 supplies the transmission signal to the antenna 921, thereby transmitting the transmission signal to a base station not illustrated in the figure. Furthermore, the communication unit 922 performs an amplification process, a frequency converting process, a demodulation process, and the like for the reception signal received by the antenna 921 and supplies acquired audio data to the audio codec 923. The audio codec 923 performs data decompression of the audio data, converts the audio data into an analog audio signal, and outputs the audio signal to the speaker 924.

In the data communication mode, in a case where mail transmission is performed, the control unit 931 receives character data input by an operation of the operating unit 932 and displays the input character on the display unit 930. In addition, the control unit 931 generates mail data based on a user's instruction or the like supplied from the operating unit 932 and supplies the generated mail data to the communication unit 922. The communication unit 922 performs a modulation process, a frequency converting process, and the like for the mail data and transmits an acquired transmission signal from the antenna 921. In addition, the communication unit 922 performs an amplification process, a frequency converting process, a demodulation process, and the like for the reception signal received by the antenna 921, thereby restoring the mail data. This mail data is supplied to the display unit 930, whereby the content of the mail is displayed.

In addition, the cellular phone 920 may record the received mail data on a storage medium by using the recording/reproducing unit 929. The storage medium is an arbitrary rewritable storage medium. For example, the storage medium is a semiconductor memory such as a RAM or a built-in-type flash memory or a removable medium such as a hard disk, a magnetic disk, a magneto-optical disk, an optical disc, a USB memory, or a memory card.

In a case where image data is transmitted in the data communication mode, the image data generated by the camera unit 926 is supplied to the image processing unit 927. The image processing unit 927 performs an encoding process of the image data, thereby generating encoded data.

The demultiplexing unit 928 multiplexes the encoded data generated by the image processing unit 927 and the audio data supplied from the audio codec 923 in a predetermined mode and supplies multiplexed data to the communication unit 922. The communication unit 922 performs a modulation process, a frequency converting process, and the like of the multiplexing data and transmits an acquired transmission signal from the antenna 921. In addition, the communication unit 922 performs an amplification process, a frequency converting process, a demodulation process, and the like for the reception signal received by the antenna 921, thereby restoring the multiplexed data. This multiplexed data is supplied to the demultiplexing unit 928. The demultiplexing unit 928 demultiplexes the multiplexed data, supplies encoded data to the image processing unit 927, and supplies audio data to the audio codec 923. The image processing unit 927 decodes the encoded data, thereby generating image data. This image data is supplied to the display unit 930, and the received image is displayed. The audio codec 923 converts audio data into an analog audio signal and supplies the analog audio signal to the speaker 924, thereby outputting the received audio.

In the cellular phone device configured as above, the function of the decoding device (decoding method) according to this application is arranged in the image processing unit 927. Accordingly, in communication of the image data, when decoded image data is generated by decoding an encoded stream, multi-viewpoint images can be decoded in accordance with a mode that has compatibility with an existing mode.

Eleventh Embodiment

[Configuration Example of Recording and Reproducing Device]

Figure 73:
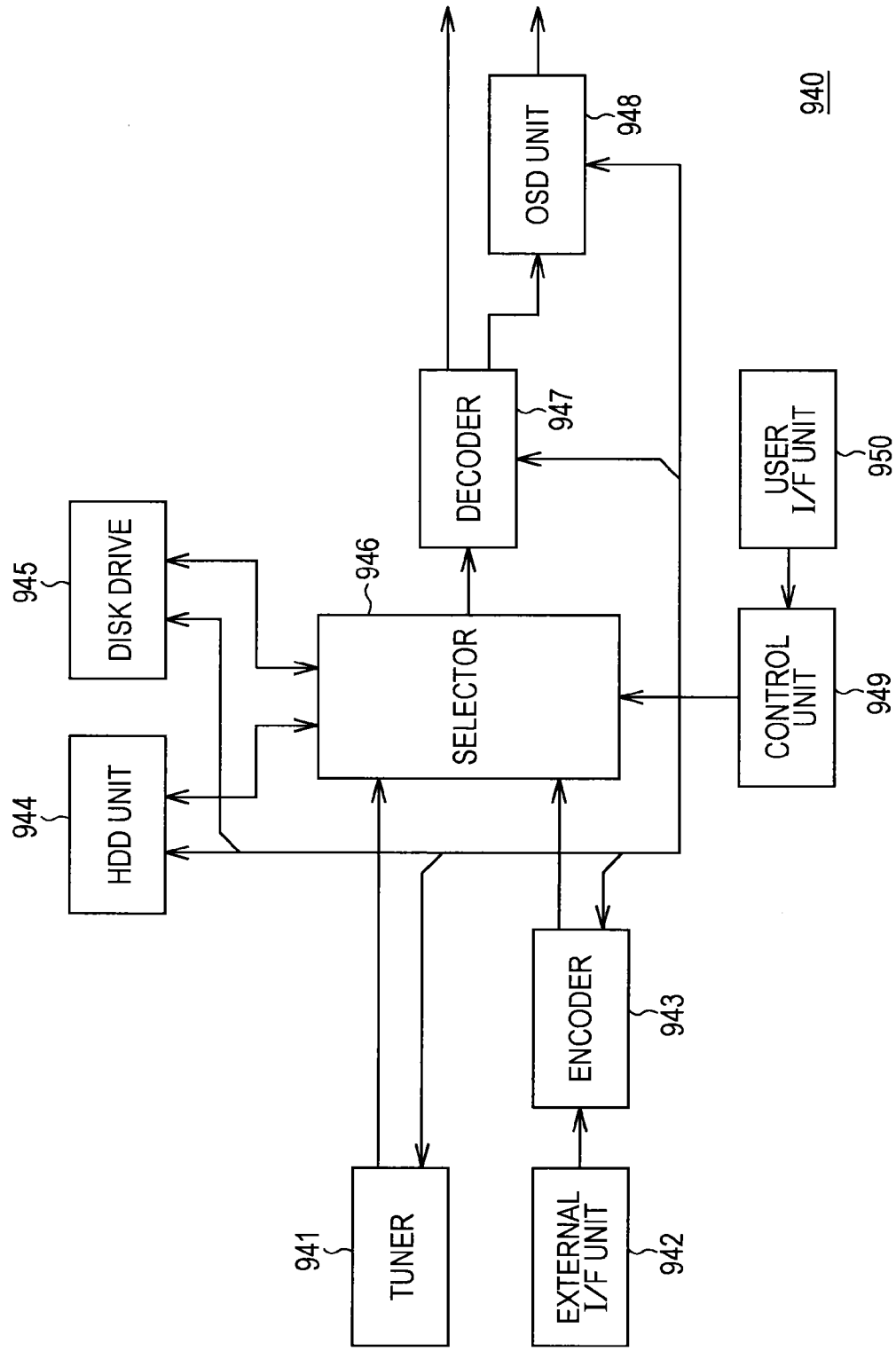
FIG. 73 is a diagram that illustrates a schematic configuration of a recording and reproducing device according to the present technology.

FIG. 73 illustrates a schematic configuration of a recording and reproducing device according to the present technology. The recording and reproducing device 940, for example, records audio data and video data of a received broadcasting program on a recording medium and supplies the recorded data to a user at timing according to a user's instruction. In addition, the recording and reproducing device 940, for example, may acquire audio data and video data from another device and record the data on a recording medium. Furthermore, the recording and reproducing device 940 decodes and outputs the audio data and the video data that are recorded on the recording medium, whereby an image display or audio output in a monitor device or the like can be performed.

The recording and reproducing device 940 includes a tuner 941, an external interface unit 942, an encoder 943, an HDD (Hard Disk Drive) unit 944, a disk driver 945, a selector 946, a decoder 947, an OSD (On-Screen Display) unit 948, a control unit 949, and a user interface unit 950.

The tuner 941 selects a desired channel from among broadcasting signals received by an antenna not illustrated in the figure. The tuner 941 outputs an encoded bit stream that is acquired by demodulating a reception signal of the desired channel to the selector 946.

The external interface unit 942 is configured as at least one of an IEEE 1394 interface, a network interface unit, a USB interface, a flash memory interface, and the like. The external interface unit 942 is an interface used for a connection with an external device, a network, a memory card, or the like and performs data reception of video data, audio data, and the like to be recorded.

When the video data and the audio data supplied from the external interface unit 942 are not encoded, the encoder 943 encodes the data in accordance with a predetermined mode and outputs the encoded bit stream to the selector 946.

The HDD unit 944 records content data such as a video and an audio, various programs, and other data on a built-in hard disk and reads out the data from the hard disk at the time of reproducing the data or the like.

The disk driver 945 performs signal recording and signal reproduction for the installed optical disc. Examples of the optical disc include a DVD disc (a DVD-Video, a DVD-RAM, a DVD-R, a DVD-RW, a DVD+R, DVD+RW, and the like), a Blu-ray disc, and the like.

The selector 946 selects one of encoded bit streams supplied from the tuner 941 or the encoder 943 at the time of recording a video or audio and supplies the encoded bit stream to one of the HDD unit 944 and the disk driver 945. In addition, the selector 946 supplies an encoded bit stream that is output from the HDD unit 944 or the disk driver 945 to the decoder 947 at the time of reproducing a video or an audio.

The decoder 947 performs a decoding process of the encoded bit stream. The decoder 947 supplies the video data that is generated by performing the decoding process to the OSD unit 948. In addition, the decoder 947 outputs audio data that is generated by performing a decoding process.

The OSD unit 948 generates video data used for displaying a menu screen of item selection or the like and outputs the generated video data while being superimposed on the video data output from the decoder 947.

The user interface unit 950 is connected to the control unit 949. The user interface unit 950 is configured by an operating switch, a remote control signal reception unit, and the like and supplies an operating signal according to a user's operation to the control unit 949.

The control unit 949 is configured by a CPU, a memory, and the like. The memory stores various kinds of data that is necessary for a program executed by the CPU or the CPU to perform a process. The program that is stored in the memory is read out and executed by the CPU at predetermined timing such as start-up of the recording and reproducing device 940. The CPU controls each unit such that the recording and reproducing device 940 performs an operation according to a user's operation by executing the program.

In the recording and reproducing device configured as above, the function of the encoding device (encoding method) according to this application is arranged in the encoder 943. Accordingly, when decoded image data is generated by decoding an encoded stream, multi-viewpoint images can be encoded in accordance with a mode that has compatibility with an existing mode.

Twelfth Embodiment

[Configuration Example of Imaging Apparatus]

Figure 74:
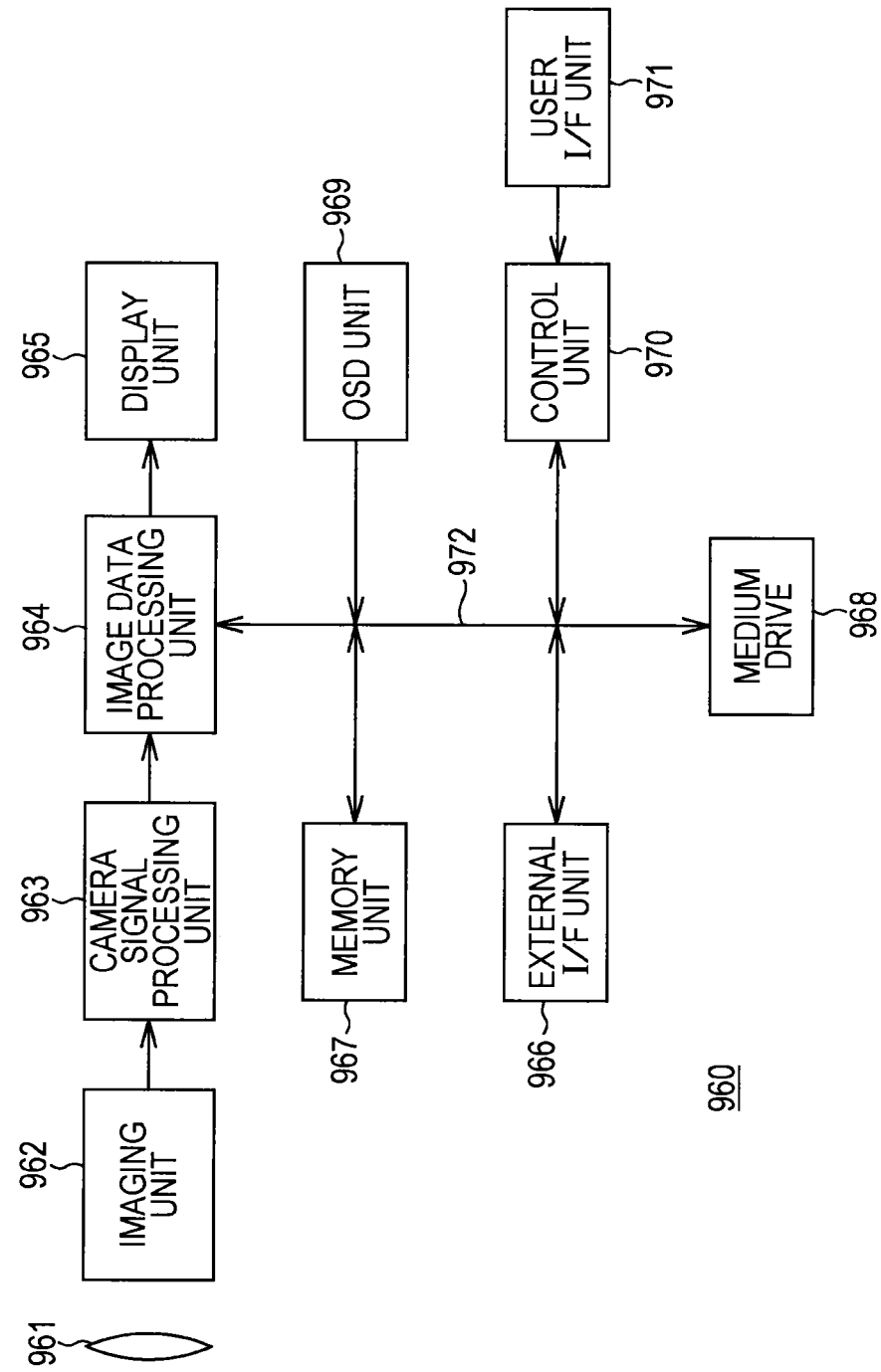
FIG. 74 is a diagram that illustrates a schematic configuration of an imaging apparatus according to the present technology.

FIG. 74 is a diagram that illustrates a schematic configuration of an imaging apparatus according to the present technology. The imaging apparatus 960 images a subject, displays an image of the subject on the display unit or records the image on the recording medium as image data.

The imaging apparatus 960 includes an optical block 961, an imaging unit 962, a camera signal processing unit 963, an image data processing unit 964, a display unit 965, an external interface unit 966, a memory unit 967, a medium drive 968, an OSD unit 969, and a control unit 970. In addition, a user interface unit 971 is connected to the control unit 970. Furthermore, the image data processing unit 964, the external interface unit 966, the memory unit 967, the medium drive 968, the OSD unit 969, the control unit 970, and the like are connected through a bus 972.

The optical block 961 is configured by using a focus lens, a diaphragm mechanism, and the like. The optical block 961 forms an optical image of a subject on an imaging face of the imaging unit 962. The imaging unit 962 is configured by using a CCD or a CMOS image sensor, generates an electric signal in accordance with an optical image through photoelectric conversion, and supplies the electric signal to the camera signal processing unit 963.

The camera signal processing unit 963 performs various camera signal processes such as knee correction, gamma correction, and color correction for the electric signal supplied from the imaging unit 962. The camera signal processing unit 963 supplies the image data after the camera signal processing to the image data processing unit 964.

The image data processing unit 964 performs an encoding process for the image data supplied from the camera signal processing unit 963. The image data processing unit 964 supplies the encoded data generated by performing the encoding process to the external interface unit 966 or the medium drive 968. In addition, the image data processing unit 964 performs a decoding process for the encoded data that is supplied from the external interface unit 966 or the medium drive 968. The image data processing unit 964 supplies the image data that is generated by performing the decoding process to the display unit 965. In addition, the image data processing unit 964 supplies display data that is acquired by the process of supplying the image data supplied from the camera signal processing unit 963 to the display unit 965 or is acquired from the OSD unit 969 to the display unit 965 while being superimposed on the image data.

The OSD unit 969 generates display data of a menu screen, an icon, or the like that is formed from a symbol, a character, or a graphic and outputs the display data to the image data processing unit 964.

The external interface unit 966, for example, is configured by USB input/output terminals and the like and is connected to a printer in a case where an image is printed. In addition, a drive is connected to the external interface unit 966 as is necessary, a removable medium such as a magnetic disk or an optical disc is appropriately installed therein, and a computer program read from the removable medium is installed as is necessary. In addition, the external interface unit 966 includes a network interface that is connected to a predetermined network such as a LAN or the Internet. The control unit 970, for example, in accordance with an instruction supplied from the user interface unit 971, can read encoded data from the memory unit 967 and supply the encoded data from the external interface unit 966 to another device that is connected through the network. In addition, the control unit 970 can acquire the encoded data or the image data, which is supplied from another device through the network, through the external interface unit 966 and supply the data to the image data processing unit 964.

As the recording medium that is driven by the medium drive 968, for example, an arbitrary readable and writable removable medium such as a magnetic disk, a magneto-optical disk, an optical disc, or a semiconductor memory is used. In addition, the type of the recording medium as the removable medium is arbitrary and may be a tape device, a disk device, or a memory card. Furthermore, the recording medium may be a non-contact IC card, or the like.

In addition, the medium drive 968 and the recording medium may be integrated together and configured by a non-portable recording medium such as a built-in type hard disk drive or an SSD (Solid State Drive).

The control unit 970 is configured by a CPU, a memory, and the like. The memory stores various kinds of data that is necessary for a program executed by the CPU or the CPU to perform a process. The program that is stored in the memory is read out and executed by the CPU at predetermined timing such as start-up of the imaging apparatus 960. The CPU controls each unit such that the imaging apparatus 960 performs an operation according to a user's operation by executing the program.

In the imaging apparatus configured as above, the function of the decoding device (decoding method) according to this application is arranged in the image data processing unit 964. Accordingly, when decoded image data is generated by decoding encoded data that is recorded in a memory unit 967, a recording medium, or the like, multi-viewpoint images can be decoded in accordance with a mode that has compatibility with an existing mode.

In addition, an embodiment of the present technology is not limited to the above-described embodiments, and various changes can be made therein in a range not departing from the concept of the present technology.

REFERENCE SIGNS LIST

50 Encoding device
52 Image converting unit
53 Disparity image generating unit
55 Compatibility information generating unit
56 Inter-viewpoint distance information generating unit
59 Multiplexing unit
62 Compatible encoder
62 Auxiliary encoder
120 Decoding device
121 Separation unit
127 Image generating unit
131 Compatible decoder
132 Auxiliary decoder
140 Encoding device
142 Image converting unit
143 Disparity image generating unit
144 Inter-viewpoint distance information generating unit
151 Compatible encoder
152 Auxiliary encoder
170 Decoding device
171 Image generating unit
180 Encoding device
181 Image converting unit
191 Compatible encoder
200 Decoding device
202 Image Generating Unit
211 Compatible Decoder

The invention claimed is:

1. An encoding device comprising:
circuitry configured to
generate a first encoded stream by a compatible image, the compatible image being an image that is encoded in an encoding mode for an image of no more than two viewpoints;
generate an auxiliary image used when multi-viewpoint images are generated from the compatible image, the auxiliary image being an image that is used for generating, by interpolating from the compatible image, images of a plurality of viewpoints including more viewpoints than a number of viewpoints represented in the compatible image and the auxiliary image, the auxiliary image being generated by multiplexing images of two of the plurality of viewpoints that are separated by a greatest distance;
convert resolution of the auxiliary image;
generate a second encoded stream by encoding the converted auxiliary image;
set compatible image designating information designating the compatible image; and
transmit the first encoded stream, the second encoded stream, and the compatible image designating information.

2. The encoding device according to claim 1, wherein the circuitry is further configured to generate a first disparity encoded stream by encoding a compatible disparity image that is a disparity image of the compatible image and generate a second disparity encoded stream by encoding an auxiliary disparity image that is a disparity image of the auxiliary image,
   wherein the circuitry is configured to transmit the first disparity encoded stream and the second disparity encoded stream.

3. The encoding device according to claim 2,
   wherein the circuitry is configured to
   convert the resolution of the auxiliary disparity image, and
   encode the auxiliary disparity image of which the resolution is converted.

4. The encoding device according to claim 3, wherein the circuitry is further configured to
   multiplex the auxiliary disparity image of which the resolution is converted,
   set multiplexing mode information that represents a multiplexing mode of the auxiliary disparity image,
   encode the multiplexed auxiliary disparity image, and
   transmit the multiplexing mode information.

5. The encoding device according to claim 3,
   wherein the circuitry is configured to
   set conversion mode information that represents a conversion mode of the resolution of the auxiliary disparity image, and
   transmit the conversion mode information.

6. The encoding device according to claim 3, wherein the circuitry is further configured to
   multiplex the compatible disparity image in a time direction,
   set multiplexing mode information that represents a multiplexing mode of the compatible disparity image,
   encode the compatible disparity image multiplexed in the time direction, and
   transmit the multiplexing mode information set by the setting unit.

7. The encoding device according to claim 6,
   wherein circuitry is configured to
   multiplex the auxiliary disparity image in a spatial direction,
   set the multiplexing mode information of the compatible disparity image and the auxiliary disparity image,
   encode the compatible disparity image multiplexed in the time direction and the auxiliary disparity image multiplexed in the spatial direction, and
   transmit the multiplexing mode information.

8. The encoding device according to claim 2, wherein the compatible disparity image is a disparity image that is common to the compatible images.

9. The encoding device according to claim 2, wherein the circuitry is further configured to
   multiplex the auxiliary image and the compatible disparity image in a time direction,
   set multiplexing mode information that represents a multiplexing mode,
   encode the multiplexed auxiliary image,
   encode the multiplexed compatible disparity image, and
   transmit the multiplexing mode information.

10. The encoding device according to claim 1, wherein the circuitry is configured to
    set distance information that represents a distance between viewpoints of the compatible image and the auxiliary image, and
    transmit the distance information.

11. The encoding device according to claim 1,
    wherein the circuitry is configured to
    multiplex the auxiliary image of which the resolution is converted,
    set auxiliary image multiplexing mode information that represents a multiplexing mode of the auxiliary image,
    encode the multiplexed auxiliary image, and
    transmit the auxiliary image multiplexing mode information.

12. The encoding device according to claim 11,
    wherein the circuitry is configured to
    set auxiliary image resolution converting mode information that represents a conversion mode of the resolution of the auxiliary image, and
    transmit the auxiliary image resolution converting mode information.

13. An encoding method to be performed by circuitry of an encoding device, the encoding method comprising:
    a compatible image encoding step of generating, by the circuitry, a first encoded stream by a compatible image, the compatible image being an image that is encoded in an encoding mode for an image of no more than two viewpoints;
    an auxiliary image generating step of generating, by the circuitry, an auxiliary image used when multi-viewpoint images are generated from the compatible image, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance;
    an image converting step of converting, by the circuitry, resolution of the auxiliary image;
    an auxiliary image encoding step of generating, by the circuitry, a second encoded stream by encoding the auxiliary image converted in a process of the image converting step;
    a setting step of setting, by the circuitry, compatible image designating information designating the compatible image; and
    a transmitting step of transmitting, by the circuitry, the first encoded stream generated in a process of the compatible image encoding step, the second encoded stream generated in a process of the auxiliary image encoding step, and the compatible image designating information set in a process of the setting step.

14. A decoding device comprising:
    circuitry configured to
    receive a first encoded stream that is acquired as a result of encoding a compatible image, the compatible image being an image that is encoded in an encoding mode for an image of no more than two viewpoints, a second encoded stream that is acquired as a result of converting resolution of an auxiliary image used when a multi-viewpoint image is generated from the compatible image and encoding the auxiliary image, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance, and compatible image designating information that designates the compatible image;

identify the first encoded stream based on the compatible image designating information and decode the first encoded stream;

decode the second encoded stream; and convert the resolution of the auxiliary image, of which the resolution is converted, that is acquired as a result of decoding the second encoded stream.

15. The decoding device according to claim 14, wherein the circuitry is further configured to decode a first disparity encoded stream that is acquired as a result of encoding a compatible disparity image that is a disparity image of the compatible image and a second disparity encoded stream that is acquired as a result of encoding an auxiliary disparity image that is a disparity image of the auxiliary image.

16. The decoding device according to claim 15, wherein the second disparity encoded stream is acquired as a result of encoding the auxiliary disparity image of which the resolution is converted, and the circuitry is configured to convert the resolution of the auxiliary disparity image, of which the resolution is converted, that is acquired as a result of decoding.

17. The decoding device according to claim 16, wherein the circuitry is further configured to separate the multiplexed auxiliary disparity image, wherein the second disparity encoded stream is acquired as a result of encoding the multiplexed auxiliary disparity image of which the resolution is converted, receive multiplexing mode information that represents a multiplexing mode of the auxiliary disparity image, separate the multiplexed auxiliary disparity image, of which the resolution is converted, that is acquired as a result of decoding based on the multiplexing mode information, and convert the resolution of the auxiliary disparity image, of which the resolution is converted, that is acquired as a result of separation.

18. The decoding device according to claim 16, wherein the circuitry is configured to receive conversion mode information that represents a conversion mode of the resolution of the auxiliary disparity image, and convert the resolution of the auxiliary disparity image, of which the resolution is converted, based on the conversion mode information.

19. The decoding device according to claim 16, wherein the circuitry is further configured to separate the compatible disparity image multiplexed in a time direction, acquire the first disparity encoded stream as a result of encoding the compatible disparity image multiplexed in the time direction, receive multiplexing mode information that represents a multiplexing mode of the compatible disparity image, and separate the compatible disparity image multiplexed in the time direction that is acquired as a result of decoding based on the multiplexing mode information.

20. The decoding device according to claim 19, wherein the second disparity encoded stream is acquired as a result of encoding the auxiliary disparity image, of which the resolution is converted, multiplexed in a spatial direction, and wherein the circuitry is configured to receive the multiplexing mode information of the compatible disparity image and the auxiliary disparity image, separate the compatible disparity image, which is multiplexed in the time direction, acquired as a result of decoding based on the multiplexing mode information of the compatible disparity image and separate the auxiliary disparity image, of which the resolution is converted, multiplexed in the spatial direction that is acquired as a result of decoding based on the multiplexing mode information of the auxiliary disparity image, and convert the resolution of the auxiliary disparity image, of which the resolution is converted.

21. The decoding device according to claim 15, wherein the compatible disparity image is a disparity image that is common to the compatible images.

22. The decoding device according to claim 15, wherein the circuitry is further configured to separate the auxiliary image and the compatible disparity image that are multiplexed in a time direction, acquire the second encoded stream as a result of encoding the auxiliary image, of which the resolution is converted, multiplexed in the time direction, acquire the first disparity encoded stream as a result of encoding the compatible disparity image multiplexed in the time direction, receive multiplexing mode information that represents multiplexing modes of the auxiliary image and the compatible disparity image, based on the multiplexing mode information, separate the auxiliary image, of which the resolution is converted, multiplexed in the time direction and acquired as a result of decoding, and separate the compatible disparity image multiplexed in the time direction and acquired as a result of decoding, and convert the resolution of the auxiliary image, of which the resolution is converted.

23. The decoding device according to claim 14, wherein the circuitry is further configured to generate the multi-viewpoint image using the compatible image acquired as a result of decoding and the auxiliary image of which the resolution is converted, receive distance information that represents a distance between viewpoints of the compatible image and the auxiliary image, and generate the multi-viewpoint image by using the compatible image, the auxiliary image, and the distance information.

24. The decoding device according to claim 14, wherein the circuitry is further configured to separate the multiplexed auxiliary image, acquire the second encoded stream as a result of encoding the multiplexed auxiliary image, of which the resolution is converted, receive auxiliary image multiplexing mode information that represents a multiplexing mode of the auxiliary image, separate the multiplexed auxiliary image, of which the resolution is converted, that is acquired as a result of decoding based on the auxiliary image multiplexing mode information, and convert the resolution of the auxiliary image, of which the resolution is converted.

25. The decoding device according to claim 24, wherein the circuitry is configured to receive auxiliary image resolution converting mode information that represents a conversion mode of the resolution of the auxiliary image, and convert the resolution of the auxiliary image, of which the resolution is converted, based on the auxiliary image resolution converting mode information.

26. A decoding method to be performed by circuitry of a decoding device, the decoding method comprising:
a receiving step of receiving, by the circuitry, a first encoded stream that is acquired as a result of encoding a compatible image, the compatible image being an image that is encoded in an encoding mode for an image of no more than two viewpoints, a second encoded stream that is acquired as a result of converting resolution of an auxiliary image used when a multi-viewpoint image is generated from the compatible image and encoding the auxiliary image, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance, and compatible image designating information that designates the compatible image;
a compatible image decoding step of identifying, by the circuitry, the first encoded stream based on the compatible image designating information and decoding the first encoded stream;
an auxiliary image decoding step of decoding, by the circuitry, the second encoded stream; and
an image converting step of converting, by the circuitry, the resolution of the auxiliary image, of which the resolution is converted, that is acquired as a result of decoding in a process of the auxiliary image decoding step.

27. An encoding device comprising:
circuitry configured to
generate a first encoded stream by encoding a compatible image, the compatible image being an image that is encoded in an encoding mode for an image of no more than two viewpoints;
generate a second encoded stream by encoding an auxiliary image used when multi-viewpoint images are generated from the compatible image, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance;
convert resolution of a disparity image that is a disparity image of the compatible image or the auxiliary image;
generate a disparity encoded stream by encoding the disparity image; and
transmit the first encoded stream, the second encoded stream, and the disparity encoded stream.

28. An encoding method performed in circuitry, the method comprising:
generating, by the circuitry, a first encoded stream by encoding a compatible image, the compatible image being an image that is encoded in an encoding mode for an image of no more than two viewpoints;
generating, by the circuitry, a second encoded stream by encoding an auxiliary image used when multi-viewpoint images are generated from the compatible image, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance;
converting, by the circuitry, resolution of a disparity image that is a disparity image of the compatible image or the auxiliary image;
generating, by the circuitry, a disparity encoded stream by encoding the disparity image; and
transmitting, by the circuitry, the first encoded stream, the second encoded stream, and the disparity encoded stream.

29. A decoding device comprising:
circuitry configured to
decode a first encoded stream generated by encoding a compatible image, the compatible image being an image that is encoded in an encoding mode for an image of no more than two viewpoints;
decode a second encoded stream generated by encoding an auxiliary image used when multi-viewpoint images, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance;
decode a disparity encoded stream generated by encoding a converted disparity image of which resolution is converted and generates the converted disparity image; and
convert resolution of the converted disparity image.

30. A decoding method performed in circuitry, the method comprising:
decoding, by the circuitry, a first encoded stream generated by encoding a compatible image, the compatible image being an image that is encoded in an encoding mode for an image of no more than two viewpoints;
decoding, by the circuitry, a second encoded stream generated by encoding an auxiliary image used when multi-viewpoint images, the auxiliary image being an image that is used for generating, by interpolating from the compatible image, images of a plurality of viewpoints including more viewpoints than a number of viewpoints of the compatible image and the auxiliary image, the auxiliary image being generated by multiplexing images of two of the plurality of viewpoints that are separated by a greatest distance;
decoding, by the circuitry, a disparity encoded stream generated by encoding a converted disparity image of which resolution is converted and generates the converted disparity image; and
converting, by the circuitry, resolution of the converted disparity image.

* * * * *